US010657508B2

(12) United States Patent
Nakajima et al.

(10) Patent No.: US 10,657,508 B2
(45) Date of Patent: May 19, 2020

(54) PRODUCT STORAGE DEVICE AND AUTOMATIC VENDING MACHINE

(71) Applicant: FUJI ELECTRIC CO., LTD., Kawasaki-shi, Kanagawa (JP)

(72) Inventors: Norio Nakajima, Yokkaichi (JP); Hajime Erikawa, Kumagaya (JP); Katsuhiko Fukuda, Yokkaichi (JP); Michihiko Makino, Yokkaichi (JP); Takuya Sakatoku, Yokkaichi (JP); Takuma Kakiuchi, Yokkaichi (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/854,255

(22) Filed: Dec. 26, 2017

(65) Prior Publication Data

US 2018/0121898 A1   May 3, 2018

Related U.S. Application Data

(63) Continuation of application No. PCT/JP2016/070807, filed on Jul. 14, 2016.

(30) Foreign Application Priority Data

Aug. 4, 2015  (JP) ................. 2015-154523
Aug. 4, 2015  (JP) ................. 2015-154525
Aug. 4, 2015  (JP) ................. 2015-154526

(51) Int. Cl.
*G06Q 20/18*    (2012.01)
*G07F 11/64*    (2006.01)
(Continued)

(52) U.S. Cl.
CPC ............. *G06Q 20/18* (2013.01); *G07F 7/005* (2013.01); *G07F 11/22* (2013.01); *G07F 11/38* (2013.01);
(Continued)

(58) Field of Classification Search
CPC ......... G06Q 20/18; G07F 7/005; G07F 11/22; G07F 11/28; G07F 11/32; G07F 11/38;
(Continued)

(56) References Cited

U.S. PATENT DOCUMENTS 6,073,785 A * 6/2000 Tolfsen .............. B65G 47/8823
                                                    211/183
6,098,841 A * 8/2000 Katakai ................ G07F 11/30
                                                    221/251
(Continued)

FOREIGN PATENT DOCUMENTS

JP    2012-194725 A    10/2012
WO   2014/046015 A1   3/2014

OTHER PUBLICATIONS

PCT/ISA/210, "International Search Report for International Application No. PCT/JP2016/070807," dated Oct. 18, 2016.

*Primary Examiner* — Gene O Crawford
*Assistant Examiner* — Kelvin L Randall, Jr.
(74) *Attorney, Agent, or Firm* — Manabu Kanesaka

(57) ABSTRACT

A product storage device includes: a main gate that is swingably provided to advance and move away from a product storage column, that advances to an advanced position, and that allows a downstream-most product to be taken out; a sub-gate that is swingably provided in association with the main gate; a sliding member that regulates the main gate from moving away and retracting from the product storage column; and a lever that allows the sliding member to be present at a regulation position, that switches to a regulation posture which regulates the sliding member from returning to the regulation position, and that then, when the main gate moves away from the product storage column in response to a take-out operation, switches to a standby posture when the main gate advances to the product (Continued)

storage column to allow the sliding member to return to the regulation position.

10 Claims, 60 Drawing Sheets

(51) Int. Cl.
    *G07F 11/38*     (2006.01)
    *G07F 11/40*     (2006.01)
    *G07F 7/00*     (2006.01)
    *G07F 11/60*     (2006.01)
    *G07F 11/22*     (2006.01)
    *G07F 11/42*     (2006.01)

(52) U.S. Cl.
    CPC .............. *G07F 11/40* (2013.01); *G07F 11/42* (2013.01); *G07F 11/60* (2013.01); *G07F 11/64* (2013.01)

(58) Field of Classification Search
    CPC .......... G07F 11/40; G07F 11/42; G07F 11/60; G07F 11/64
    See application file for complete search history.

(56) References Cited

U.S. PATENT DOCUMENTS

| | | | | |
|---|---|---|---|---|
| 6,409,045 B1 * | 6/2002 | Lauer | ...................... | G07F 11/38 |
| | | | | 221/124 |
| 2013/0299509 A1 * | 11/2013 | Yasaka | ................... | G07F 11/60 |
| | | | | 221/9 |
| 2015/0213669 A1 | 7/2015 | Yasaka et al. | | |

* cited by examiner

PRODUCT STORAGE DEVICE AND AUTOMATIC VENDING MACHINE

CROSS-REFERENCE TO RELATED APPLICATION(S)

This application is a continuation application of International Application No. PCT/JP2016/070807, filed on Jul. 14, 2016 which claims the benefit of priority of the prior Japanese Patent Application No. 2015-154523, filed on Aug. 4, 2015, Japanese Patent Application No. 2015-154525, filed on Aug. 4, 2015, and Japanese Patent Application No. 2015-154526, filed on Aug. 4, 2015, the entire contents of which are incorporated herein by reference.

BACKGROUND

The present disclosure relates to a product storage device and an automatic vending machine.

Typically, for example, a product storage device for storing bottled beverages or canned beverages is proposed in Japanese Laid-open Patent Publication No. 2012-194725. The product storage device proposed in Japanese Laid-open Patent Publication No. 2012-194725 includes product racks, a rack selection mechanism, a take-out mechanism, and a regulating unit.

Each product rack has a plurality of product storage columns arranged in parallel in which products are stored in alignment; and multiple layers of product racks are provided in the vertical direction. The rack selection mechanism sets, in the standby state, all product racks in the state of regulating the products from being taken out. When a vendition instruction is issued, the rack selection mechanism sets the product rack of only the specified layer to the state in which taking out the products is allowed.

The take-out mechanism is individually installed for each of the product storage columns. In a normal state, each take-out mechanism regulates the products stored in the corresponding product storage column from being taken out. When the rack selection mechanism allows the taking out of a product from the product rack including the product storage column in which the take-out mechanism is installed, the take-out mechanism performs operations in response to a product take-out action and allows only the foremost product (the downstream-most product) that is at the foremost position to be taken out.

The regulating unit is individually installed for each of the product racks. When the rack selection mechanism allows the taking out of a product from the product rack in which the regulating unit is installed, the regulating unit allows one of the take-out mechanisms to perform operations and regulates the other take-out mechanisms in the corresponding product racks from performing the operations.

SUMMARY

There is a need for at least partially solve a problem in related art.

According to an embodiment of the present disclosure, a product storage device includes: a main gate that is swingably provided in a manner to advance to and move away from a product storage column used for storing products in alignment, that, in a normal state, advances to an advanced position which is on a dispensing slot side of a downstream-most product present at a downstream-most side in the product storage column, and that, when moving away from the product storage column, allows the downstream-most product to be taken out through the dispensing slot; a sub-gate that is swingably provided in association with the main gate in a manner to advance to and move away from the product storage column, that, when the main gate advances to the product storage column, moves away from the product storage column, and that, when the main gate moves away from the product storage column, advances to the product storage column and regulates a product disposed next to and an upstream side of the downstream-most product from moving toward the dispensing slot; a sliding member that is slidably provided in a storing direction of the product storage column and that, when disposed at a regulation position, regulates the main gate from moving away and retracting from the product storage column; and a lever that is swingably provided along with the main gate, that, when in a standby posture, allows the sliding member to be present at the regulation position, that, when the sliding member slides from the regulation position, switches to a regulation posture which regulates the sliding member from returning to the regulation position, and that then, when the main gate moves away from the product storage column in response to a take-out operation of taking out the downstream-most product, switches to the standby posture when the main gate advances to the product storage column to allow the sliding member to return to the regulation position.

According to an embodiment of the present disclosure, a product storage device includes: a main gate that is swingably provided in a manner to advance to and move away from a product storage column used for storing products in alignment, that, in a normal state, advances to an advanced position which is on a dispensing slot side of a downstream-most product present at a downstream-most side in the product storage column, and that, when moving away from the product storage column, allows the downstream-most product to be taken out through the dispensing slot; a sub-gate that is swingably provided in association with the main gate in a manner to advance to and move away from the product storage column, that, when the main gate advances to the product storage column, moves away from the product storage column, and that, when the main gate moves away from the product storage column, advances to the product storage column and regulates a product disposed next to and an upstream side of the downstream-most product from moving toward the dispensing slot; a sliding member that is slidably provided in a storing direction of the product storage column and that, when disposed at a regulation position, regulates the main gate from moving away and retracting from the product storage column; a detecting unit that detects a swing of the main gate, which is at the advanced position, in a direction of moving away; and a control unit that, when the detecting unit detects the swing of the main gate in a state where the sliding member is present at the regulation position, determines that a product in the product storage column is selected and makes the sliding member slide from the regulation position.

According to an embodiment of the present disclosure, an automatic vending machine includes a product storage device that includes a main gate that is swingably provided in a manner to advance to and move away from a product storage column used for storing products in alignment, that, in a normal state, advances to an advanced position which is on a dispensing slot side of a downstream-most product present at a downstream-most side in the product storage column, and that, when moving away from the product storage column, allows the downstream-most product to be taken out through the dispensing slot, and a sub-gate that is swingably provided in association with the main gate in a manner to advance to and move away from the product storage column, that, when the main gate advances to the product storage column, moves away from the product storage column, and that, when the main gate moves away from the product storage column, advances to the product storage column and regulates a product disposed next to and an upstream side of the downstream-most product from moving toward the dispensing slot. Further, the product storage device further includes a sliding member that is slidably provided in a storing direction of the product storage column and that, when disposed at a regulation position, regulates the main gate from moving away and retracting from the product storage column, a lever that is swingably provided along with the main gate, that, when in a standby posture, allows the sliding member to be present at the regulation position, that, when the sliding member slides from the regulation position, switches to a regulation posture which regulates the sliding member from returning to the regulation position, and then that, when the main gate moves away from the product storage column in response to a take-out operation of taking out the downstream-most product, switches to the standby posture when the main gate advances to the product storage column to allow the sliding member to return to the regulation position, and a switching member that, when the sliding member slides from the regulation position, allows the lever to switch to the regulation posture, and that is movably provided between a vendition position at which, when the main gate, which had moved away from the product storage column in response to the take-out operation of taking out the downstream-most product, again advances to the product storage column, the lever is allowed to switch to the standby posture, and a restocking position at which, when the sliding member slides from the regulation position, the sliding member is maintained in a state of having slid from the regulation position and the lever is regulated from switching to the standby posture, and the automatic vending machine further comprises a control unit that, in a state in which the switching member is present at the vendition position and the sliding member has slid from the regulation position, in case of terminating vendition of products stored in the product storage column, first moves the switching member to the restocking position and moves the switching member to the vendition position.

DETAILED DESCRIPTION

In the related art, in a product storage device having product racks and a rack selection mechanism to select one product rack from which a product is allowed to be taken out, it is allowed to take out a downstream-most product stored in any one of the product racks in the selected product rack. Therefore, it is not possible to independently set prices for the product racks, so that prices of products are to be set on a product rack basis.

For that reason, it becomes necessary to arrange that all the product columns in one product need to store the products in the same prices, which significantly restricts not only a degree of freedom in the installation of the product storage columns but also a degree of freedom in the products that can be stored.

A preferred embodiment of a product storage device and an automatic vending machine according to the present disclosure is described below in detail with reference to the accompanying drawings.

Embodiment

Figure 1:
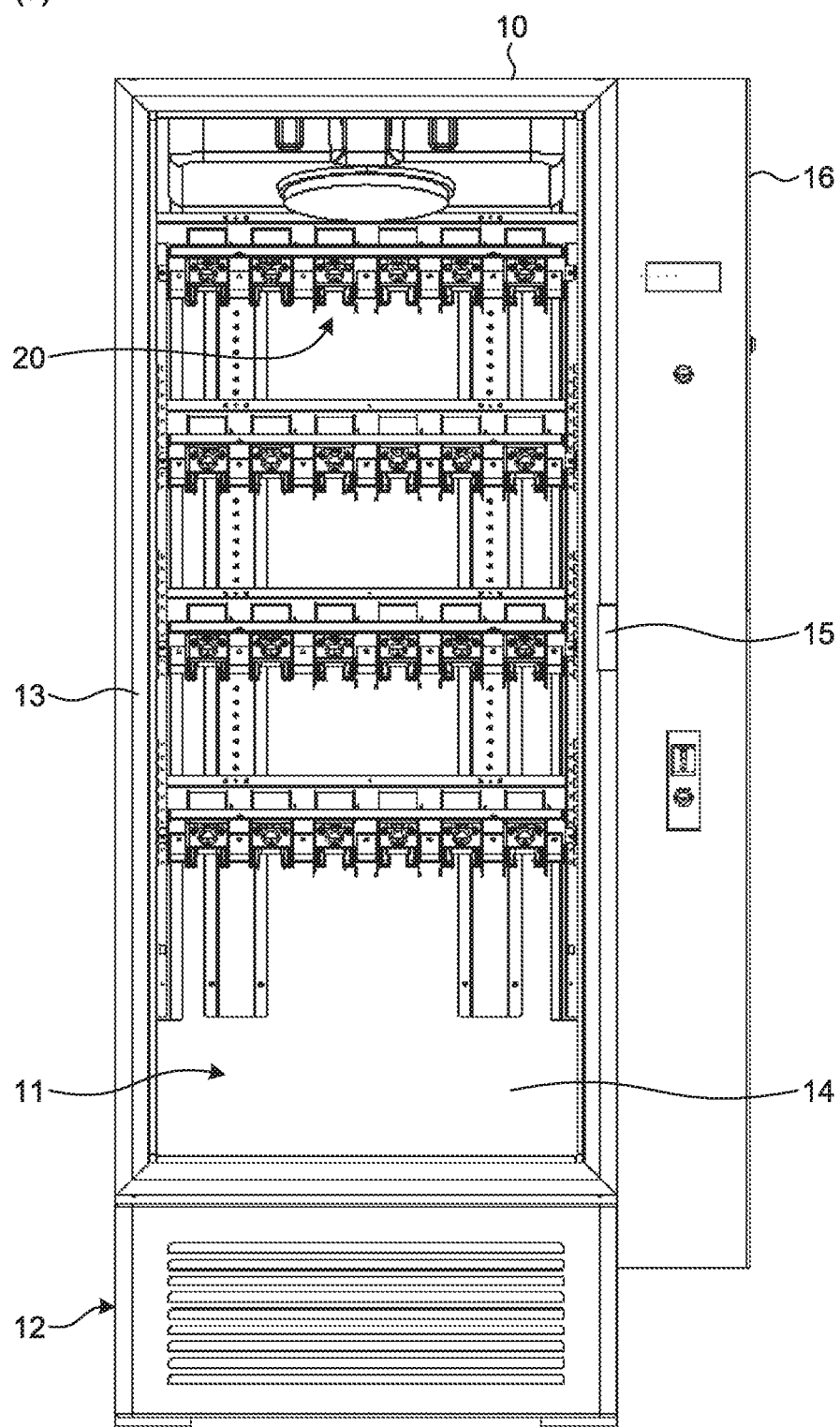
FIG. 1 is a front view of an automatic vending machine in which a product storage device according to an embodiment of the present disclosure is implemented, and an explanatory diagram illustrating the shape of the stored products.

Part (a) of FIG. 1 is a front view of an automatic vending machine in which the product storage device according to the embodiment of the present disclosure is implemented (i.e., a front view of an automatic vending machine according to the embodiment of the present disclosure). The automatic vending machine illustrated in FIG. 1A is used in selling, for example, bottled beverages in a chilled or heated state, and includes a main cabinet 10.

The following explanation is given about the stored products. As illustrated in FIG. 1B, a product 1 has a beverage filled inside a container (a pet bottle) in which a constriction 5 is present between a cap attaching portion 3, to which a cap (lid) 2 is fit in a detachably attachable manner), and a body part 4.

The inside of the main cabinet is partitioned into two portions one above the other, namely, a storage shelf 11 on the upper side and a machine room 12 on the lower side. The storage shelf 11 is a room inside which a preset temperature is maintained, and the walls of the storage shelf 11 are made of a heat insulating material. Moreover, the storage shelf 11 includes a unit (not illustrated) such as an evaporator for cooling the internal air of the storage room and a unit (not illustrated) such as an electrothermal heater for heating the internal air of the storage room.

In the storage shelf 11, an opening formed on the front face (hereinafter, called a front-face opening) is opened and closed by a front door (a door body) 13. The front door 13 is made by appropriately using a heat insulating material, and has a window 14 formed therein by fitting a transparent plate of insulated glass. Hence, it becomes possible to visually check the inside of the storage shelf 11 via the window 14 of the front door 13. On the extreme right of the front face of the front door 13, a handle 15 is provided in the middle portion.

In the machine room 12, a refrigerating machine (not illustrated), which constitutes a refrigeration cycle along with the abovementioned evaporator, and various control devices (not illustrated) are installed.

On the right-hand side face of the main cabinet 10, a box-like side cabinet 16 is provided in which an actuator 60 (described later) is housed.

Figure 2:
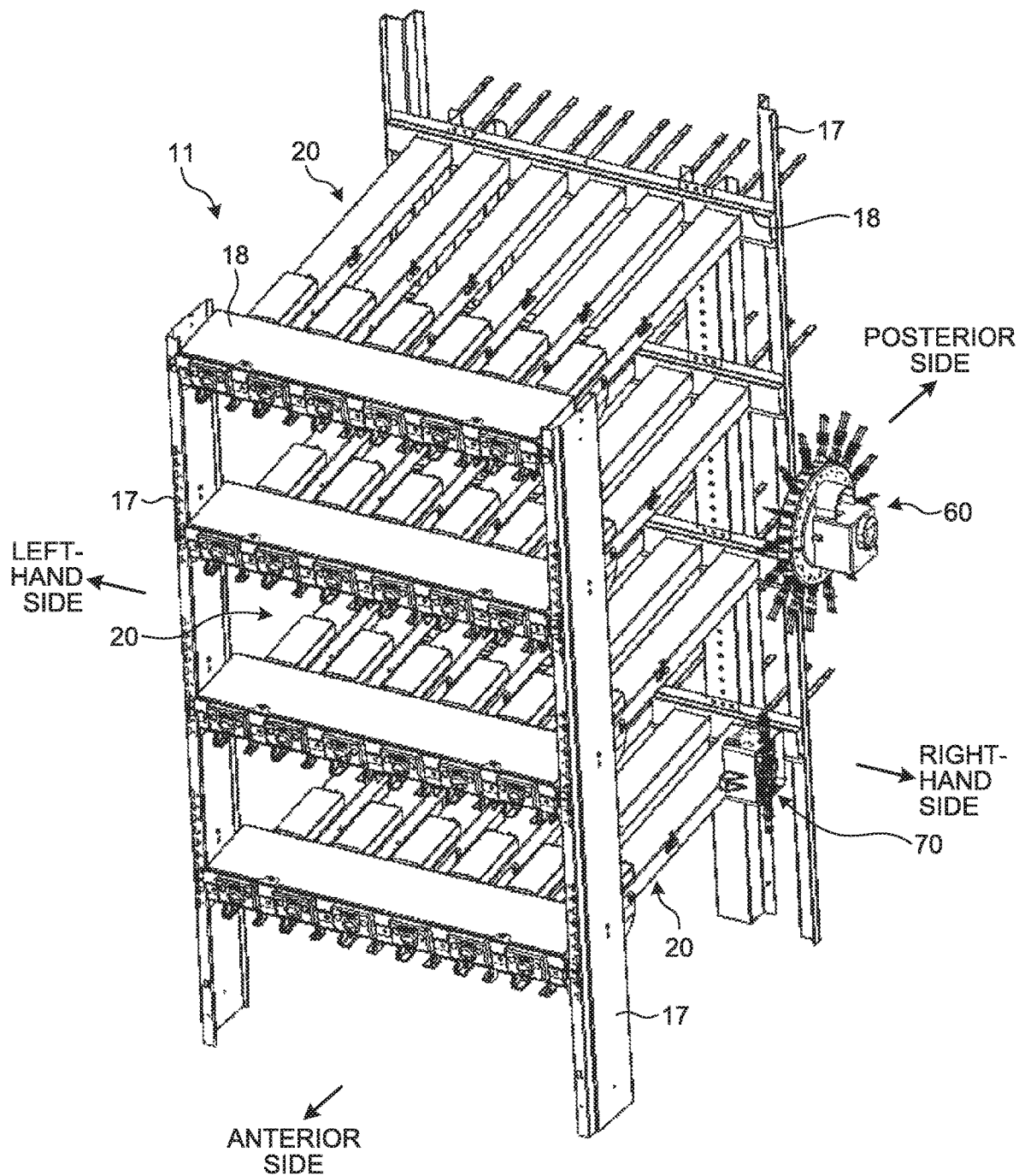
FIG. 2 is a perspective view illustrating the main constituent elements in the internal structure of the automatic vending machine illustrated in FIG. 1.

FIG. 2 is a perspective view illustrating the main constituent elements in the internal structure of the automatic vending machine illustrated in FIG. 1. As illustrated in FIG. 2, in the storage shelf 11 of the automatic vending machine, a plurality of product storage devices 20 is installed. More specifically, six product storage devices 20 are arranged in the right-left direction to constitute a single layer, and there are four such layers arranged in the vertical direction. That is, inside the storage shelf 11, a total of 24 product storage devices 20 are installed. The product storage devices 20 are attached to supporting members 18 that are built on pairs of right-left supporting pillars erected inside the storage shelf 11.

Figure 3:
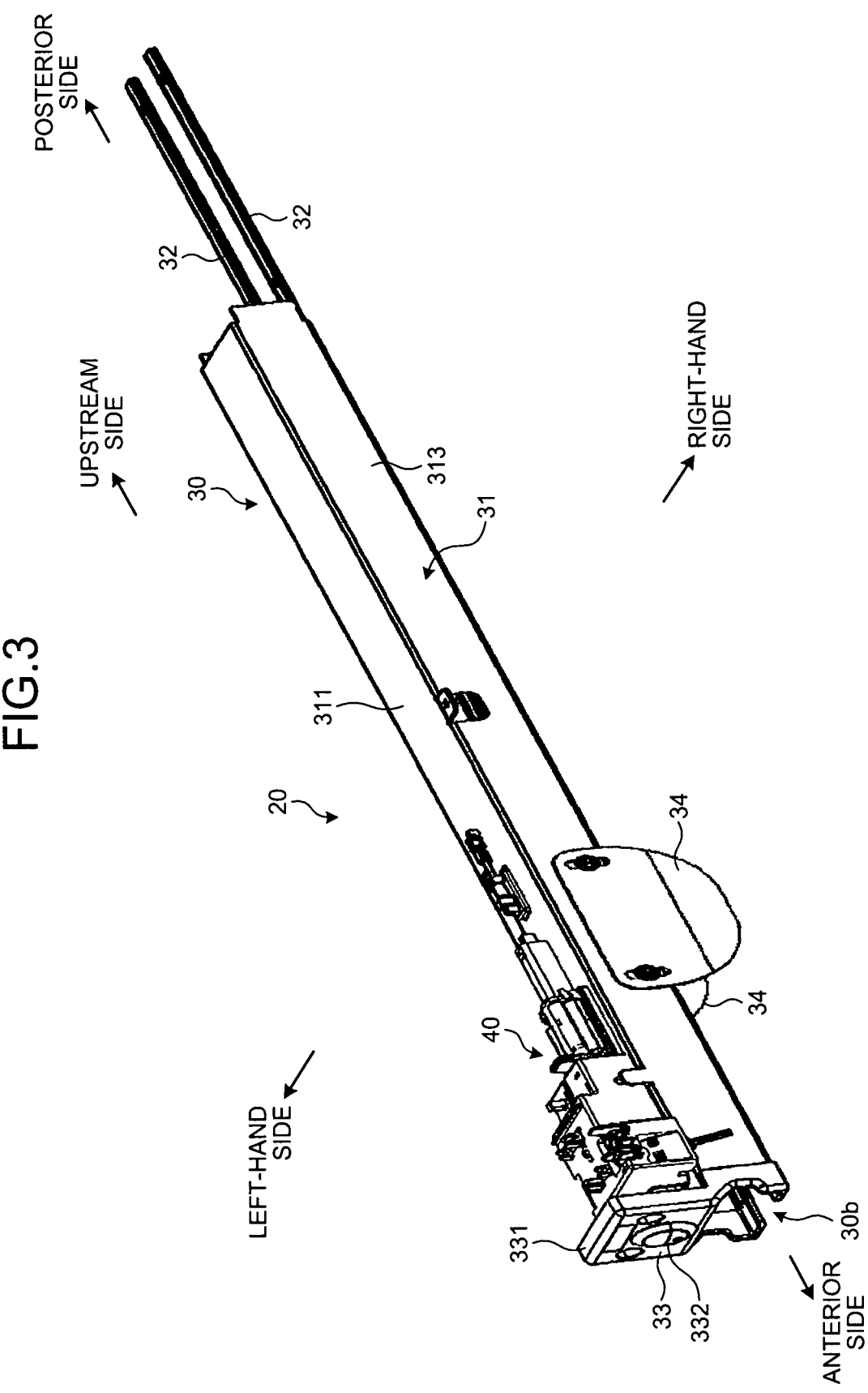
FIG. 3 is a perspective view of the product storage device illustrated in FIG. 2.
Figure 4:
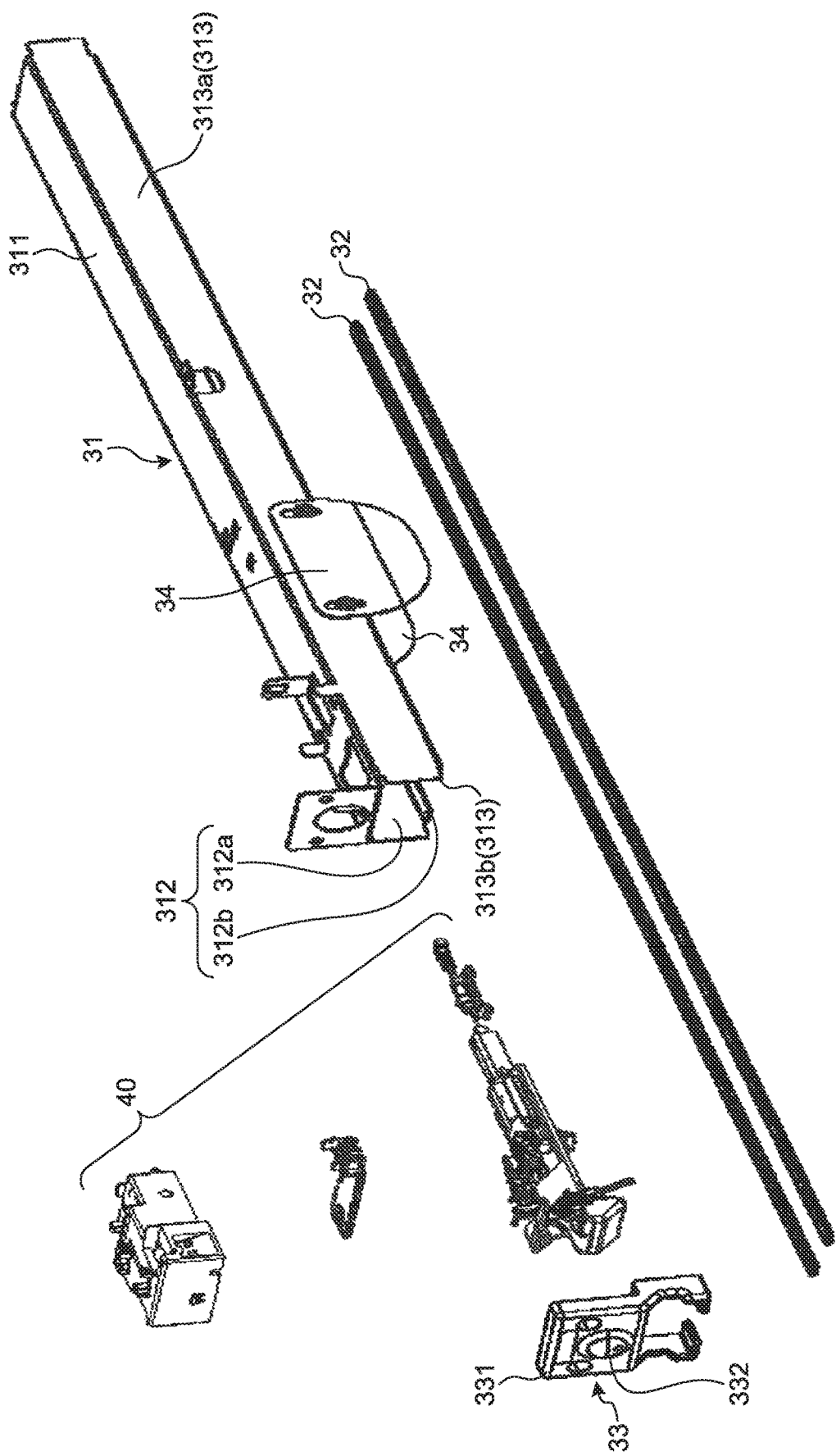
FIG. 4 is an exploded perspective view of the constituent elements of the product storage device illustrated in FIG. 2.

FIGS. 3 and 4 are diagrams illustrating the product storage device 20 illustrated in FIG. 2. FIG. 3 is a perspective view, and FIG. 4 is an exploded perspective view of the constituent elements. As illustrated in FIGS. 3 and 4, the product storage device 20 includes a rail member 30 and a take-out mechanism 40.

Figure 5:
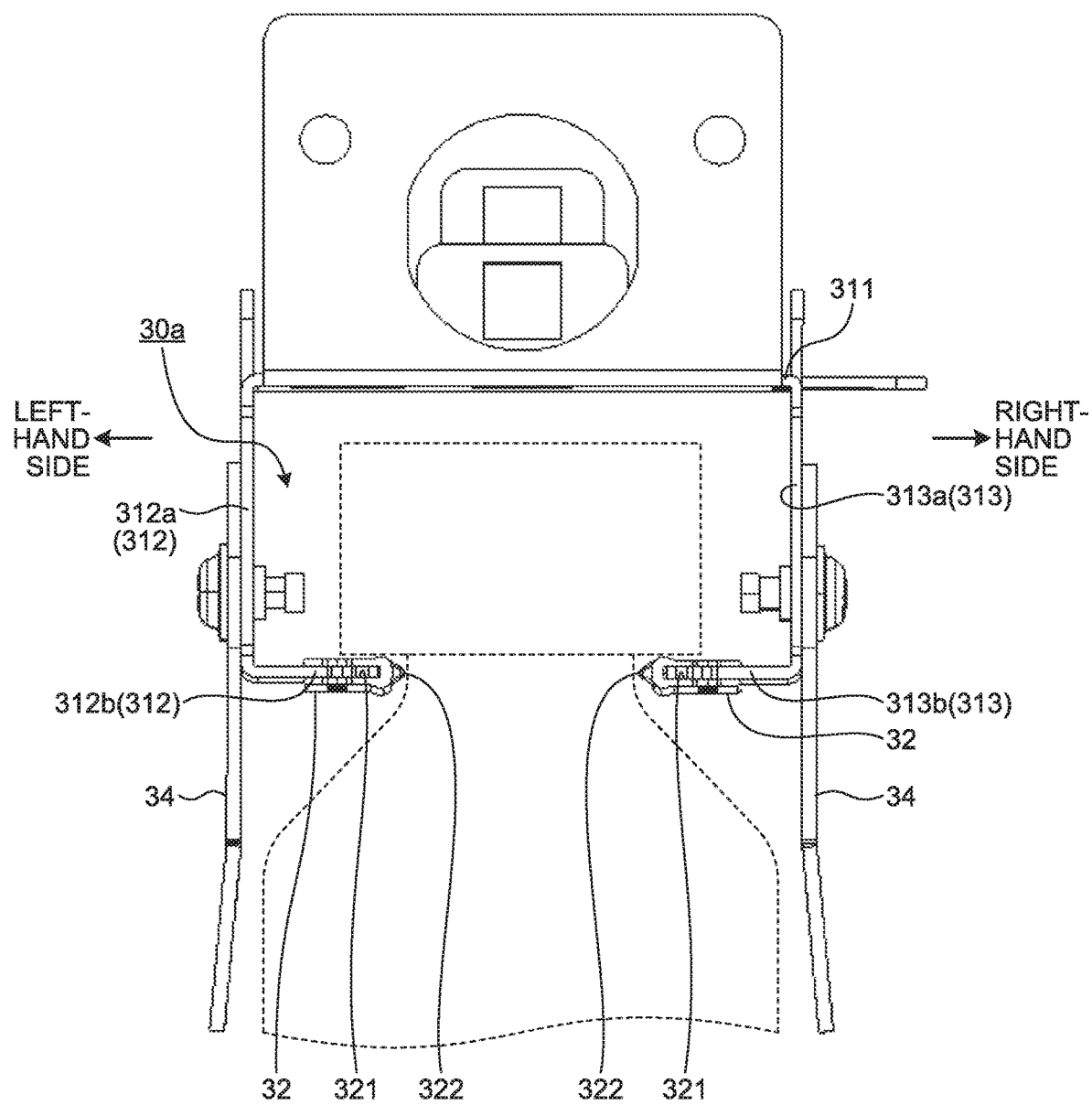
FIG. 5 is a front view of the main constituent elements of a rail member illustrated in FIGS. 3 and 4.
Figure 6:
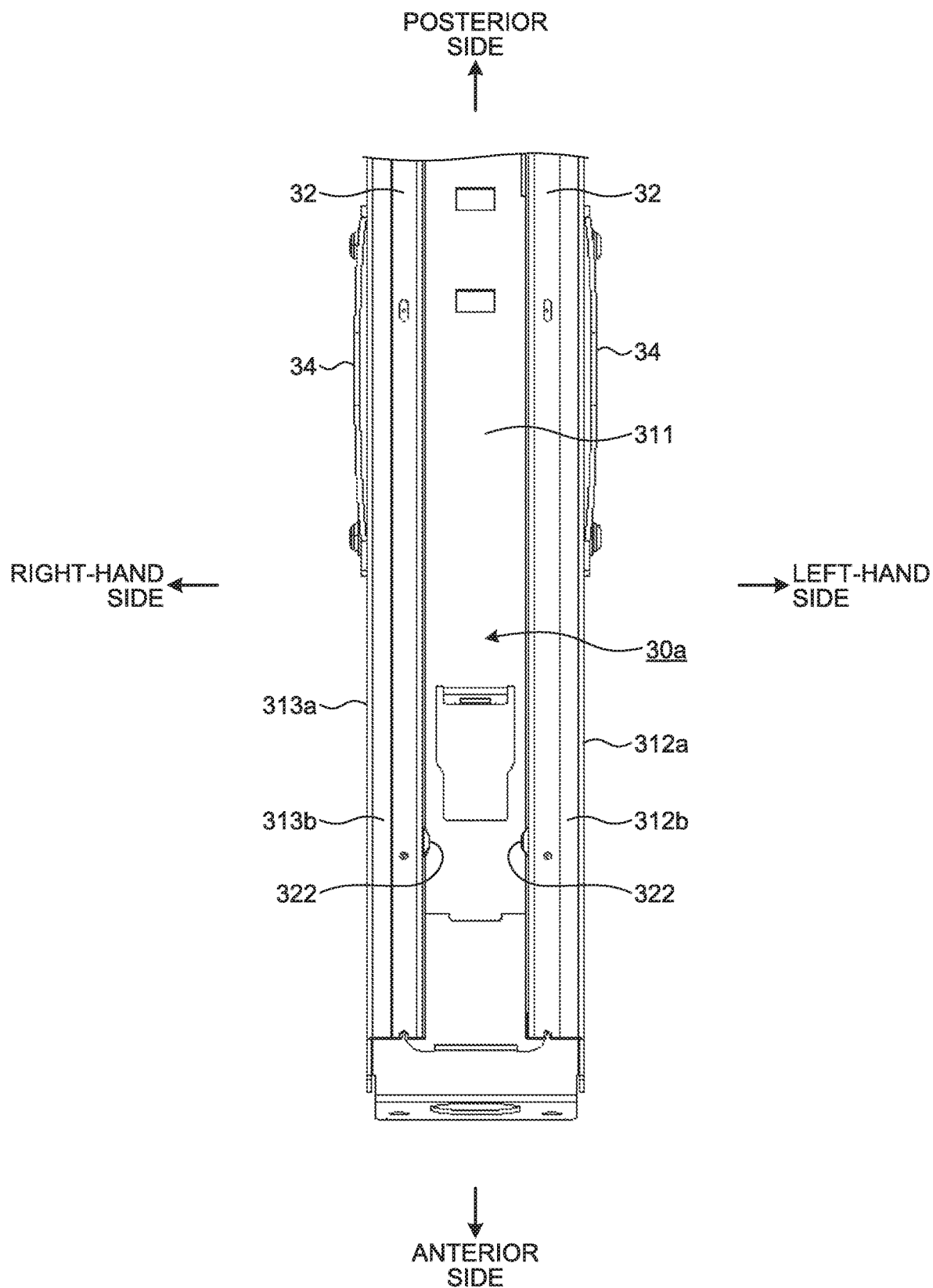
FIG. 6 is a planar view, when viewed from below, of the anterior side of the rail member illustrated in FIGS. 3 and 4.

FIGS. 5 and 6 are diagrams illustrating the main constituent elements of the rail member 30 illustrated in FIGS. 3 and 4. FIG. 5 is a front view, and FIG. 6 is a planar view of the anterior side when viewed from below. Thus, the explanation of the rail member 30 is given with reference to FIGS. 5 and 6. The rail member 30 includes a rail main body 31, rail sliding portions 32, and a product selecting unit 33.

The rail main body 31 is manufactured by appropriately bending, for example, a steel plate, and has an elongated shape with the front-back direction serving as the longitudinal direction. The rail main body 31 is supported by the supporting members 18 at a gradually-downward slant toward the anterior side.

The rail main body 31 is made of a rail base portion 311, a rail left-side end 312, and a rail right-side end 313 configured in an integrated manner. The rail base portion 311 is a tabular portion constituting the top face of the rail main body 31. The rail left-side end 312 is formed in an integrated manner to be continuous with the left-side edge of the rail base portion 311. The rail left-side end 312 is made of a rail left-side end downward-extending portion 312a, which extends downward from the left-side edge of the rail base portion 311, and a rail left-side end rightward-extending portion 312b, which extends rightward from the rail left-side end downward-extending portion 312a, formed in an integrated manner.

The rail right-side end 313 forms a right-left pair with the rail left-side end 312, and is formed in an integrated manner to be continuous with the right-side edge of the rail base portion 311. The rail right-side end 313 is made of a rail right-side end downward-extending portion 313a, which extends downward from the right-side edge of the rail base portion 311, and a rail right-side end leftward-extending portion 313b, which extends leftward from the rail right-side end downward-extending portion 313a, formed in an integrated manner.

The rail left-side end downward-extending portion 312a and the rail right-side end downward-extending portion 313a have substantially same lengths in the vertical direction and have mutually opposite inner faces. Hence, the rail left-side end rightward-extending portion 312b and the rail right-side end leftward-extending portion 313b have substantially identical lengths of extension and substantially identical heights.

The rail main body 31 has attachments 34 attached thereto. The attachments 34 form a right-left pair in which one of the attachments 34 is fastened using a fastening member such as a screw to the rail left-side end downward-extending portion 312a of the rail left-side end 312, and the other attachment 34 is fastened using a fastening member such as a screw to the rail right-side end downward-extending portion 313a of the rail right-side end 313. The attachments 34 are attached to predetermined positions at the posterior side of a sub-gate 44 (described later) constituting the take-out mechanism 40.

Moreover, the lower ends of the attachments 34 protrude downward from the rail main body 31, and the clearance between the lower ends is slightly greater than the maximum width of the container of the product 1 to be stored (the target product 1). That is, the attachments 34 regulate the passage in the front-back direction of such products 1 which have the width exceeding the predetermined width of the target product 1.

There are two rail sliding portions 32 made of a resin material having a small sliding resistance. The rail sliding portions 32 have an elongated shape with the front-back direction serving as the longitudinal direction, and are bigger in size than the size in the front-back direction of the rail main body 31. In each rail sliding portion 32, a groove 321 is formed along the longitudinal direction.

One of the rail sliding portions 32 is attached in such a way that the rail left-side end rightward-extending portion 312b enters the corresponding groove 321 and gets covered at the top face and the bottom face in the right-side end. The other rail sliding portions 32 is attached in such a way that the rail right-side end leftward-extending portion 313b enters the groove 321 and gets covered at the top face and the bottom face in the left-side end. Thus, the rail sliding portions 32 are attached as a right-left pair to the rail main body 31.

In the rail member 30, the smallest clearance between the rail left-side end 312 and the rail right-side end 313, that is, the clearance between the rail sliding portion 32 attached to the rail left-side end rightward-extending portion 312b and the rail sliding portion 32 attached to the rail right-side end leftward-extending portion 313b is greater than the maximum width of the constriction 5 of the container of the product 1 and is smaller than the maximum width of the cap attaching portion 3 of the product 1.

With that, when the product 1 is inserted in the upright posture so that the constriction 5 thereof gets inserted from the anterior side, some part of the cap attaching portion 3 of the product 1 can be placed on the right-left pair of rail sliding portions 32 of the rail member 30. As a result, the rail member 30 supports the cap attaching portion 3 of the product 1 and thus supports the product 1 in a suspended manner, as well as constitutes a product storage column 30a in which the products 1 are stored in alignment in the front-back direction.

In the right-left pair of rail sliding portions 32, protrusions 322 that protrude toward each other are formed in the anterior end portion. These protrusions 322 are formed in between the advanced position of a first main gate 42a (described later), which constitutes the take-out mechanism 40, to the product storage column 30a and the advanced position of the sub-gate 44 to the product storage column 30a. The clearance between the protrusions 322 is substantially the same as the maximum width of the constriction 5 of the container of the product 1.

The product selecting unit 33 includes a button container 331 and a product selection button 332. The button container 331 is made of a resin material and is attached to cover the anterior end portion of the rail main body 31. More specifically, the upper end portion of the button container 331 is attached to an upward-extending piece that is formed by bending the anterior end portion of the rail base portion 311 of the rail main body 31 in the upward direction, and the lower end portion of the button container 331 is attached to cover the anterior end portion of the rail base portion 311, the rail left-side end 312, and the rail right-side end 313. In the lower end portion thereof, the button container 331 has an opening that constitutes a dispensing slot 30b of the product storage column 30a.

The product selection button 332 is placed on the upper end portion of the button container 331. The product selection button 332 has a built-in product selection switch 55 (see FIG. 45) and represents an input unit that, when pressed, switches the product selection switch 55 to the ON state.

Figure 7:
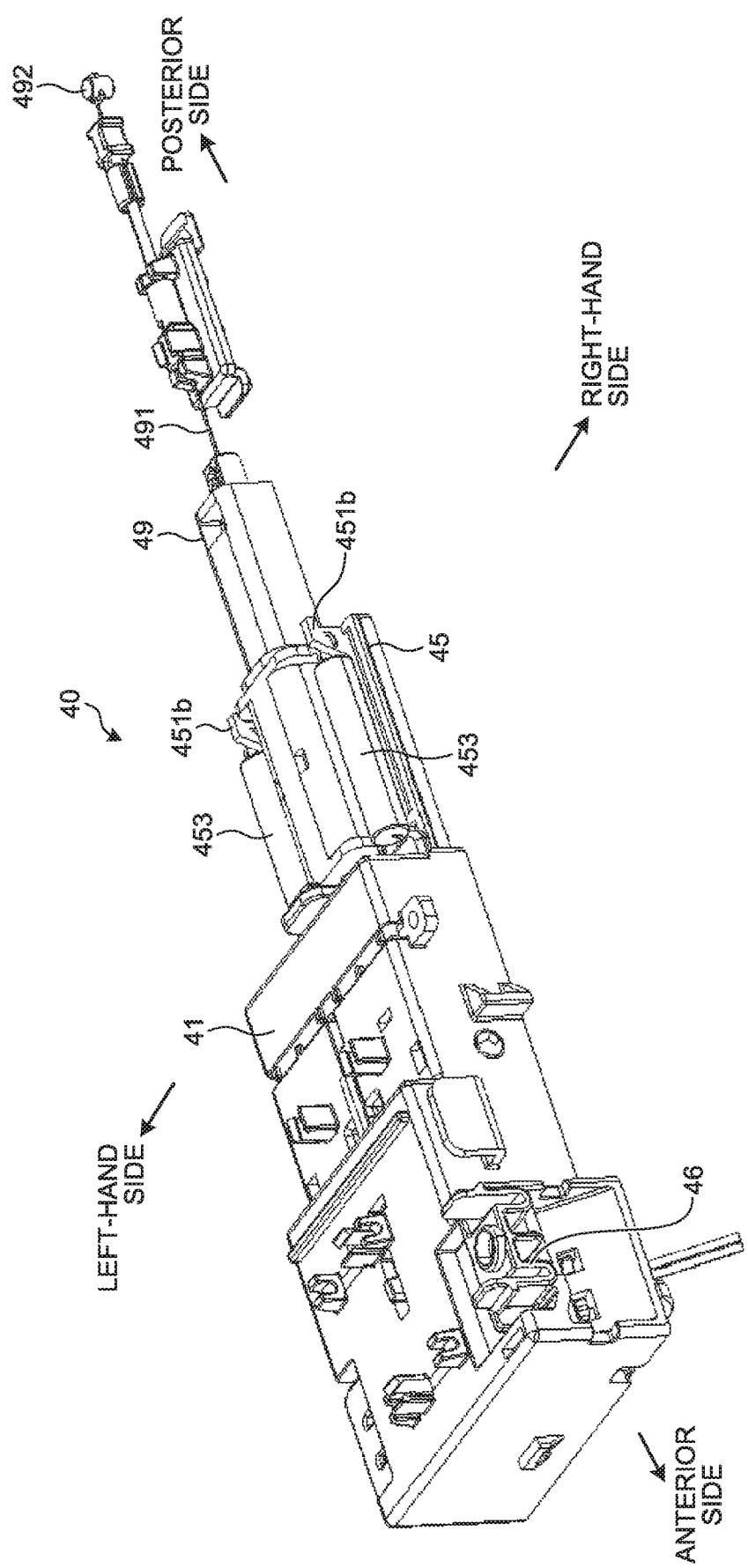
FIG. 7 is a perspective view of a take-out mechanism illustrated in FIGS. 3 and 4.
Figure 8:
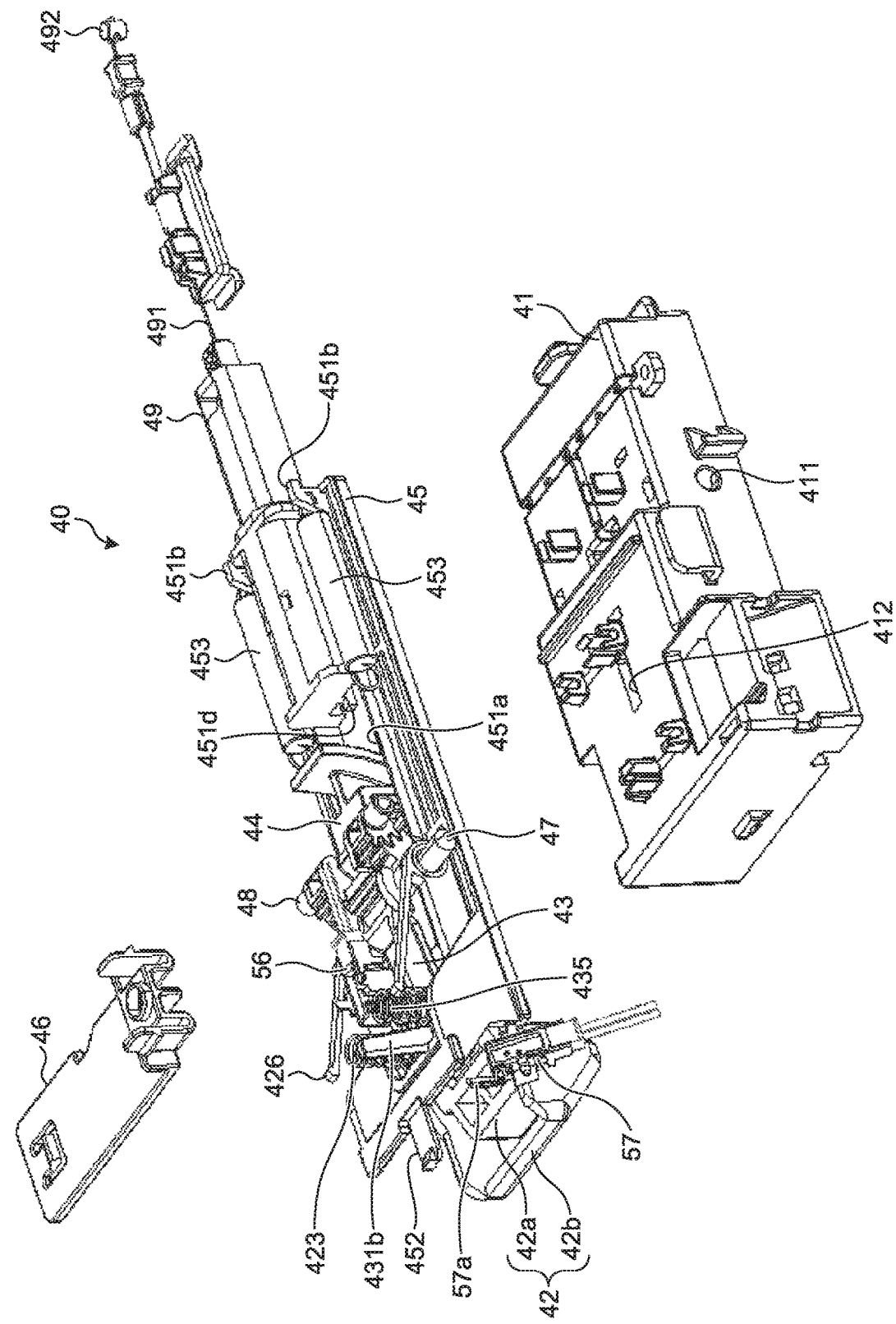
FIG. 8 is an exploded perspective view of the take-out mechanism illustrated in FIGS. 3 and 4.

FIGS. 7 and 8 are diagrams illustrating the take-out mechanism 40 illustrated in FIGS. 3 and 4. FIG. 7 is a perspective view, and FIG. 8 is an exploded perspective view. On the top face of the rail base portion 311 of the rail main body 31 of the rail member 30, the large portion of the take-out mechanism 40 is covered by a cover 41. As illustrated in FIGS. 7 and 8, the take-out mechanism 40 includes a main gate 42, a lever 43, the sub-gate 44, a sliding member 45, and a switching member 46.

The main gate 42 includes the first main gate 42a and a second main gate 42b.

Figure 9:
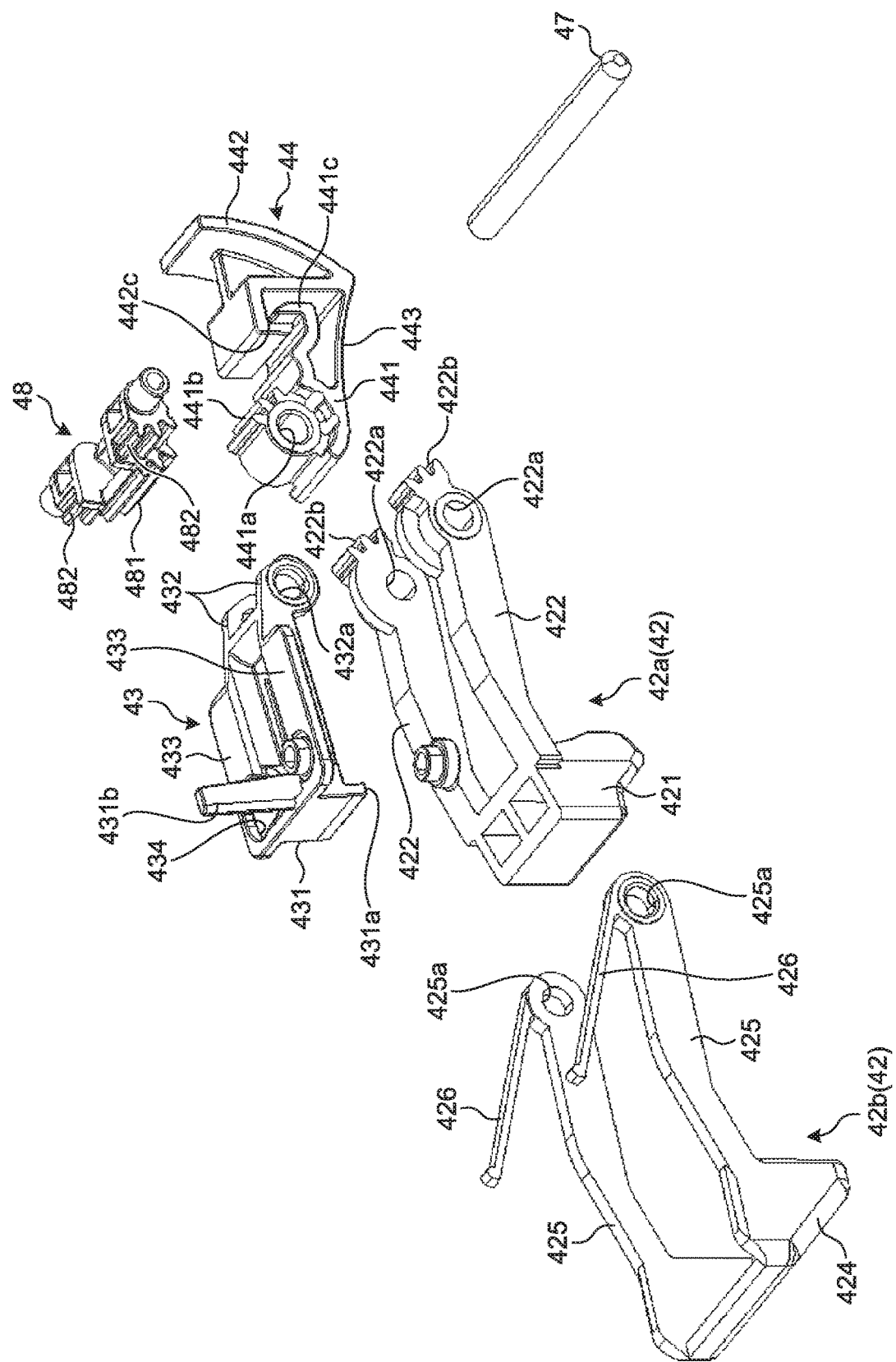
FIG. 9 is an exploded perspective view of some constituent elements of the take-out mechanism illustrated in FIGS. 7 and 8.

As illustrated in FIG. 9, the first main gate 42a is made of, for example, a resin material and includes a first leading end portion 421 and first arm members 422. The first leading end portion 421 is positioned on the anterior side. The first arm members 422 form a right-left pair extending backward from the upper part of the both ends on the right and left sides in the rear end portion of the first leading end portion 421. In each first arm member 422, a first shaft hole 422a is formed at the rear end portion; and a first gear unit 422b is disposed at the rear edge portion of the first shaft hole 422a.

When a rod-like shaft 47 having the right-left direction as the axial direction is inserted through the first shaft hole 422a of each first arm member 422, the first main gate 42a swings around the central axis of the shaft 47. Herein, both ends on the right and left sides of the shaft 47 are inserted through and supported by bearing holes 411 formed on the cover 41.

On the first arm member 422 on the left-hand side of the first main gate 42a, one end of a gate spring 423 is locked. The other end of the gate spring 423 is locked on the top face on the inside of the cover 41. With that, the first main gate 42a is swingably disposed in such a way that the first leading end portion 421 advances to and moves away from the product storage column 30a through the opening formed in the rail base portion 311. In the normal state in which only the biasing force of the gate spring 423 is exerted, the first leading end portion 421 advances to the product storage column 30a.

As illustrated in FIG. 9, the second main gate 42b is made of, for example, a resin material and includes a second leading end portion 424 and second arm members 425. The second leading end portion 424 is positioned on the anterior side, and the length thereof in the right-left direction is greater than the length in the right-left direction of the first leading end portion 421 of the first main gate 42a.

The second arm members 425 form a right-left pair extending backward from the upper part of the both ends on the right and left sides in the rear end portion of the second leading end portion 424. The length of extension in the front-back direction of the second arm members 425 is greater than the length of extension in the front-back direction of the first arm members 422, and each second arm member 425 has a second shaft hole 425a formed thereon at the rear end portion. The width between the second arm members 425 is greater than the width between the first arm members 422. In the rear edge portion of each second arm member 425, a second locking member 426 is provided in the upper edge portion constituting the second shaft hole 425a. Each second locking member 426 extends from the upper edge portion at a gradually-upward slant toward the anterior side.

In the state in which the second arm members 425 are positioned on the outside of the first arm members 422, when the rod-like shaft 47 is inserted through the second shaft holes 425a, the second main gate 42b swings around the central axis of the shaft 47. Subsequently, when the leading end portion of the second locking members 426 of the second main gate 42b is in contact with the top face on the inside of the cover 41, the second leading end portion 424 of the second main gate 42b advances to the product storage column 30a in the normal state due to the elastic restoration force of the second main gate 42b. Since the length of extension in the front-back direction of the second arm members 425 is greater than the length of extension in the front-back direction of the first arm members 422, the second leading end portion 424 of the second main gate 42b advances more to the anterior side than the first leading end portion 421 in the normal state.

As illustrated in FIG. 9, the lever 43 is made of, for example, a resin material and includes a lever base portion 431, lever arm members 432, and lever fin members 433. The lever base portion 431 has a smaller right-left width than the right-left width between the first arm members 422, and has a lever locking piece 431a disposed at the leading end portion thereof. The lever locking piece 431a protrudes downward from the leading end portion of the lever base portion 431. Moreover, a lever projection 431b is formed at the leading end portion of the upper part of the lever base portion 431. The lever projection 431b protrudes upward, and the extending end portion thereof passes through a hole 412 formed on the cover 41 and protrudes above the cover 41.

The lever arm members 432 form a right-left pair extending from the both ends on the right and left sides in the rear end portion of the lever base portion 431. In each lever arm member 432, a lever shaft hole 432a is formed at the rear end portion. The width between the lever arm members 432 is smaller than the width between the first arm members 422.

When the shaft 47 is inserted through the lever shaft holes 432a of the lever arm members 432 in between the first arm members 422, the lever 43 swings around the central axis of the shaft 47.

The lever fin members 433 are a pair of right-left tabular members disposed at the both ends on the right and left sides of the lever base portion 431. One of the lever fin members 433 protrudes leftward from the left-side end of the upper part of the lever base portion 431, and the other lever base portion 431 protrudes rightward from the right-side end of the upper part of the lever base portion 431.

In the lever 43, on some part of the left-hand lever fin member 433 and the lever base portion 431, a through hole 434 is formed through which the gate spring 423 passes. On the right-hand lever fin member 433, one end of a lever spring 435 is locked. The other end of the lever spring 435 is locked on the top face on the inside of the cover 41.

As a result, in the state in which the left-hand lever fin member 433 makes contact with the top face of the left-hand first arm member 422 and the right-hand lever fin member 433 makes contact with the right-hand first arm member 422, the leading end portion of the lever 43 is constantly biased in the downward direction.

As illustrated in FIG. 9, the sub-gate 44 is made of, for example, a resin member, and includes a sub-gate leading end portion 441 and a sub-gate rear end portion 442.

The sub-gate leading end portion 441 has a smaller right-left width than the right-left width between the lever arm members 432. In the sub-gate leading end portion 441, a sub-gate shaft hole 441a is formed. Moreover, a sub-gate gear unit 441b is disposed in the upper edge portion of the sub-gate shaft hole 441a.

When the shaft 47 is inserted through the sub-gate shaft hole 441a in between the lever arm members 432, the sub-gate 44 swings around the central axis of the shaft 47.

The sub-gate gear unit 441b of the sub-gate 44 engages with a first linkage gear unit 481 of a linking member 48 that is disposed on the cover 41 in a swingable manner around the shaft center of its own shaft. In the linking member 48, the right-left direction serves as the longitudinal direction, and second linkage gear units 482 are disposed on the both ends on the right and left sides of the first linkage gear unit 481. The second linkage gear units 482 engage with the first gear unit 422b of the first main gate 42a.

Thus, the sub-gate 44 is linked to the first main gate 42a via the linking member 48. When (the first leading end portion 421 of) the first main gate 42a advances to the product storage column 30a, the sub-gate rear end portion 442 moves away from the product storage column 30a through the opening formed on the rail base portion 311. On the other hand, when (the first leading end portion 421 of) the first main gate 42a moves away from the product storage column 30a, the sub-gate rear end portion 442 advances to the product storage column 30a through the opening formed on the rail base portion 311.

Meanwhile, in the sub-gate 44, in the state in which a leading end hook portion 441c formed at the upper end of the rear end portion of the sub-gate leading end portion 441 and a rear end hook portion 442c formed at the upper end of the anterior end portion of the sub-gate rear end portion 442 are separated from each other, the sub-gate leading end portion 441 and the sub-gate rear end portion 442 are coupled with each other in the lower end portions thereof by a tabular sub-gate linking portion 443.

Figure 10:
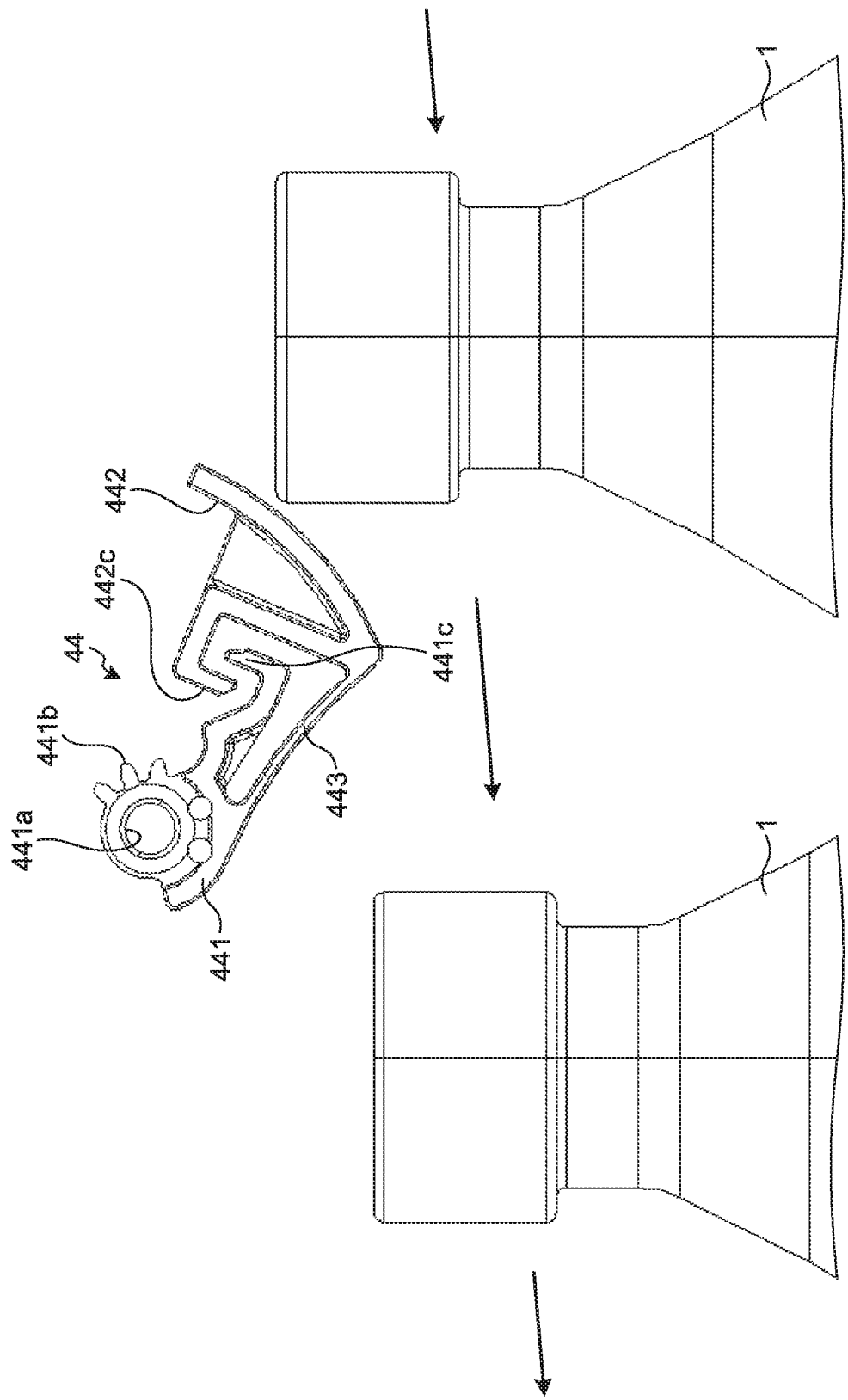
FIG. 10 is an explanatory diagram illustrating the characteristics of a sub-gate illustrated in FIG. 9.

Hence, as illustrated in FIG. 10, in the state in which the sub-gate rear end portion 442 has advanced to the product storage column 30a, if the sub-gate 44 is in contact with the product 1 from the posterior side, the leading end hook portion 441c and the rear end hook portion 442c undergo elastic deformation to contact with each other and thus regulate the product 1 from moving in the anterior direction.

Figure 11:
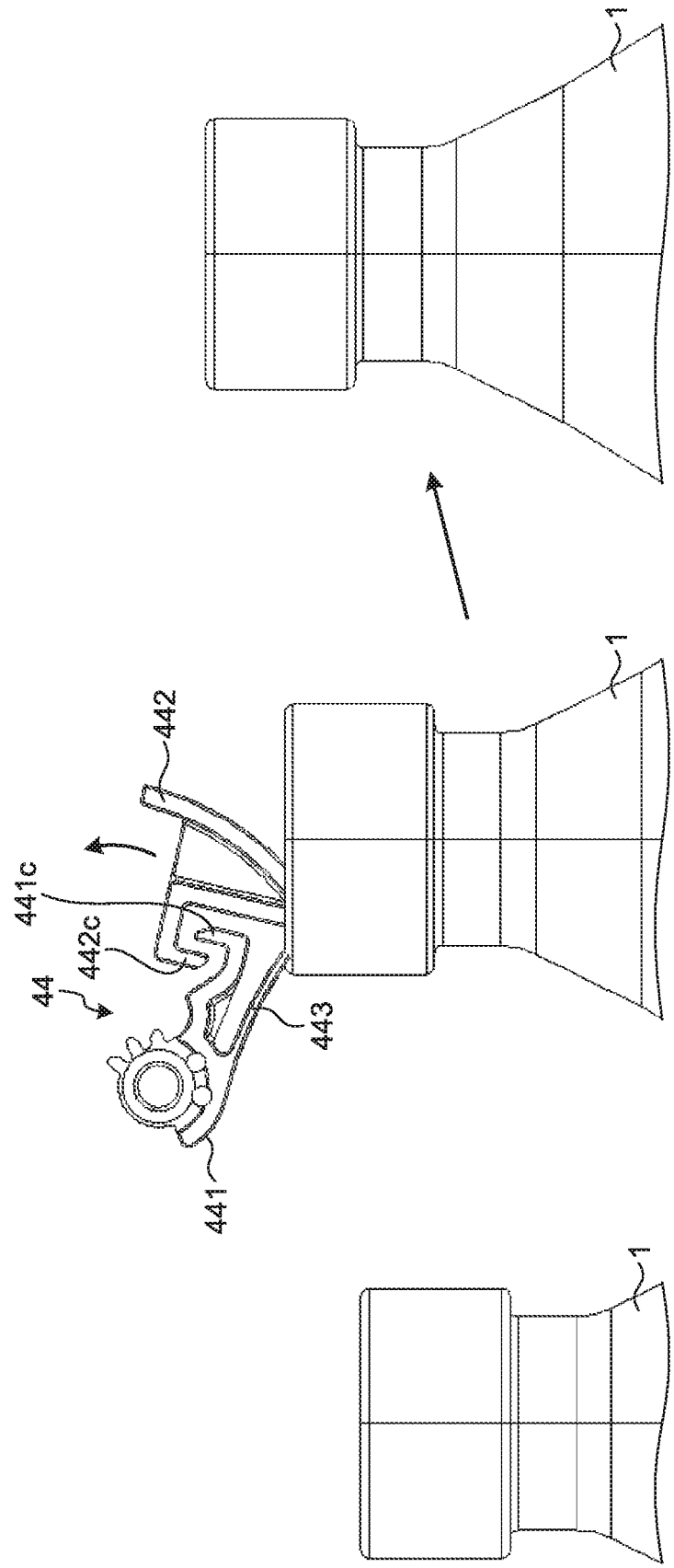
FIG. 11 is another explanatory diagram illustrating the characteristics of a sub-gate illustrated in FIG. 9.

On the other hand, as illustrated in FIG. 11, in the state in which the sub-gate rear end portion 442 has advanced to the product storage column 30a, if the sub-gate 44 is in contact with the product 1 from the anterior side, the sub-gate rear end portion 442 undergoes elastic deformation in the upward direction so that the rear end hook portion 442c further moves away from the leading end hook portion 441c. That allows the product 1 to move in the posterior direction.

Figure 12:
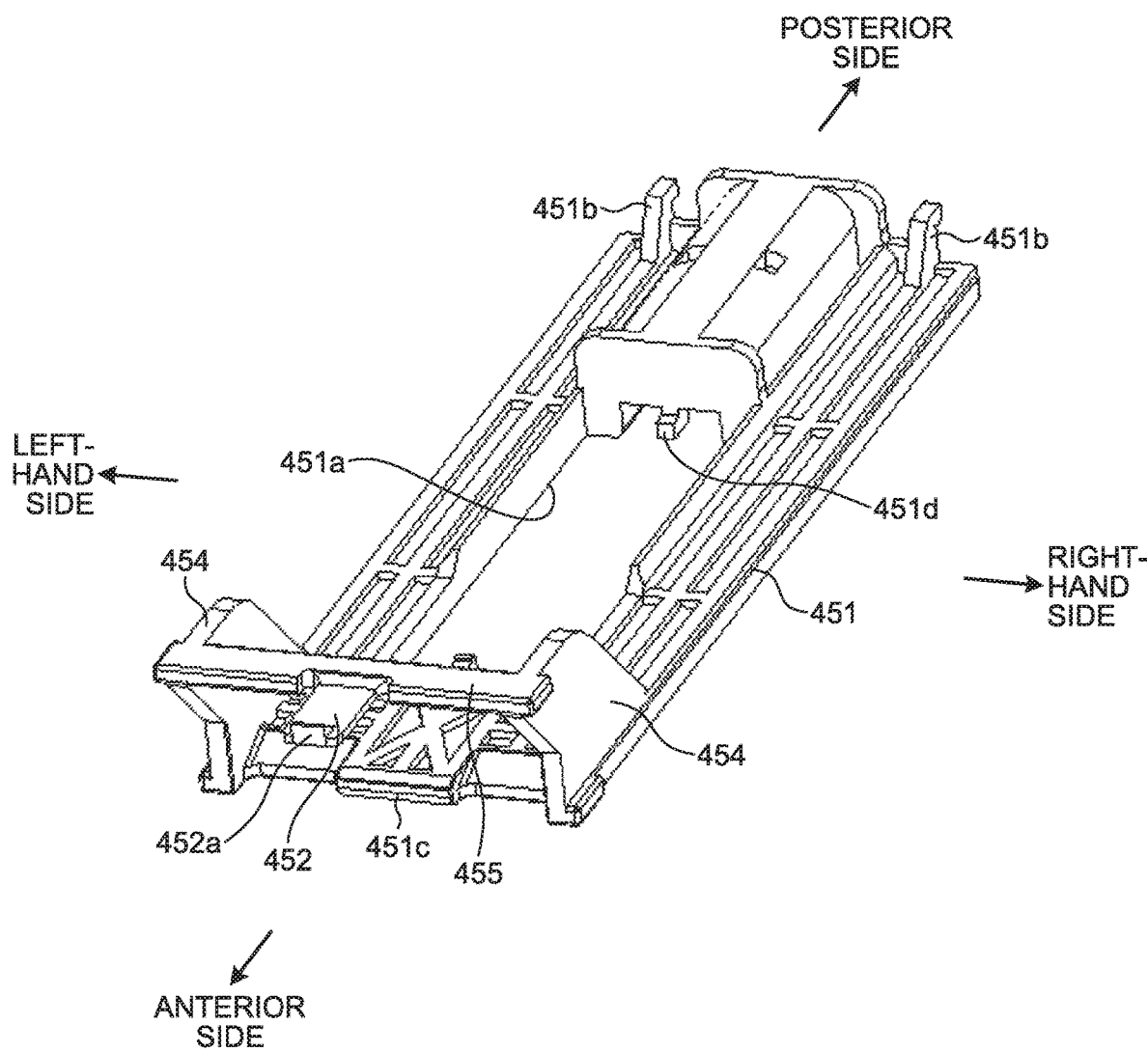
FIG. 12 is a perspective view of a sliding member illustrated in FIGS. 7 and 8.

FIG. 12 is a perspective view of the sliding member 45 illustrated in FIGS. 7 and 8. The sliding member 45 is made of, for example, a resin material, and is disposed to be slidable along the front-back direction (the direction of storing the products 1 in the product storage column 30a) with some part thereof remaining exposed from the cover 41. The sliding member 45 includes a sliding base portion 451 and a sliding locking portion 452.

The sliding base portion 451 is substantially tabular in shape and has an opening 451a formed thereon for allowing the entry of the sub-gate 44. In the rear end portion at the both ends on the right and left sides of the sliding base portion 451, first spring locking members 451b are disposed that protrude in the upward direction. Herein, first sliding springs 453 that have one end thereof locked to the rear face of the cover 41 have the other end thereof locked to the first spring locking members 451b. Due to the first sliding springs 453, the sliding member 45 is constantly biased in the anterior direction.

In the middle part of the anterior end portion of the sliding base portion 451, a sliding projection 451c is formed that protrudes in the anterior direction. Moreover, in the lower middle part of the rear end portion of the sliding base portion 451, a second spring locking member 451d is disposed. Herein, a second sliding spring (not illustrated) having one end thereof locked to a coupling member 49 has the other end thereof locked to the second spring locking member 451d. The coupling member 49 is slidable along the front-back direction to move close to and separate from the sliding member 45, and is constantly biased in the anterior direction by the second sliding spring. Herein, a first driving cable 491, whose one end has a coupling tool 492 attached thereto, has the other end thereof attached to the rear end portion of the coupling member 49. To the coupling tool 492 of the first driving cable 491 is coupled a wire cable that is connected to any one linking member 66 of the actuator 60 illustrated in FIG. 2. The explanation of the actuator 60 is given later.

The sliding locking portion 452 is disposed in the middle part of a sliding coupling member 455 that is used for coupling of sliding protruding plates 454 which are erected as a right-left pair on the top face of the anterior end portion of the sliding base portion 451. More specifically, the sliding locking portion 452 protrudes from the middle part of the sliding coupling member 455 in the anterior direction, and has an upwardly-protruding sliding locking projection 452a formed on the leading end portion thereof.

Figure 13:
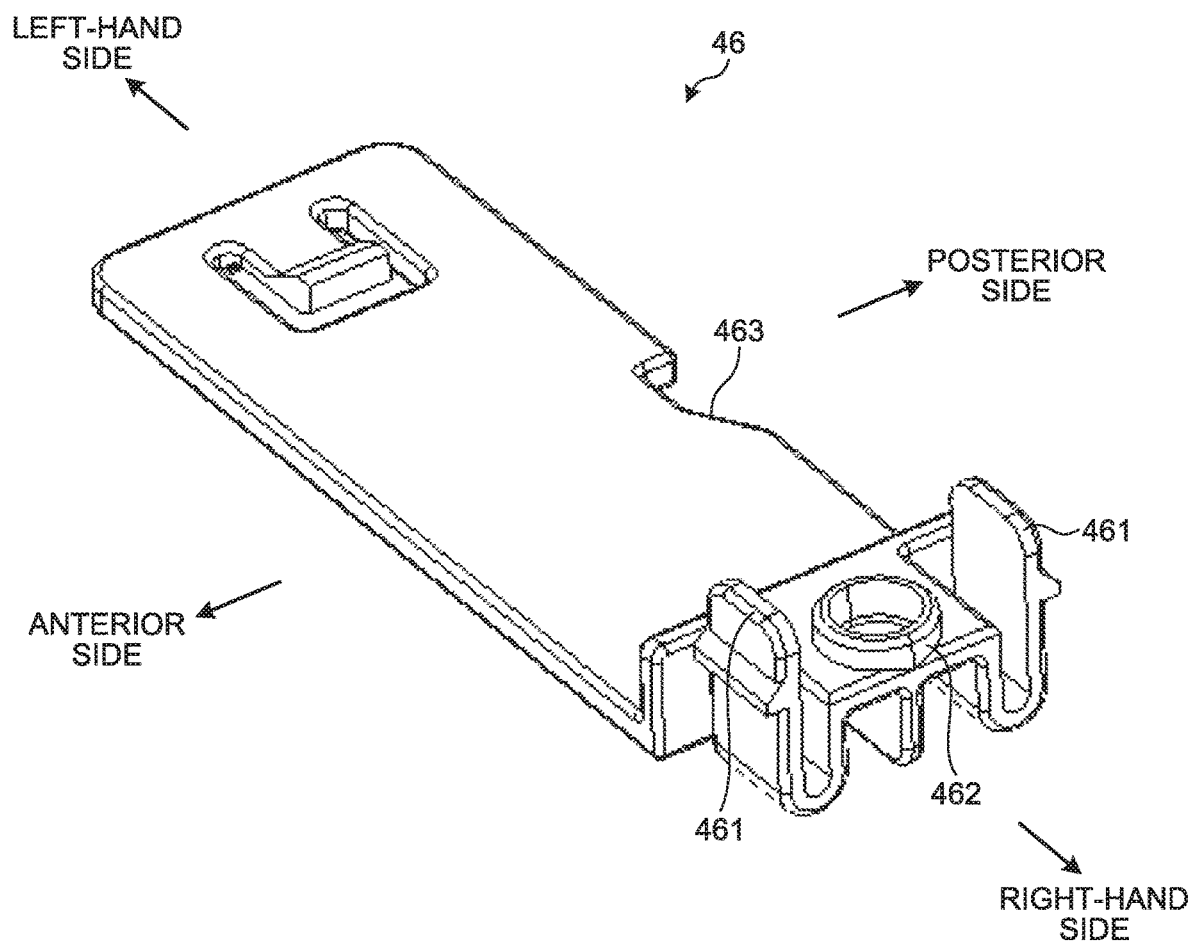
FIG. 13 is a perspective view of a switching member, which is illustrated in FIGS. 7 and 8, when viewed from the top right.
Figure 14:
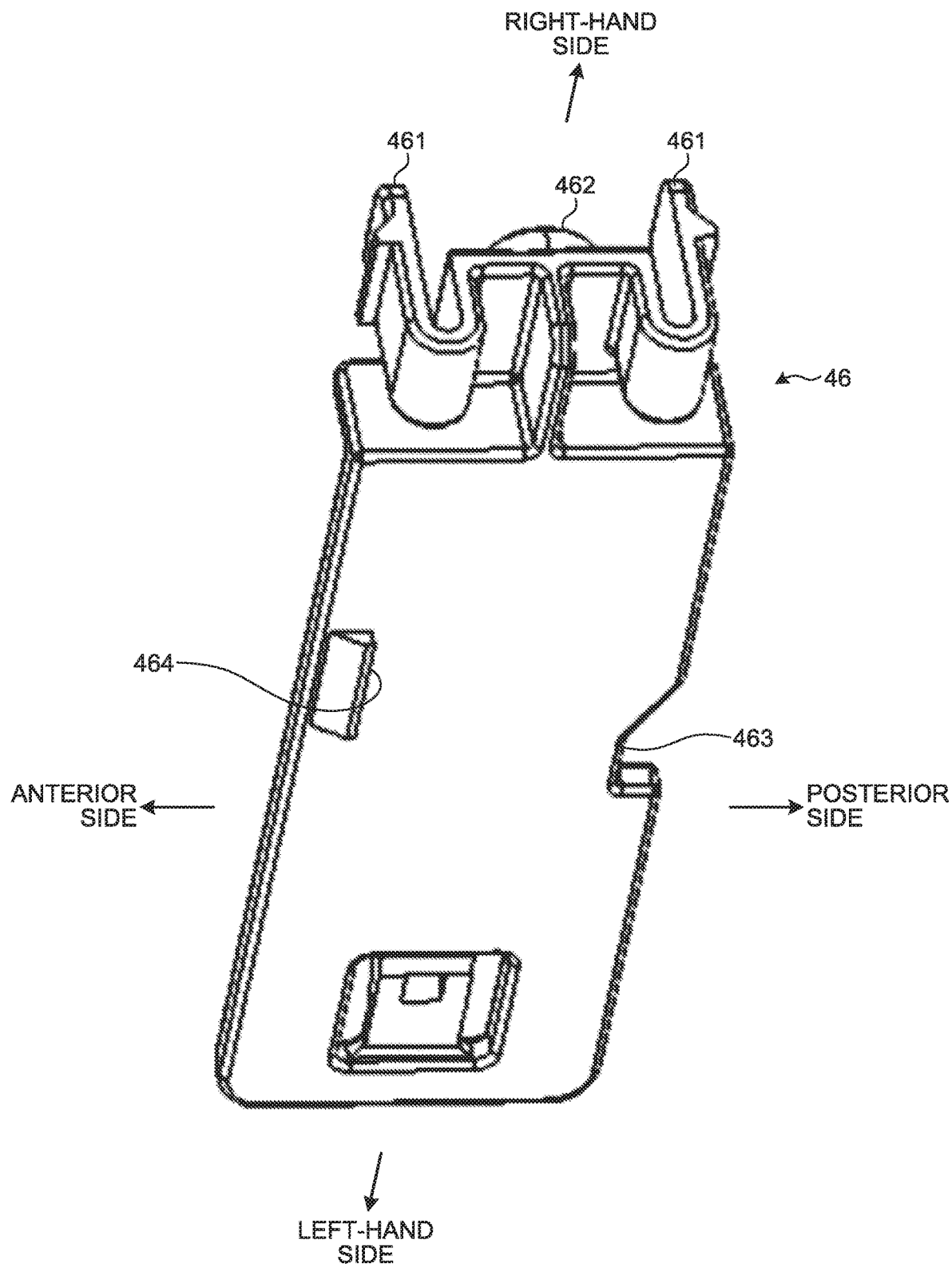
FIG. 14 is a perspective view of the switching member, which is illustrated in FIGS. 7 and 8, when viewed from the bottom right.

FIGS. 13 and 14 are diagrams illustrating the switching member 46 illustrated in FIGS. 7 and 8. FIG. 13 is a perspective view when viewed from the top right, and FIG. 14 is a perspective view when viewed from the bottom right.

The switching member 46 is made of, for example, a resin material and is tabular in shape. When engagement protruding pieces 461 and an engagement protruding member 462, which are formed to protrude upward from the right-side end portion of the switching member 46, get inserted in and engage with an engagement hole 51 formed on a switching plate 50 that is placed above the cover 41, the switching member 46 becomes slidable along the right-left direction with some part thereof remaining exposed from the cover

41. The switching plate 50 is an elongated plate-like member having the right-left direction as the longitudinal direction and is disposed across the upper region of the covers 41 of a plurality of (six) product storage devices 20 constituting a single layer. The switching plate 50 slides along the right-left direction due to a switching drive mechanism 70 illustrated in FIG. 2. The explanation of the switching drive mechanism 70 is given later.

The switching member 46 has a notch 463 and a switching locking projection 464 formed thereon. The notch 463 is formed in the middle part of the rear end of the switching member 46. The switching locking projection 464 is formed on the leading end side of the bottom face of the switching member 46 and protrudes downward more on the right-hand side than the notch 463.

Figure 16:
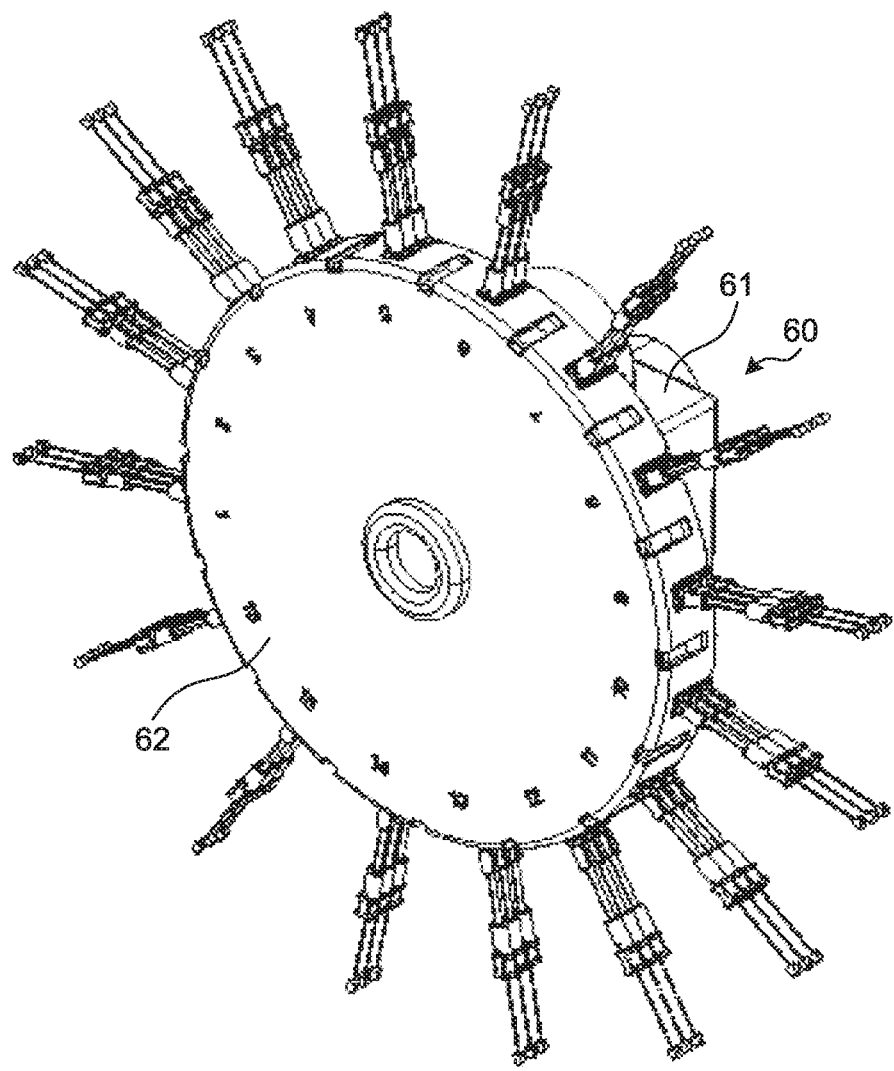
FIG. 16 is a perspective view of an actuator illustrated in FIG. 2.
Figure 17:
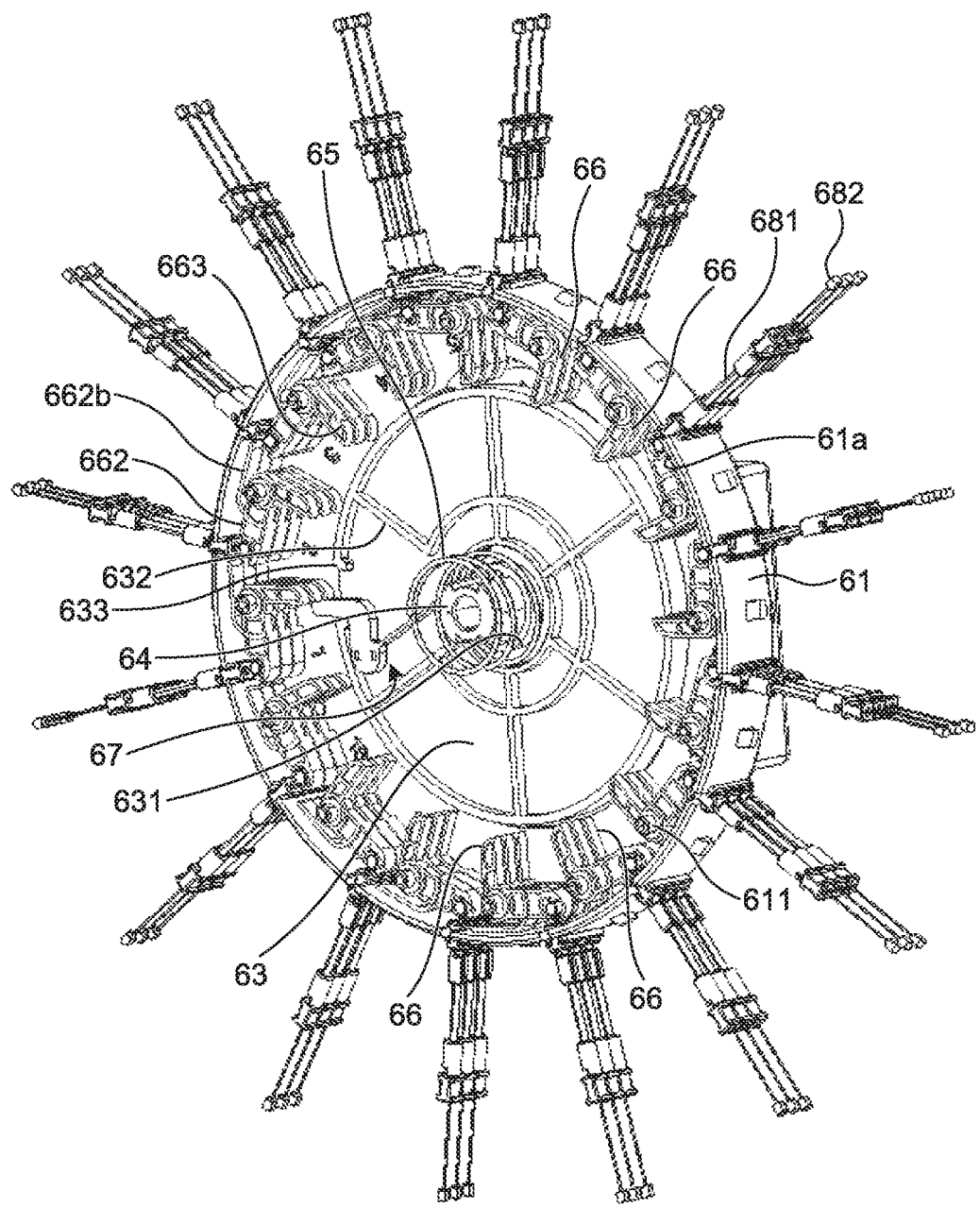
FIG. 17 is a perspective view of the internal structure of the actuator illustrated in FIG. 2.

Given below is the explanation of the actuator 60. FIGS. 16 and 17 are diagrams illustrating the actuator 60 illustrated in FIG. 2. FIG. 16 is a perspective view, and FIG. 17 is a perspective view of the internal structure. The actuator 60 is only exemplary in the embodiment and does not represent a main constituent element of the present disclosure. Hence, the explanation is given only in brief.

The actuator 60 is housed in the side cabinet 16, and includes a unit body 61. In the unit body 61, a unit opening 61a is formed on the left-side face and is blocked by a unit lid 62. Thus, the unit body 61 and the unit lid 62 constitute a housing. Inside the unit body 61 are arranged a rotating plate 63, the linking members 66, and a hook 67.

The rotating plate 63 is a discoid plate that is housed on the left-hand side of the unit body 61. In the central part of the rotating plate 63 is formed a through hole 631, through which passes a driving shaft 64 extending along the right-left direction. On the inner wall surface of the through hole 631, a salient portion (not illustrated) is formed that protrudes inward and that enters a shaft depression (not illustrated) formed on the outer periphery of the driving shaft 64 along the direction of extension of the driving shaft 64 (i.e., along the right-left direction).

When the driving shaft 64 rotates around the central axis thereof, the rotating plate 63 can rotate along with the driving shaft 64 and engage with the driving shaft 64 in a movable manner along the direction of extension of the driving shaft 64, that is, along the right-left direction. On the right-hand side of the unit body 61 are housed a rotary drive unit (not illustrated), which is used in rotating the driving shaft 64, and a movement drive unit (not illustrated), which is used in moving the rotating plate 63 to the left-hand side or the right-hand side. With reference to FIG. 17, a pressing spring 65 is disposed in between the unit lid 62 and the rotating plate 63. Due to its own elastic restoration force, the pressing spring 65 constantly presses the rotating plate 63 in the rightward direction.

In the actuator 60, the rotating plate 63 can be rotated in the clockwise direction or the counterclockwise direction using the rotary drive unit, and can be moved to three position levels (the left-side level, the middle level, and the right-side level) using the movement drive unit.

The linking members 66 are disposed at regular intervals in a circular fashion around the central axis of the driving shaft 64 (the central axis of the rotating plate 63) on the outside of the diameter of the rotating plate 63. When an insertion shaft 611 formed on the unit body 61 is inserted through an insertion hole 661 (see FIG. 18) formed on each linking member 66, the linking member 66 becomes swingable around the insertion shaft 611 as the shaft center. A single insertion shaft 611 is inserted in such a way that three linking members 66 are positioned at different position levels. Hence, the linking members 66 are disposed at three different position levels. That is, there are 16 linking members 66 disposed in a circumferential direction in such a way that there are three position levels corresponding to a single insertion shaft 611. Thus, a total of 48 linking members 66 are disposed.

Each linking member 66 includes a linking action portion 662 and a linking abutment portion 663. The linking action portion 662 extends in the radially outward direction of the insertion hole 661. More specifically, the linking action portion 662 extends toward to the neighboring linking member 66 present in the counterclockwise direction when viewed from the left-hand side of the linking member 66. In the extended end portion of the linking action portion 662, an action hole 662a is formed. Through the action hole 662a is attached one end of a second driving cable 681, whose other end is attached to a coupling tool 682.

The linking abutment portion 663 extends in the radially outward direction of the insertion hole 661. More specifically, the linking abutment portion 663 extends toward the central axis of the rotating plate 63. In the extended end portion of the linking abutment portion 663, the face approaching the linking action portion 662, which is formed on the corresponding linking member 66, is a planar surface and the opposite side of the linking abutment portion 663 is a curved surface.

As described above, there are 24 product storage devices 20 in all, and there are 48 linking members 66 in all. Hence, the coupling tools 682 of the second driving cables 681 that are attached to 16 linking members 66 at the left-side level and eight linking members 66 at the middle level are coupled with the coupling tools 492 of the first driving cables 491 as assigned in advance. Thus, the remaining eight linking members 66 at the middle level and the 16 linking members 66 at the right-side level are not coupled with the product storage devices 20.

The linking members 66 that are coupled with the product storage devices 20 via wire cables are in the standard posture in the normal state because of being biased by the first sliding springs 453. At that time, linking action pieces 662b disposed on the linking action portions 662 are in contact with the inner wall surface of the unit body 61.

The hook 67 is disposed on the rotating plate 63, and has a hook leading end portion 672 formed at the leading end portion of a hook base portion 671. Some part of the hook 67 is housed in a housing area 632 formed on the left-hand side face of the rotating plate 63, and the hook leading end portion 672 advances to the area on the outside of the diameter of the rotating plate 63. More specifically, the hook leading end portion 672 penetrates through an opened portion 633 formed on the wall of the rim constituting the housing area 632 and advances to the area on the outside of the diameter of the rotating plate 63, and is in contact with the edge on the side of the opened portion 633. In the hook leading end portion 672, the part approaching the planar surface of the linking abutment portion 663 of the corresponding linking member 66 is flat, and the part approaching the curved surface of the linking abutment portion 663 of the corresponding linking member 66 is curved.

Figure 18:
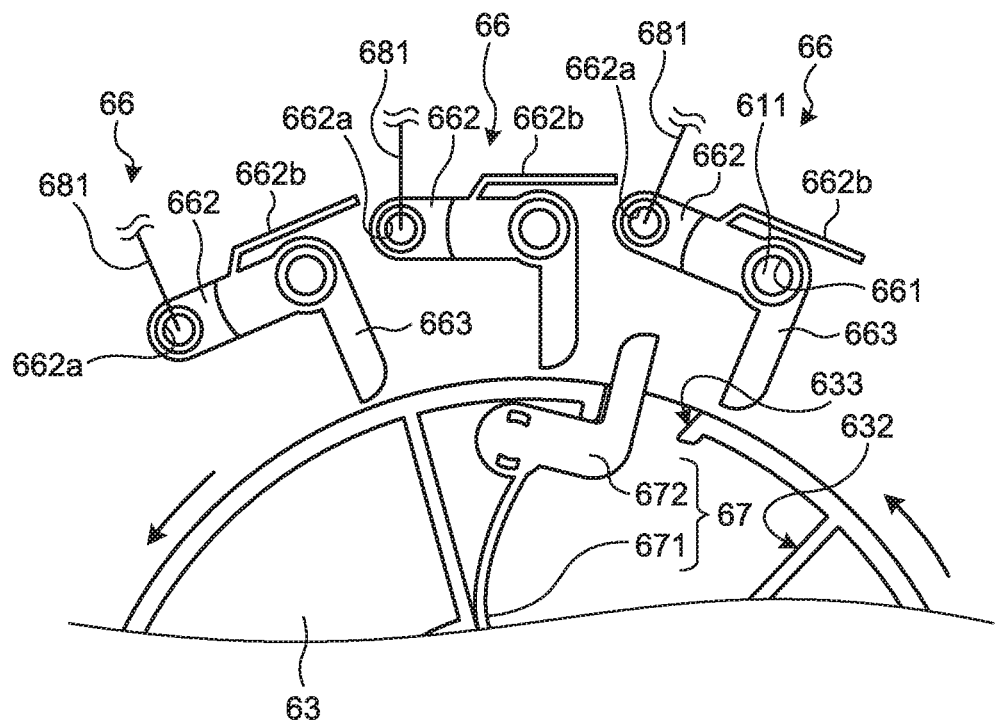
FIG. 18 is an explanatory diagram explaining the operations performed by the actuator illustrated in FIGS. 16 and 17.

Given below is the explanation of the operations performed by the actuator 60. As illustrated in FIG. 18, the middle linking member 66 from among the three linking members 66 is assumed to be the target linking member 66, and the hook leading end portion 672 is assumed to be at an intermediate position between the target linking member 66 and the neighboring linking member 66 present in the clockwise direction of the target linking member 66 when viewed from the left-hand side. Moreover, it is assumed that the rotating plate 63 is moving to the left-side level or the middle level by the movement drive unit.

Figure 19:
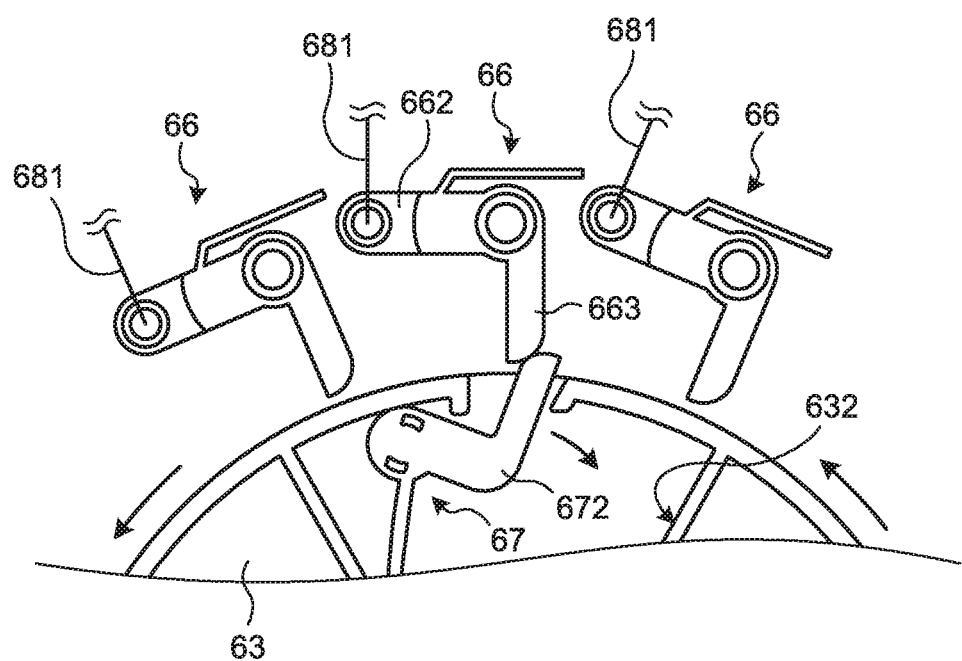
FIG. 19 is another explanatory diagram explaining the operations performed by the actuator illustrated in FIGS. 16 and 17.

From that state, when the rotating plate 63 is rotated in the counterclockwise direction due to the rotary drive unit, the hook leading end portion 672 of the hook 67 is in contact with the linking abutment portion 663 of the target linking member 66 in the standard posture. In that case, since the part of the hook leading end portion 672 which approaches the curved surface of the linking member 66 (the linking abutment portion 663) has a curved shape, the hook leading end portion 672 undergoes elastic deformation while making a sliding contact with the linking abutment portion 663 and rotates as illustrated in FIG. 19. Then, once the sliding contact with the linking abutment portion 663 is released, the hook leading end portion 672 rotationally moves due to the elastic restoration force of the hook base portion 671 and again abuts against the edge on one side of the opened portion 633.

When the hold leading end portion 672 moves to an intermediate position between the target linking member 66 and the neighboring linking member 66 present in the counterclockwise direction of the target linking member 66 when viewed from the left-hand side, the rotating plate 63 is rotated in the clockwise direction by the rotary drive unit as illustrated in FIG. 19.

Figure 20:
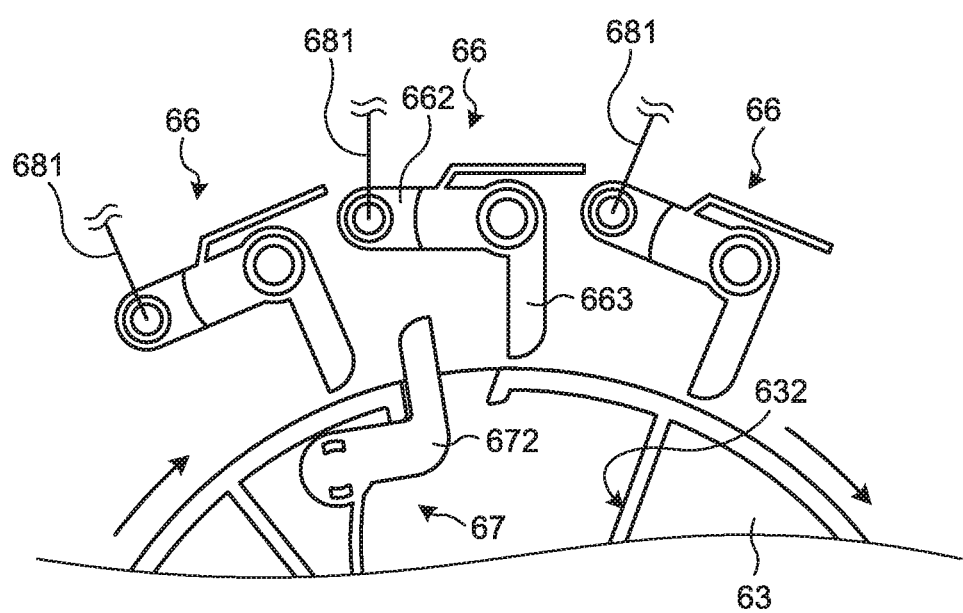
FIG. 20 is another explanatory diagram explaining the operations performed by the actuator illustrated in FIGS. 16 and 17.
Figure 21:
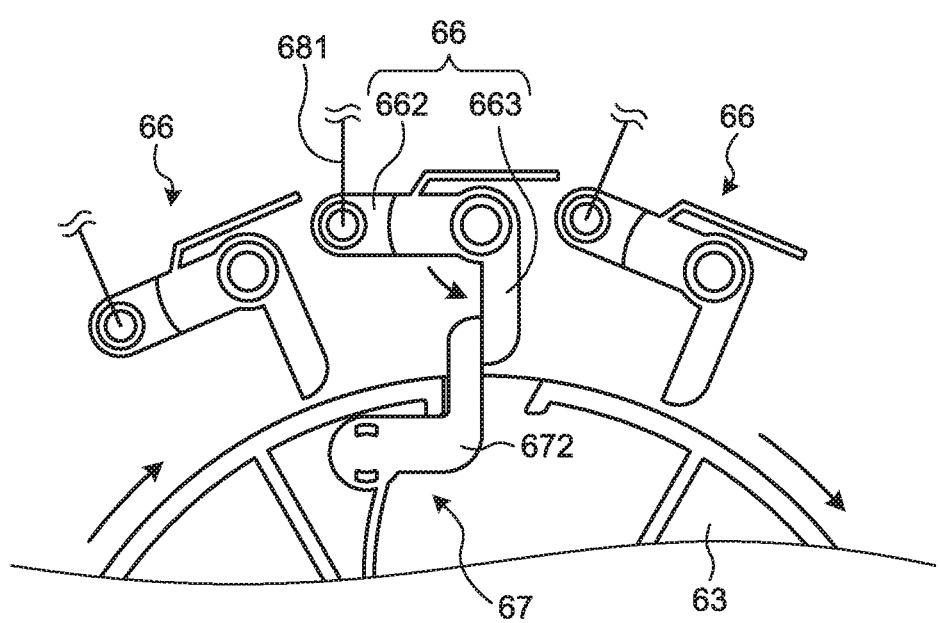
FIG. 21 is another explanatory diagram explaining the operations performed by the actuator illustrated in FIGS. 16 and 17.
Figure 22:
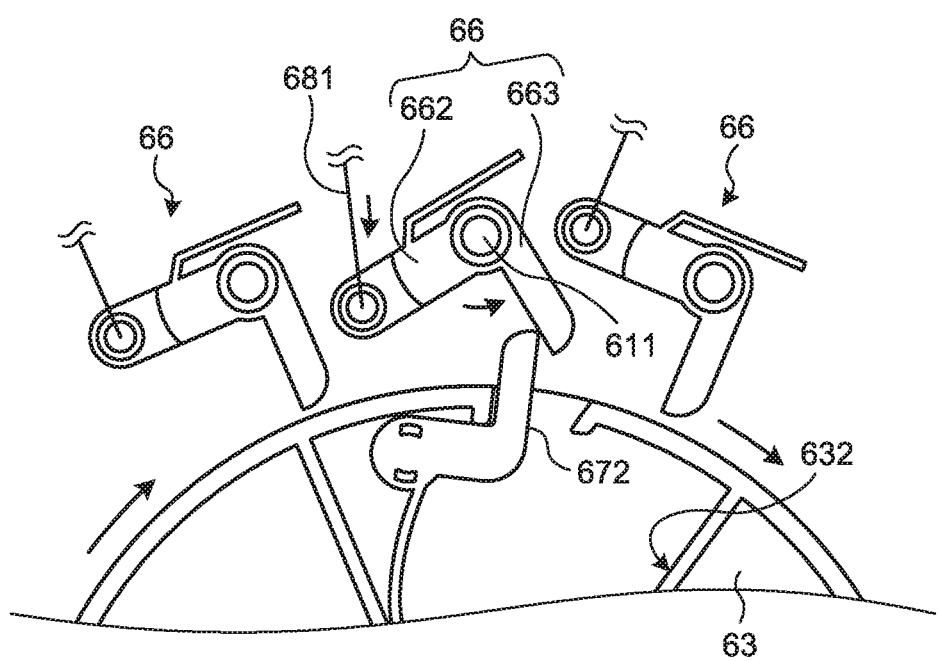
FIG. 22 is another explanatory diagram explaining the operations performed by the actuator illustrated in FIGS. 16 and 17.

In this way, when the rotating plate 63 rotates in the clockwise direction, the hook leading end portion 672 moves close to the target linking member 66, which is in the standard posture, as illustrated in FIG. 20. Subsequently, when the hook leading end portion 672 is in contact with the linking abutment portion 663 of the target linking member 66 as illustrated in FIG. 21, the target linking member 66 rotates in the counterclockwise direction around the shaft center of the insertion shaft 611, and a relay posture is achieved as illustrated in FIG. 22.

That is, in the actuator 60, in the case of switching the target linking member 66 from the standard posture to the relay posture, the rotating plate 63 is rotated in the counterclockwise direction when viewed from the left-hand side and is moved along the right-left direction up to the position level of the target linking member 66. Subsequently, after the hook leading end portion 672 makes a sliding contact with the linking abutment portion 663 of the target linking member 66, when the hook leading end portion 672 moves to an intermediate position between the target linking member 66 and the neighboring linking member 66 present in the counterclockwise direction of the target linking member 66 when viewed from the left-hand side, the rotating plate 63 is rotated in the clockwise direction when viewed from the left-hand side. As a result, the hook leading end portion 672 is in contact with the linking abutment portion 663 of the target linking member 66 in the standard posture, and can switch the target linking member 66 to the relay posture.

When the hook leading end portion 672, which has moved away from the target linking member 66 in the relay posture, moves to an intermediate position between the target linking member 66 and the neighboring linking member 66 present in the clockwise direction of the target linking member 66 when viewed from the left-hand side, the driving of the rotating plate 63 is stopped.

In the actuator 60, after the rotating plate 63 is moved up to the position level of the target linking member 66, except for the case of swinging the target linking member 66 from the standard posture to the relay posture, the rotating plate 63 is rotated in the counterclockwise direction when viewed from the left-hand side.

Meanwhile, when the linking member 66 switches to the relay posture, the wire cable coupled with the second driving cable 681 gets pulled and resultantly the first driving cable 491 gets pulled in the posterior direction.

Figure 23:
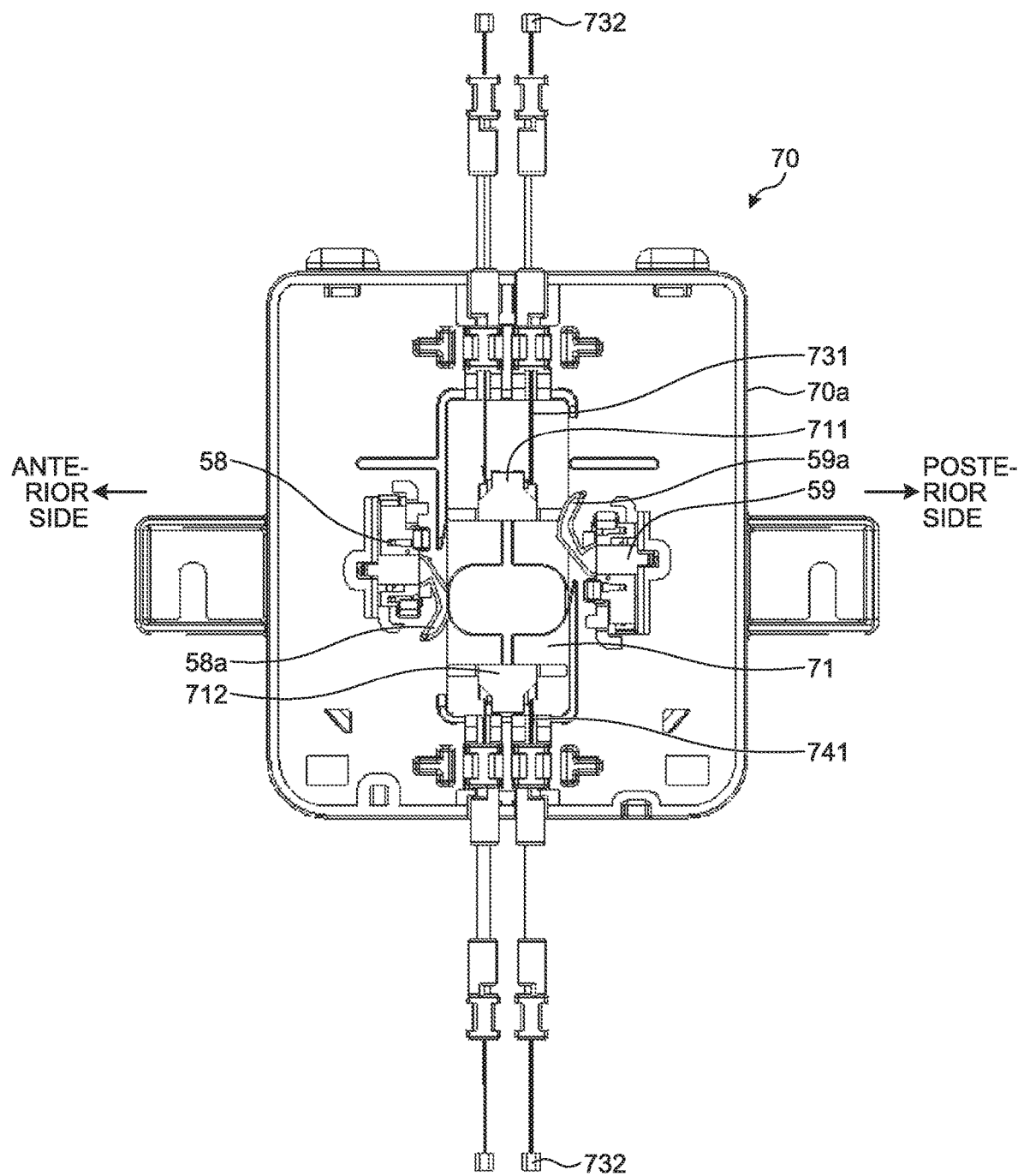
FIG. 23 is a lateral view, from the right-hand side, of a switching drive mechanism illustrated in FIG. 2.
Figure 24:
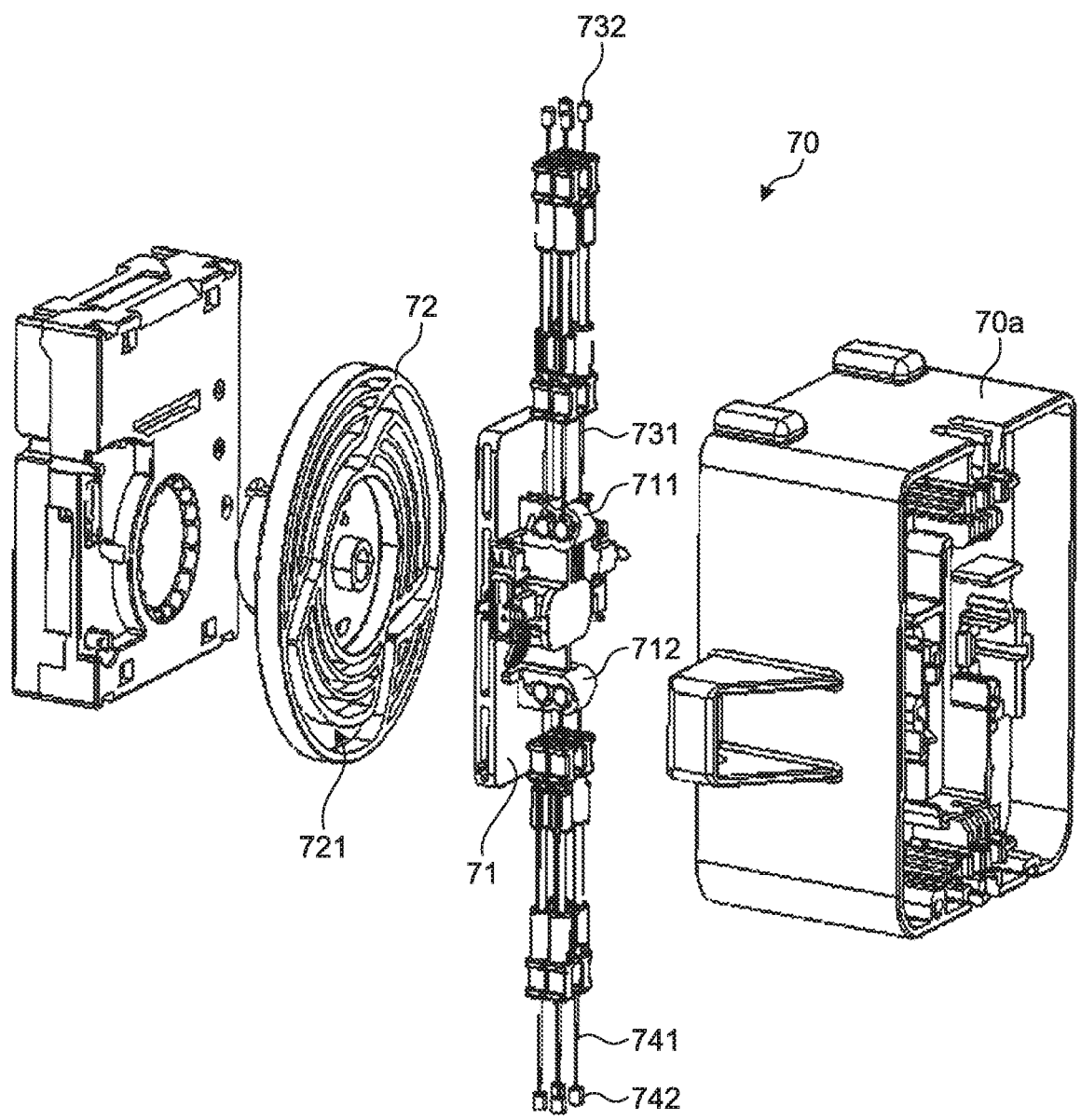
FIG. 24 is an exploded perspective view of the switching drive mechanism illustrated in FIG. 2.
Figure 25:
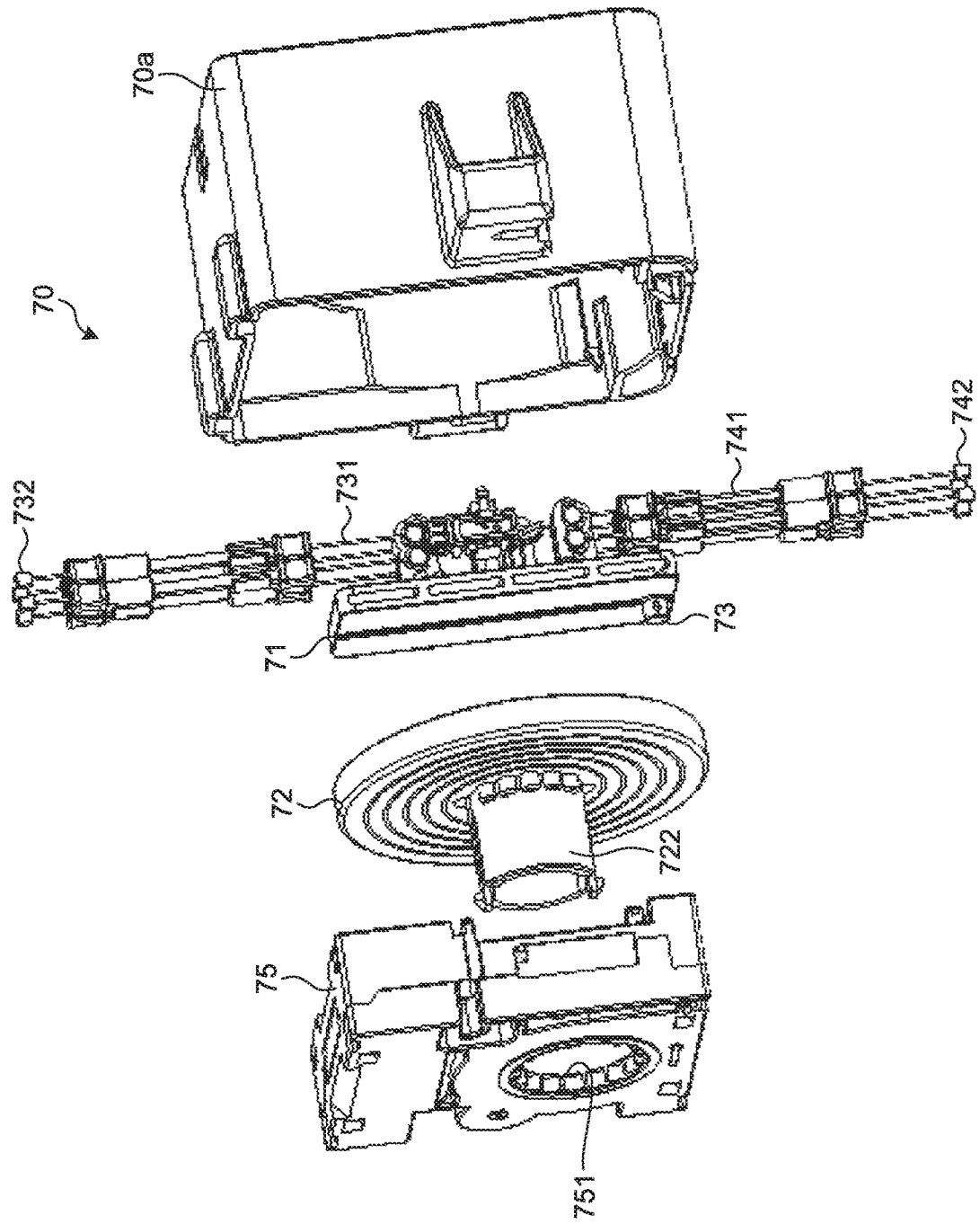
FIG. 25 is another exploded perspective view of the switching drive mechanism illustrated in FIG. 2.

Given below is the explanation about the switching drive mechanism 70. FIGS. 23 to 25 are diagrams illustrating the switching drive mechanism 70 illustrated in FIG. 2. FIG. 23 is a lateral view from the right-hand side, and FIGS. 24 and 25 are exploded perspective views. The switching drive mechanism 70 includes a switching slider 71 and a switching cam 72.

The switching slider 71 is a substantially tabular member having the vertical direction as the longitudinal direction, and is slidably disposed along the vertical direction inside a housing case 70a. On the right-hand face serving as the front face of the switching slider 71, a vendition coupling unit 711 and a restocking coupling unit 712 are disposed.

Figure 15:
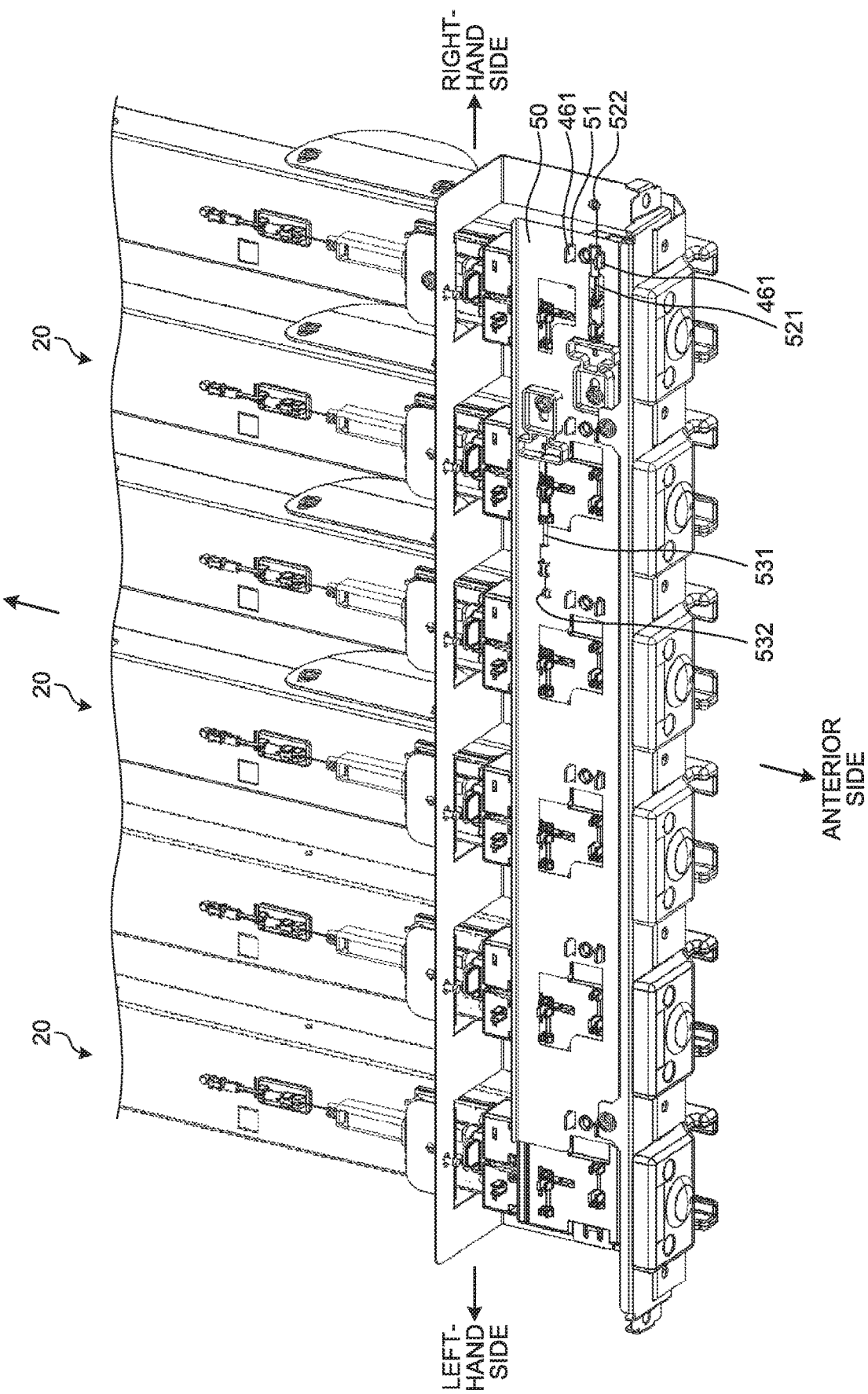
FIG. 15 is an enlarged perspective view of the anterior portion of the product storage devices constituting one of the layers illustrated in FIG. 2.

The vendition coupling unit 711 is disposed on the upper side of the switching slider 71, and has one end thereof coupled with one end of four first vendition-switching cables 731 whose other ends have coupling tools 732 attached thereto. The coupling tools 732 of the first vendition-switching cables 731 are coupled via wire cables with coupling tools 522 of second vendition-switching cables 521 attached to the switching plates 50 (see FIG. 15) that are disposed on a layer-by-layer basis.

The restocking coupling unit 712 is disposed on the lower side of the switching slider 71, and has one end thereof coupled with one end of four restocking-switching cables 741 whose other ends have coupling tools 742 attached thereto. The coupling tools 742 of the first restocking-switching cables 741 are coupled via wire cables with coupling tools 532 of second restocking-switching cables 531 attached to the switching plates 50 (see FIG. 15) that are disposed on a layer-by-layer basis.

The switching cam 72 is discoid in shape, has a cam groove 721 formed on the right-hand face representing the front face, and has a cylindrical projecting member 722 formed on the left-hand face representing the rear face. The cylindrical projecting member 722 protrudes leftward and has a first relaying portion formed on the outer periphery thereof. The cylindrical projecting member 722 passes through a through hole 751 of a switching drive unit 75 having a built-in drive motor, and a second relaying portion formed on the inner periphery of the through hole 751 engages with the first relaying portion. As a result, due to the switching drive unit 75, the switching cam 72 is rotated around the central axis thereof in the clockwise direction when viewed from the right-hand side.

Into the cam groove 721 of the switching cam 72 enters a columnar protrusion 713 that protrudes leftward from the lower side of the left-side face representing the rear face of the switching slider 71.

Figure 26:
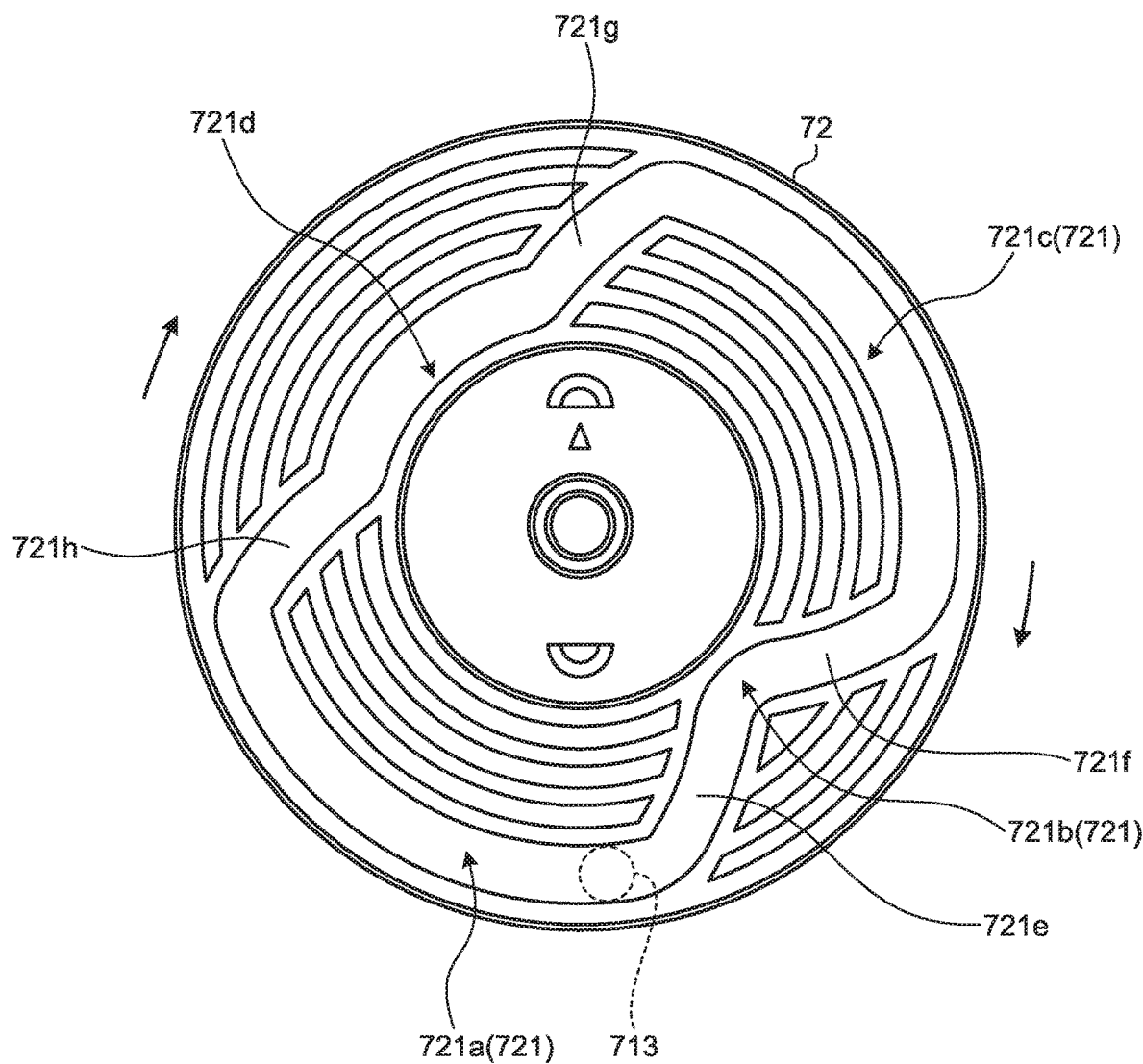
FIG. 26 is an explanatory diagram of a switching cam illustrated in FIGS. 24 and 25.

As illustrated in FIG. 26, the cam groove 721 of the switching cam 72 includes a first vendition position displacement portion 721a, a first restocking position displacement portion 721b, a second vendition position displacement portion 721c, and a second restocking position displacement portion 721d.

The first vendition position displacement portion 721a is provided in the portion close to the rim of the switching cam 72, and extends in an arc-like manner around the central axis of the switching cam 72.

The first restocking position displacement portion 721b is provided in the portion closer to the central axis of the switching cam 72 than the first vendition position displacement portion 721a, and is communicated with the first vendition position displacement portion 721a via a first switching portion 721e.

The second vendition position displacement portion 721c is concyclic to the first vendition position displacement portion 721a, and extends in an arc-like manner around the central axis of the switching cam 72. Moreover, the second vendition position displacement portion 721c is communicated with the first restocking position displacement portion 721b via a second switching portion 721f.

The second restocking position displacement portion 721d is concyclic to the first restocking position displacement portion 721b, and extends in an arc-like manner around the central axis of the switching cam 72. Moreover, the second restocking position displacement portion 721d is communicated with the second vendition position displacement portion 721c via a third switching portion 721g, and is communicated with the first vendition position displacement portion 721a via a fourth switching portion 721h.

As illustrated in FIG. 26, in the initial posture of the switching cam 72, the columnar protrusion 713 enters the first vendition position displacement portion 721a of the cam groove 721. When the columnar protrusion 713 has entered the first vendition position displacement portion 721a, the switching slider 71 slides downward and makes, via the wire cables, the switching plates 50, which are disposed at different layers, slide rightward.

Figure 27:
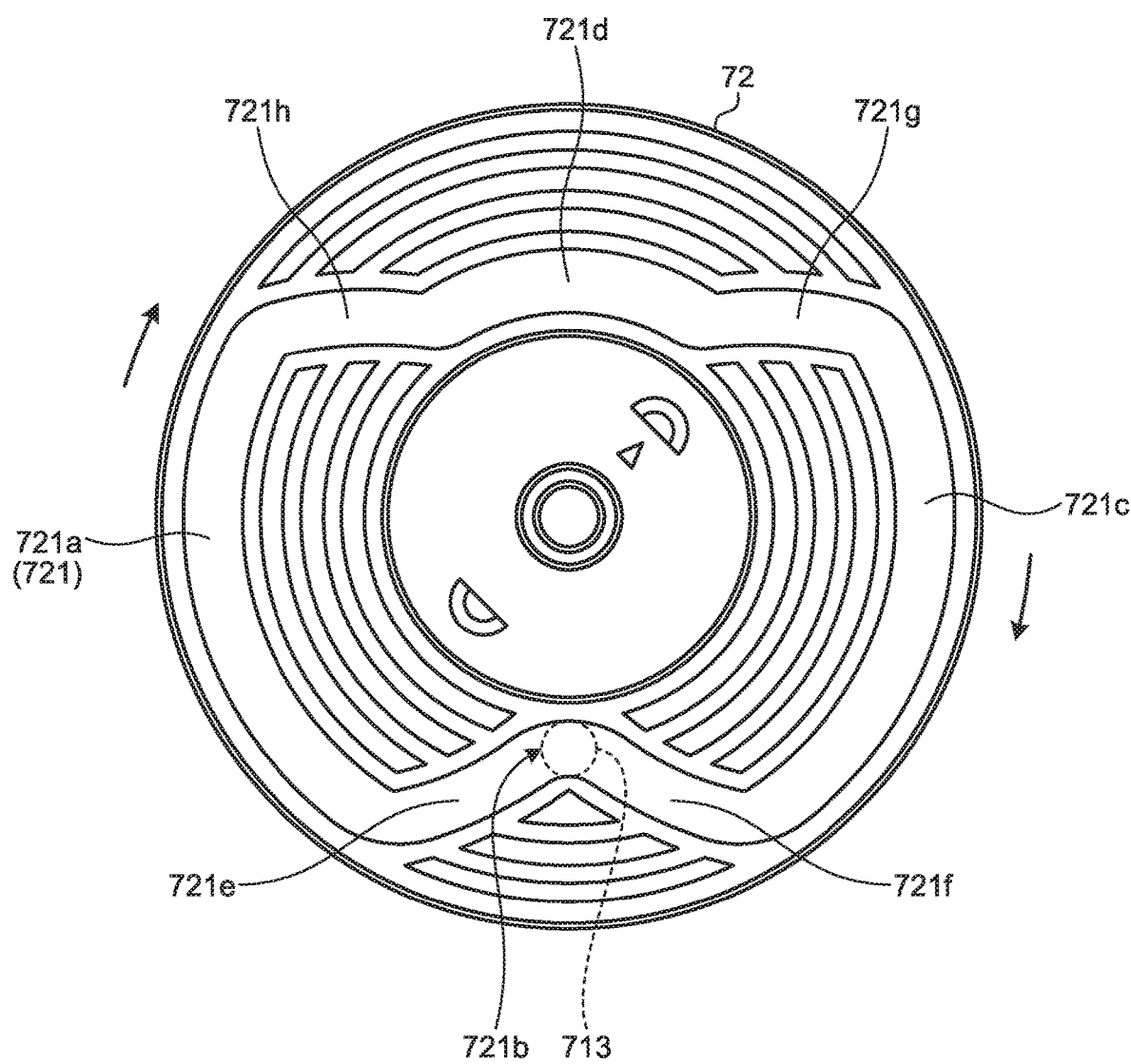
FIG. 27 is another explanatory diagram of a switching cam illustrated in FIGS. 24 and 25.

When the switching cam 72 continuously rotates in the clockwise direction when viewed from the right-hand side, the columnar protrusion 713 that was present in the first vendition position displacement portion 721a passes through the first switching portion 721e and enters the first restocking position displacement portion 721b as illustrated in FIG. 27. When the columnar protrusion 713 enters the first restocking position displacement portion 721b, the switching slider 71 slides upward and makes, via the wire cables, the switching plates 50, which are disposed at different layers, slide leftward.

Figure 28:
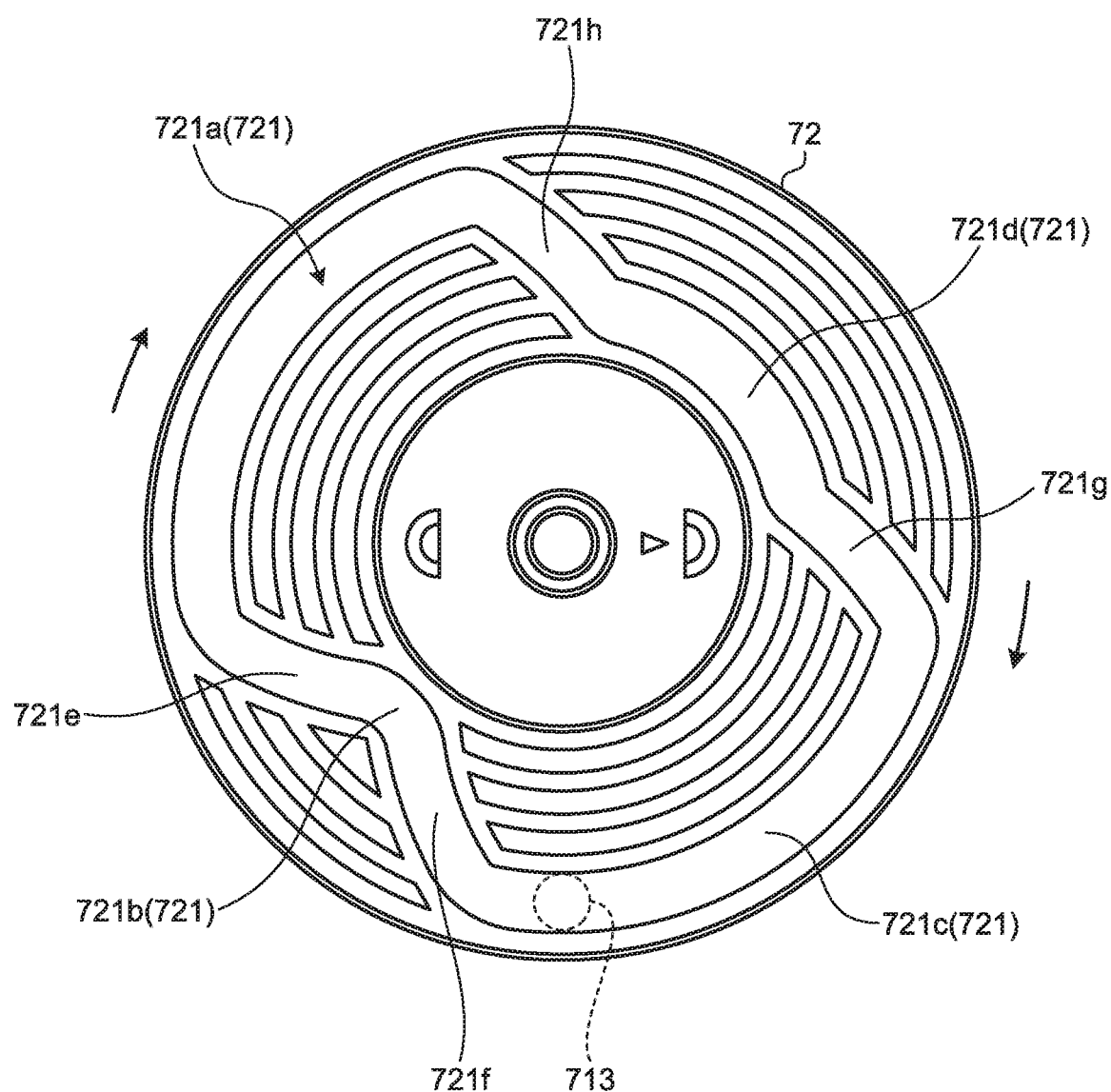
FIG. 28 is another explanatory diagram of a switching cam illustrated in FIGS. 24 and 25.

When the switching cam 72 continuously rotates in the clockwise direction when viewed from the right-hand side, the columnar protrusion 713 that was present in the first restocking position displacement portion 721b passes through the second switching portion 721f and enters the second vendition position displacement portion 721c as illustrated in FIG. 28. When the columnar protrusion 713 advances to the second vendition position displacement portion 721c, the switching slider 71 slides downward and makes, via the wire cables, the switching plates 50, which are disposed at different layers, slide rightward.

Figure 29:
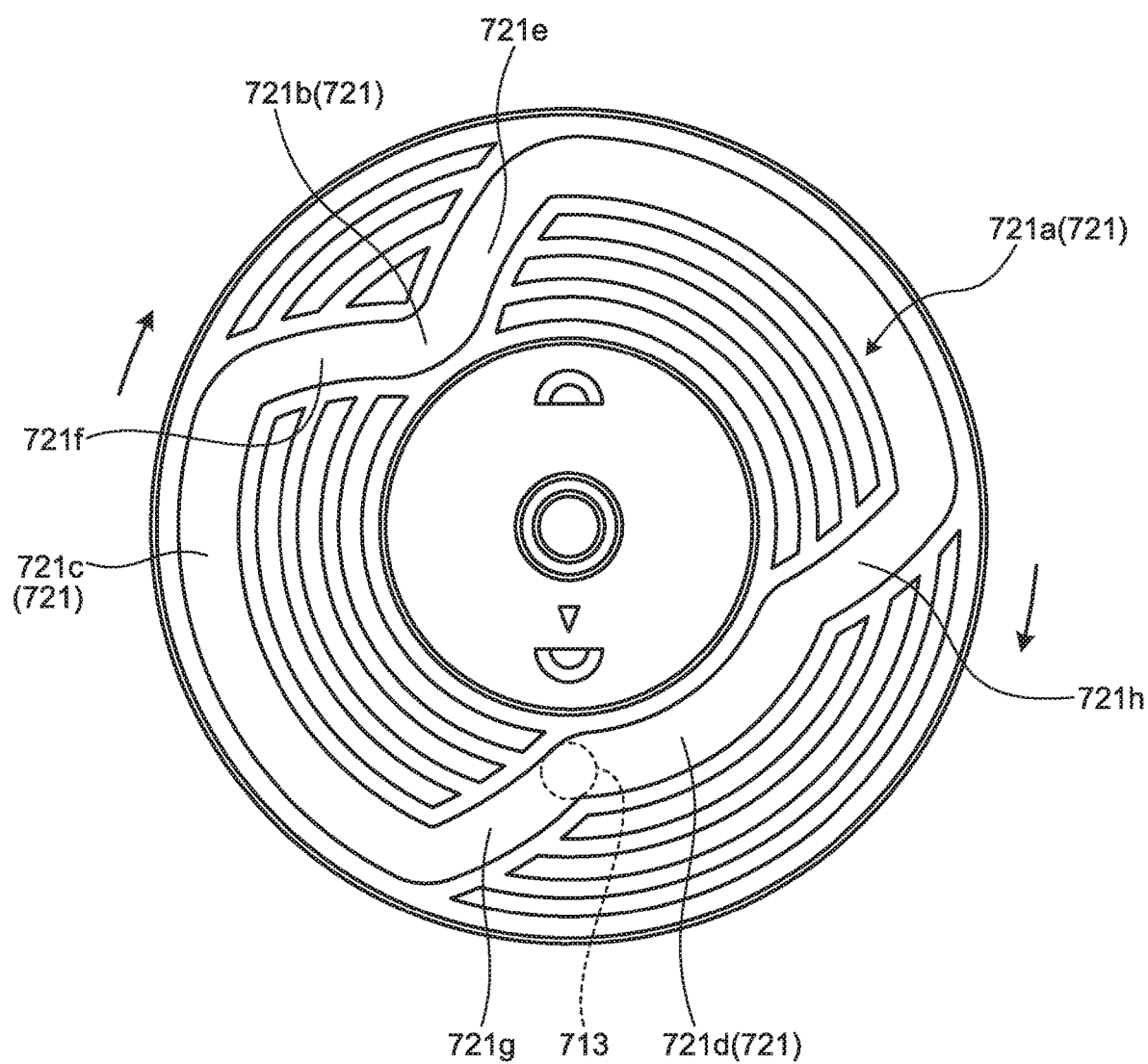
FIG. 29 is another explanatory diagram of a switching cam illustrated in FIGS. 24 and 25.

When the switching cam 72 continuously rotates in the clockwise direction when viewed from the right-hand side, the columnar protrusion 713 that was present in the second vendition position displacement portion 721c passes through the third switching portion 721g and enters the second restocking position displacement portion 721d as illustrated in FIG. 29. When the columnar protrusion 713 advances to the second restocking position displacement portion 721d, the switching slider 71 slides upward and makes, via the wire cables, the switching plates 50 disposed at different layers slide leftward. Subsequently, the switching cam 72 rotates in the clockwise direction when viewed from the right-hand side, so that the columnar protrusion 713 that was present in the second restocking position displacement portion 721d passes through the fourth switching portion 721h and enters the first vendition position displacement portion 721a. Thus, the switching cam 72 returns to the initial posture as illustrated in FIG. 26.

In this way, in the switching drive mechanism 70, as a result of rotating the switching cam 72 in the clockwise direction when viewed from the right-hand side, the switching plates 50 at different layers are also moved along the right-left direction. With that, the switching member 46 that engages with each switching plate 50 is moved along the right-left direction.

Meanwhile, the first restocking position displacement portion 721b is present as a point and not as an arc-like extension as the second restocking position displacement portion 721d. For that reason, when the switching cam 72 in the initial posture is rotated in the clockwise direction when viewed from the right-hand side, the columnar protrusion 713 moves through the first switching portion 721e, the first restocking position displacement portion 721b, and the second switching portion 721f in that order. Thus, all switching sliders 71 can be displaced upward in a short period of time, and all switching plates 50 can be temporarily slid to the left-hand side.

Figure 30:
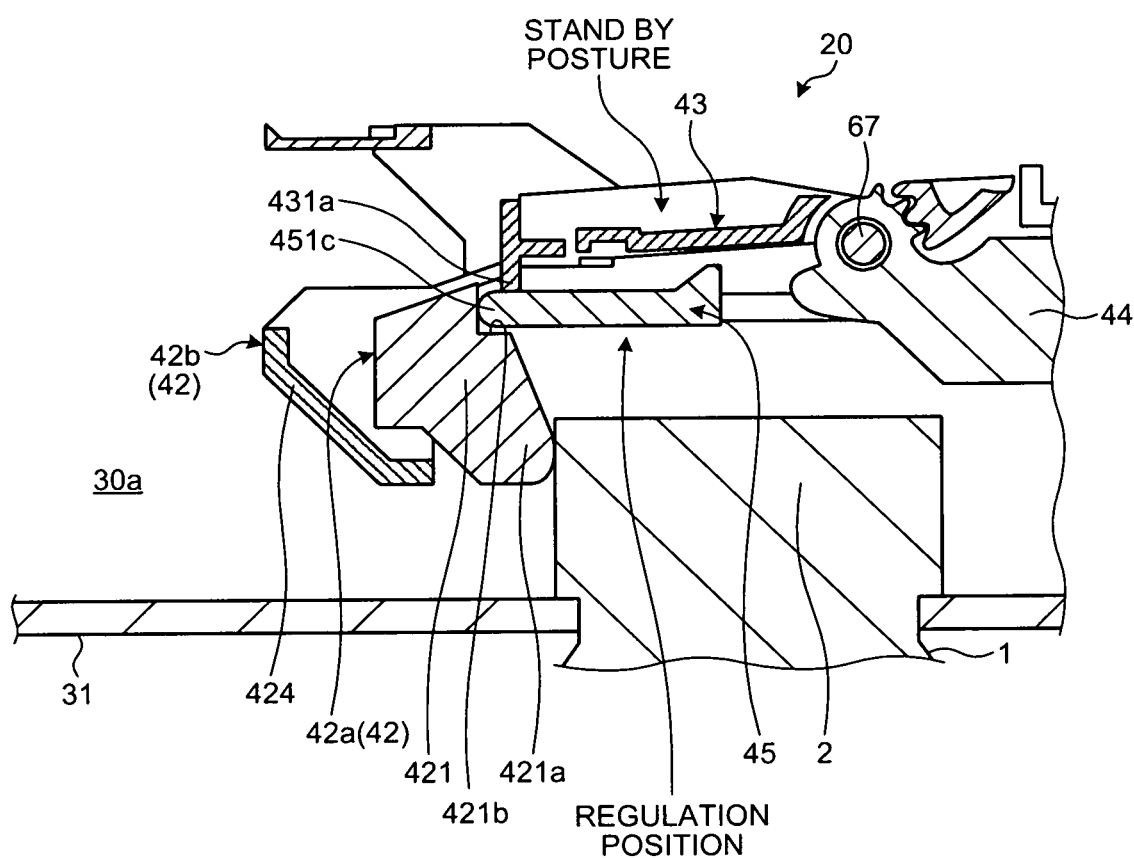
FIG. 30 is a cross-sectional view that schematically illustrates the main constituent elements in a locked state of the product storage device illustrated in FIGS. 3 and 4.

Given below is the operations performed by the product storage device 20. FIG. 30 is a cross-sectional view that schematically illustrates the main constituent elements in a locked state of the product storage device 20 illustrated in FIGS. 3 and 4.

When the product storage device 20 is in the locked state, the actuator 60 and the switching drive mechanism 70 are not being driven. Since the switching cam 72 constituting the switching drive mechanism 70 is in the initial posture, the columnar protrusion 713 advances to the first vendition position displacement portion 721a and consequently the switching plate 50 slides rightward. With that, the switching member is in the vendition position.

In the locked state, the first main gate 42a constituting the main gate 42 is biased by the gate spring 423 and thus advances to the product storage column 30a, and the first leading end portion 421 moves more toward the dispensing slot 30b than the foremost product (the downstream-most product) 1 that is at the downstream-most position of the product storage column 30a.

The second main gate 42b constituting the main gate 42 advances to the product storage column 30a due to its own elastic restoration force, and the second leading end portion 424 is more on the anterior side than the first leading end portion 421.

The sliding member 45 is biased by the first sliding spring 453 and is positioned at the anterior regulation position, and the sliding projection 451c is positioned in the upper part of a depressed portion 421b of the first leading end portion 421 of the first main gate 42a. With that, the first main gate 42a is regulated by the sliding member 45 from moving away from the product storage column 30a.

The lever 43 is in the standby state in which it is biased by the lever spring 435 so that the lever fin members 433 come in contact with the first arm members 422 of the first main gate 42a and the first main gate 42a is pressed to advance to the product storage column 30a. In the standby state, the lever 43 enters the notch 463 formed on the switching member 46, and the lever locking piece 431a is in contact with the top face of the sliding projection 451c thereby allowing the sliding member 45 to be at the regulation position. Meanwhile, since the first main gate 42a advances to the product storage column 30a, the sub-gate 44 moves away from the product storage column 30a.

Figure 31:
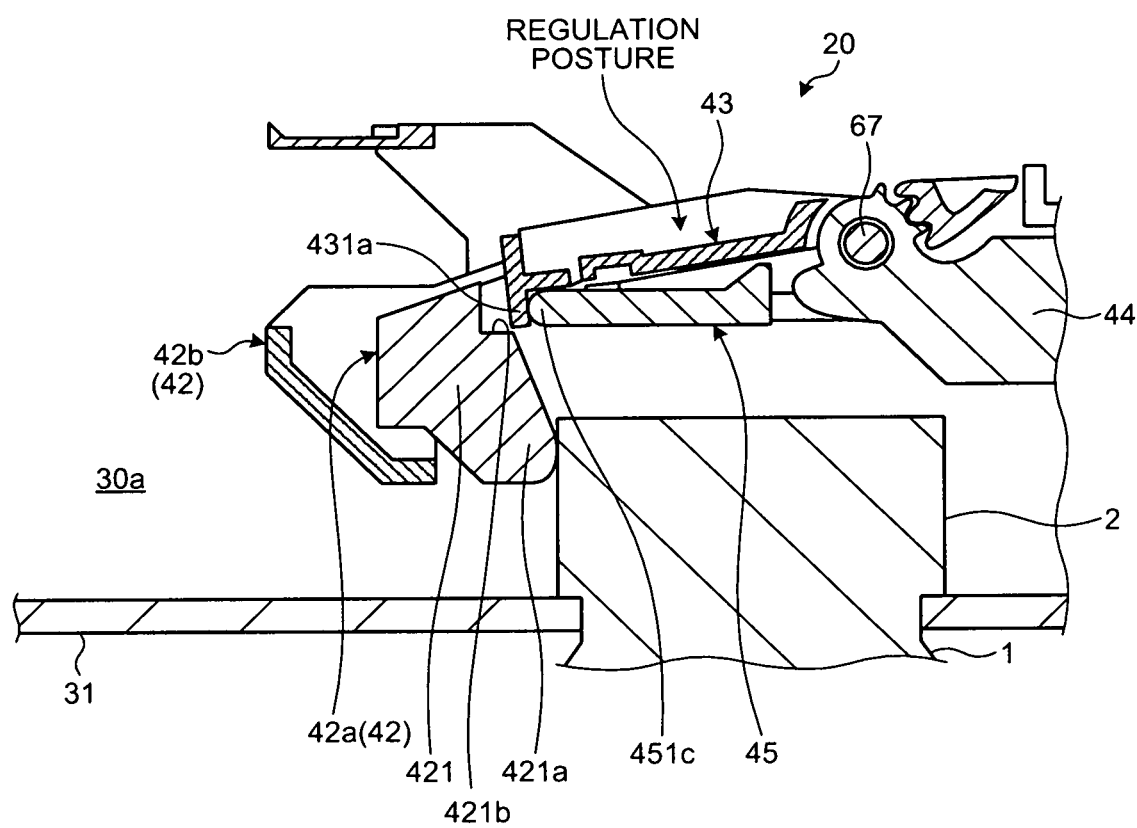
FIG. 31 is a cross-sectional view that schematically illustrates the main constituent elements in the vendible state of the product storage device.
Figure 32:
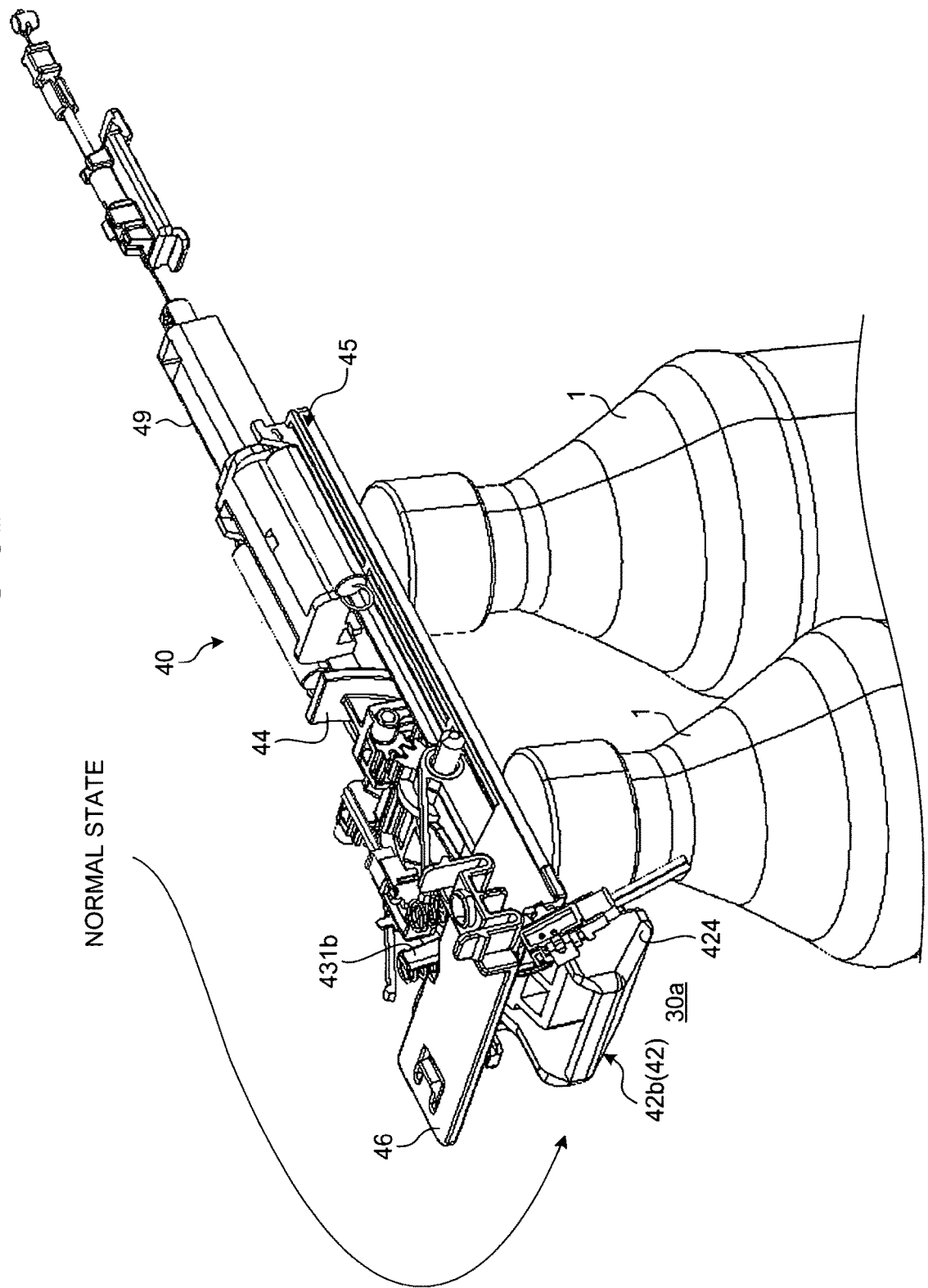
FIG. 32 is a perspective view of the main constituent elements in the vendible state of the product storage device.

In the locked state, when the actuator 60 is driven and the linking member 66 corresponding to the product storage column 30a switches from the standard posture to the relay posture, the coupling member 49 that is coupled to the linking member 66 via a wire cable slides in the posterior direction and, as illustrated in FIGS. 31 and 32, the sliding member 45, which is coupled with the coupling member 49 via the second sliding spring, also slides from the regulation position to an swing allowing position on the posterior side.

Herein, the amount of displacement of the wire cable accompanying the rotation of the linking member 66 is set to be greater than the amount of movement of the sliding member 45 from the regulation position to the swing allowing position. Hence, when the linking member 66 rotates from the standard posture to the relay posture, the sliding member 45 surely slides from the regulation position to the swing allowing position. After the sliding member 45 has moved to the swing allowing position, the coupling member 49 resists the biasing force of the second sliding spring and slides in the posterior direction to move away from the sliding member 45; and absorbs a greater amount of displacement, from the amount of displacement of the wire cable, than the amount of movement of the sliding member 45.

In this way, when the sliding member 45 slides to the swing allowing position, the sliding projection 451*c* separates from the upper part of the depressed portion 421*b* of the first leading end portion 421 of the first main gate 42*a*, and the first main gate 42*a* becomes able to swing upward. At that time, because of the separation of the sliding projection 451*c*, the lever 43 swings toward the anterior side and switches from the standby posture to the regulation posture; and the lever locking piece 431*a* is in contact with the sliding projection 451*c* thereby regulating the sliding member 45 from returning to the regulation position from the swing allowing position. Because of the sliding of the sliding member 45 to the posterior side from the regulating position to the swing allowing position and because of the regulation posture of the lever 43, the product storage device 20 switches from the locked state to the vendible state.

Figure 33:
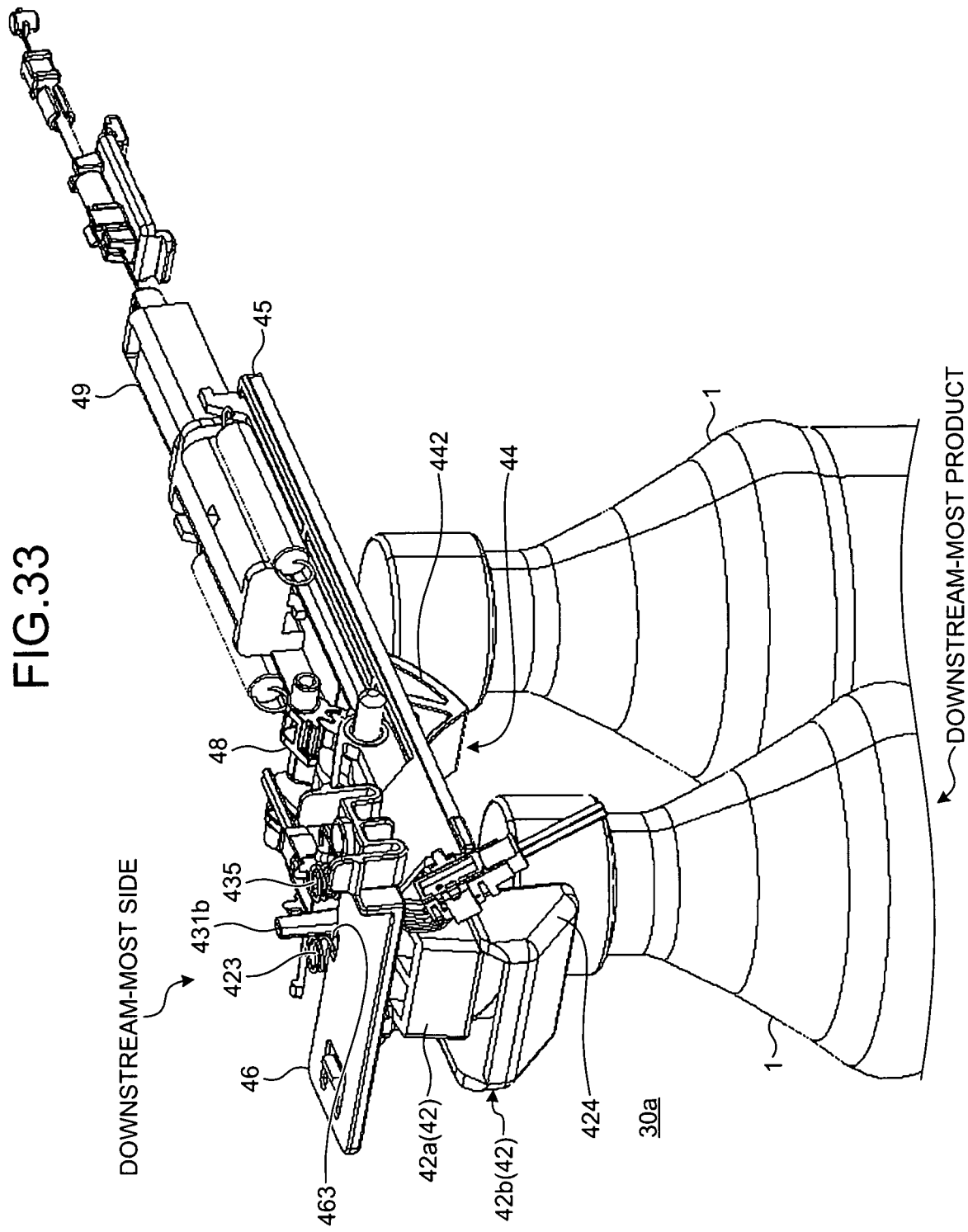
FIG. 33 is a perspective view illustrating the operations performed by the take-out mechanism when the foremost product is taken out from a product storage column.

Then, as illustrated in FIG. 33, when the foremost product 1 is pulled to the anterior side due to a take-out operation, the first main gate 42*a* at the advanced position swings against the biasing force of the gate spring 423, and moves away from the product storage column 30*a*. At that time, the sub-gate 44 that is linked with the first main gate 42*a* via the linking member 48 advances to the product storage column 30*a*, and the sub-gate rear end portion 442 advances to the anterior side of the neighboring product (hereinafter, the next product) 1 present on the posterior side of the foremost product 1. As described above, the sub-gate 44 regulates the next product 1 from moving in the anterior direction.

Since the first main gate 42*a* moves away from the product storage column 30*a*, the lever 43 also swings upward against the biasing force of the lever spring 435. Because of the upward swing of the lever 43, the lever protrusion 431*b* separates from the notch 463 of the switching member 46, and the lever locking piece 431*a* separates from the anterior side of the sliding projection 451*c*. As a result, the sliding member 45 gets biased by the first sliding spring 453 and becomes able to slide in the anterior direction.

Figure 34:
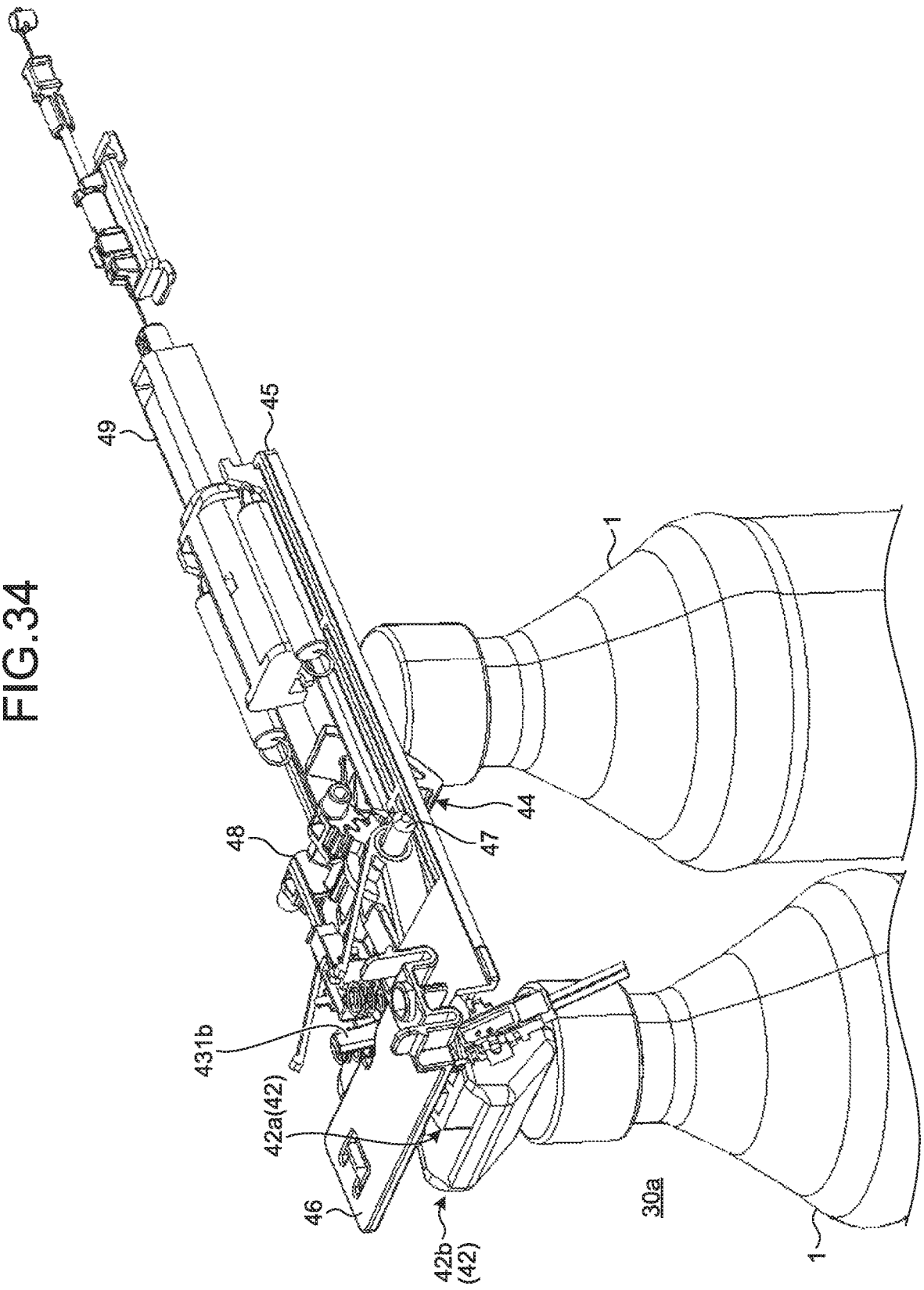
FIG. 34 is another perspective view illustrating the operations performed by the take-out mechanism when the foremost product is taken out from a product storage column.

When the foremost product 1 is further pulled in the anterior direction during the take-out operation, as illustrated in FIG. 34, the second main gate 42*b* gets pressed by the foremost product 1 and moves away from the product storage column 30*a* by resisting its own elastic restoration force. As a result, it becomes possible to take out the foremost product 1 toward the anterior direction through the dispensing slot 30*b*.

Figure 35:
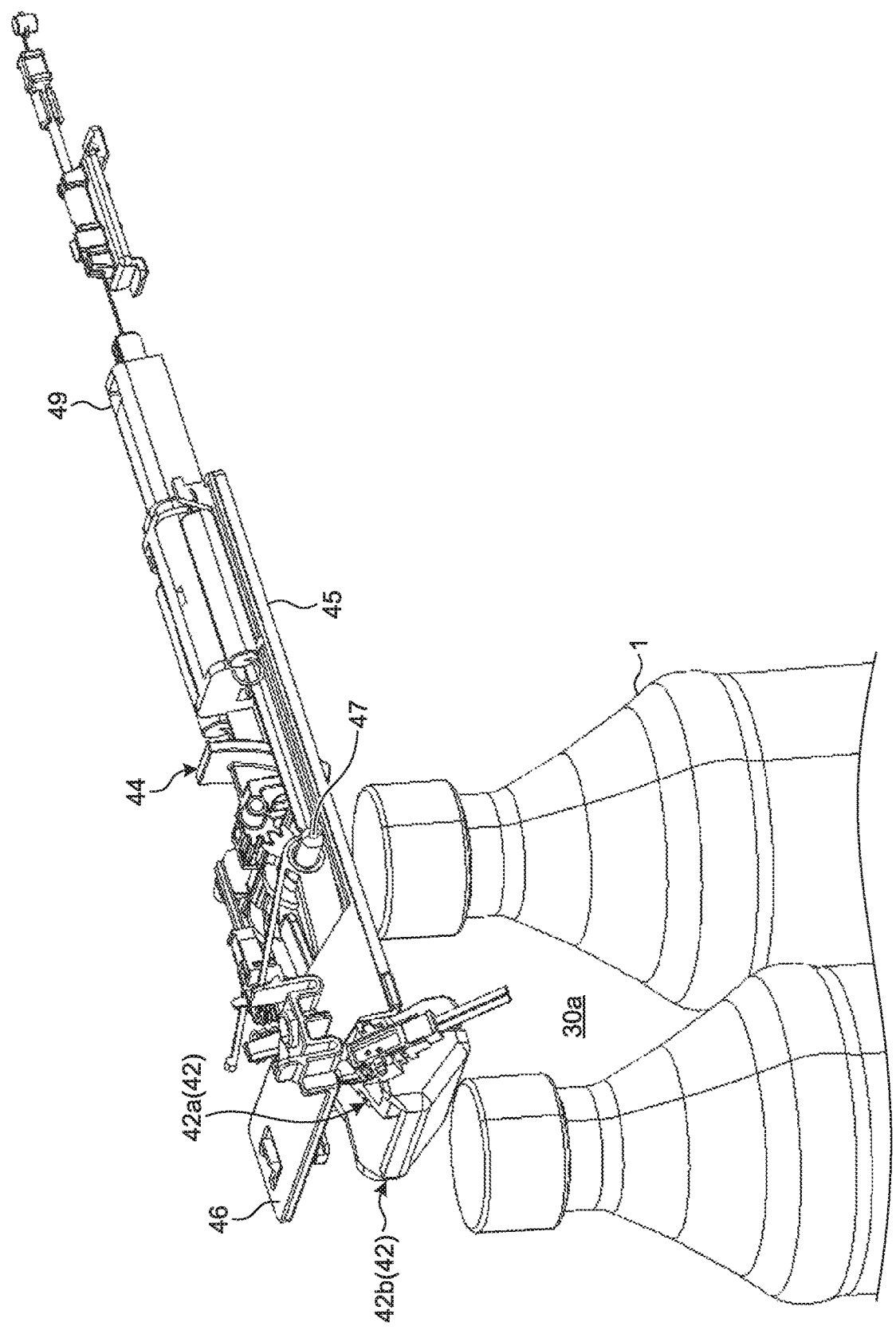
FIG. 35 is another perspective view illustrating the operations performed by the take-out mechanism when the foremost product is taken out from a product storage column.

Once the foremost product 1 is taken out through the dispensing slot 30*b*, as illustrated in FIG. 35, the first main gate 42*a* and the second main gate 42*b* advance to the product storage column 30*a*. When the first main gate 42*a* advances to the product storage column 30*a*, the sub-gate 44 moves away from the product storage column 30*a*.

Figure 36:
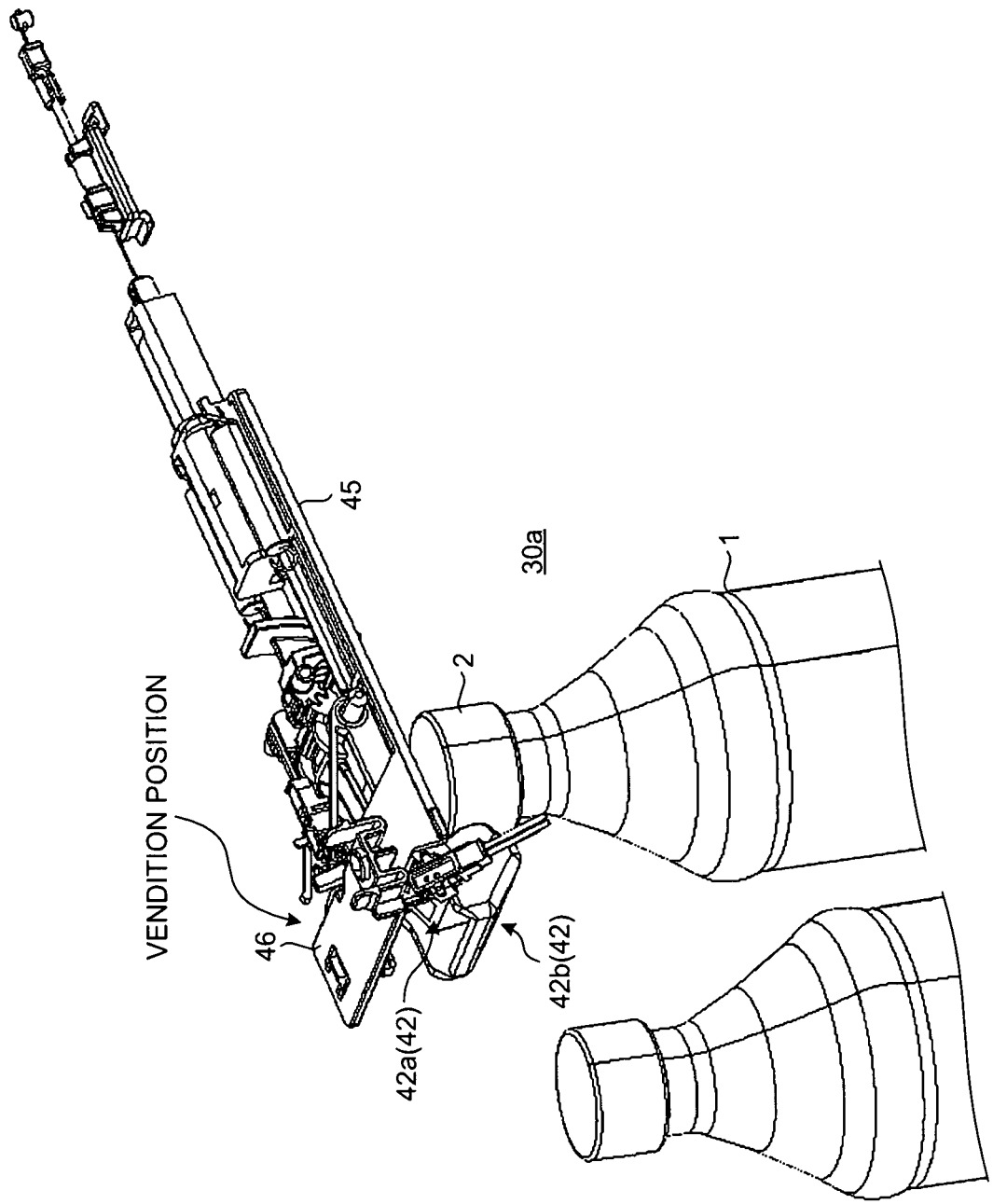
FIG. 36 is another perspective view illustrating the operations performed by the take-out mechanism when the foremost product is taken out from a product storage column.

Then, as illustrated in FIG. 36, the first leading end portion 421 of the first main gate 42*a* stays at the advanced position and a lower rear end portion 421*a* of the first leading end portion 421 is in contact with the cap 2 of the new foremost product 1. At that time, the sliding projection 451*c* returns to the regulation position in the upper part of the depressed portion 421*b* and the lever 43 switches to the standby state, and thus the sliding member 45 that slides in the anterior direction returns to the locked state.

Figure 37:
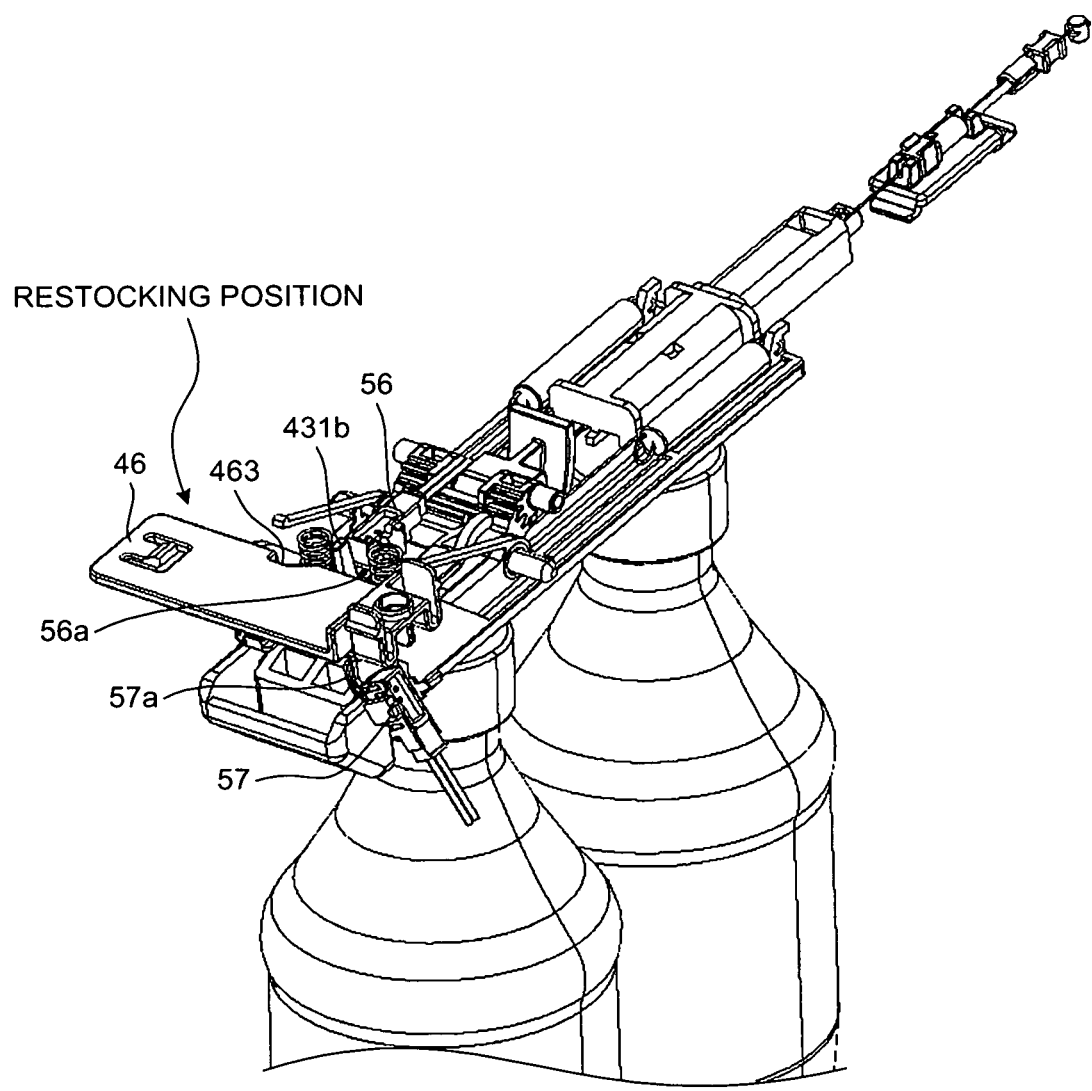
FIG. 37 is a perspective view of the main constituent elements of the take-out mechanism in the case in which the switching member switches to the restocking position.
Figure 38:
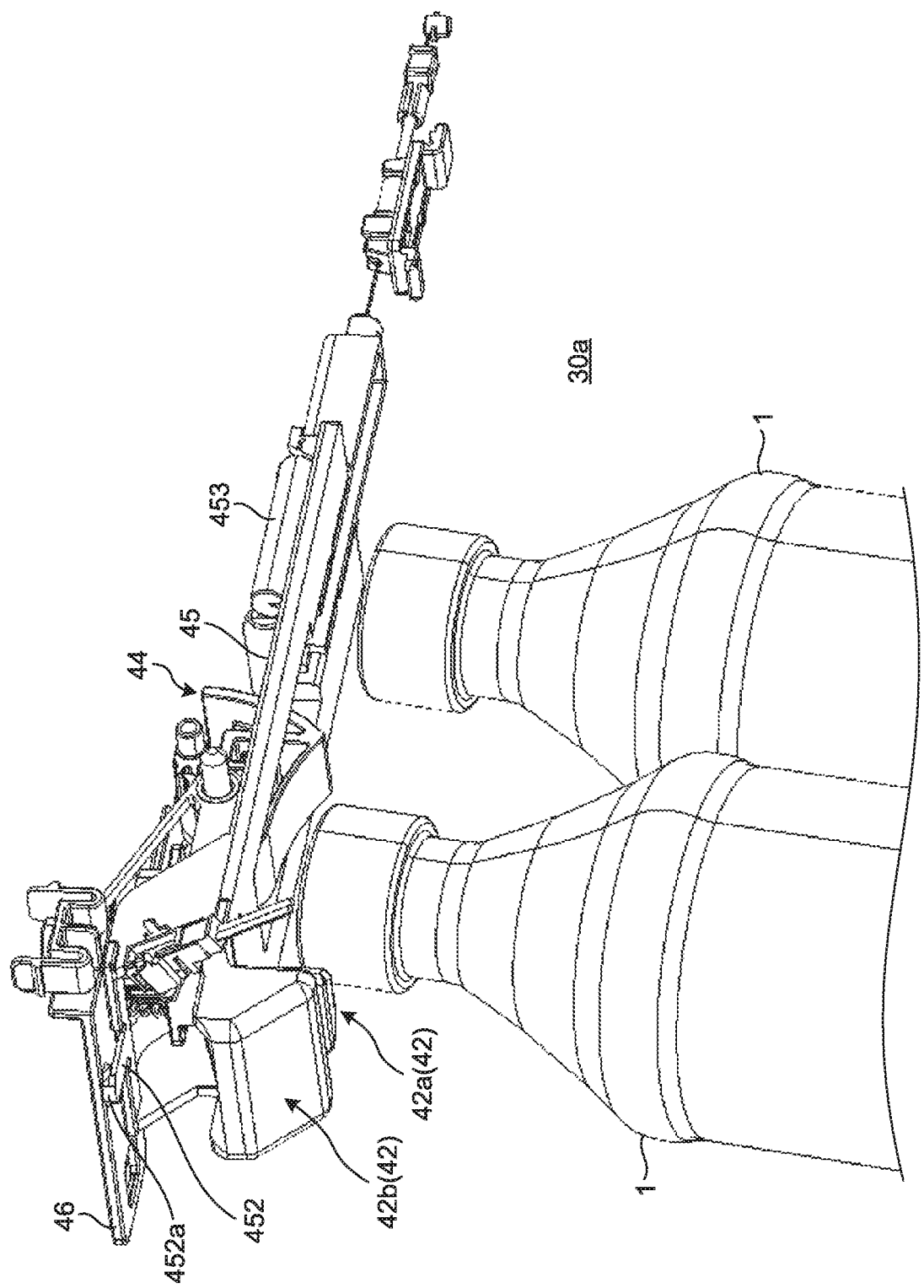
FIG. 38 is another perspective view of the main constituent elements of the take-out mechanism in the case in which the switching member switches to the restocking position.

In the locked state, the switching drive mechanism 70 is driven and the switching cam 72 stops after rotating by, for example, about 180° to 200° in the clockwise direction when viewed from the right-hand side, so that the columnar protrusion 713 enters the second restocking position displacement portion 721*d*. Then, the switching slider 71 slides upward and the switching plate 50 slides leftward. As a result, the switching member 46 moves from the vendition position to the restocking position. Once the switching member 46 moves to the restocking position, as illustrated in FIGS. 37 and 38, the lever projection 431*b* of the lever 43 separates from the notch 463 of the switching member 46 and is in contact with the rear rim portion of the switching member 46, so that the sliding locking projection 452*a* of the sliding locking portion 452 of the sliding member 45 gets positioned on the anterior side of the switching locking projection 464 of the switching member 46.

Subsequently, when the actuator 60 is driven and the linking member 66 corresponding to the product storage column 30*a* switches from the standard posture to the relay posture, the coupling member 49 that is coupled with the linking member 66 via a wire cable slides in the posterior direction. As a result, the sliding member 45, which is coupled with the coupling member 49 via the second sliding spring, also slides from the regulation position to the swing allowing position on the posterior side.

Figure 39:
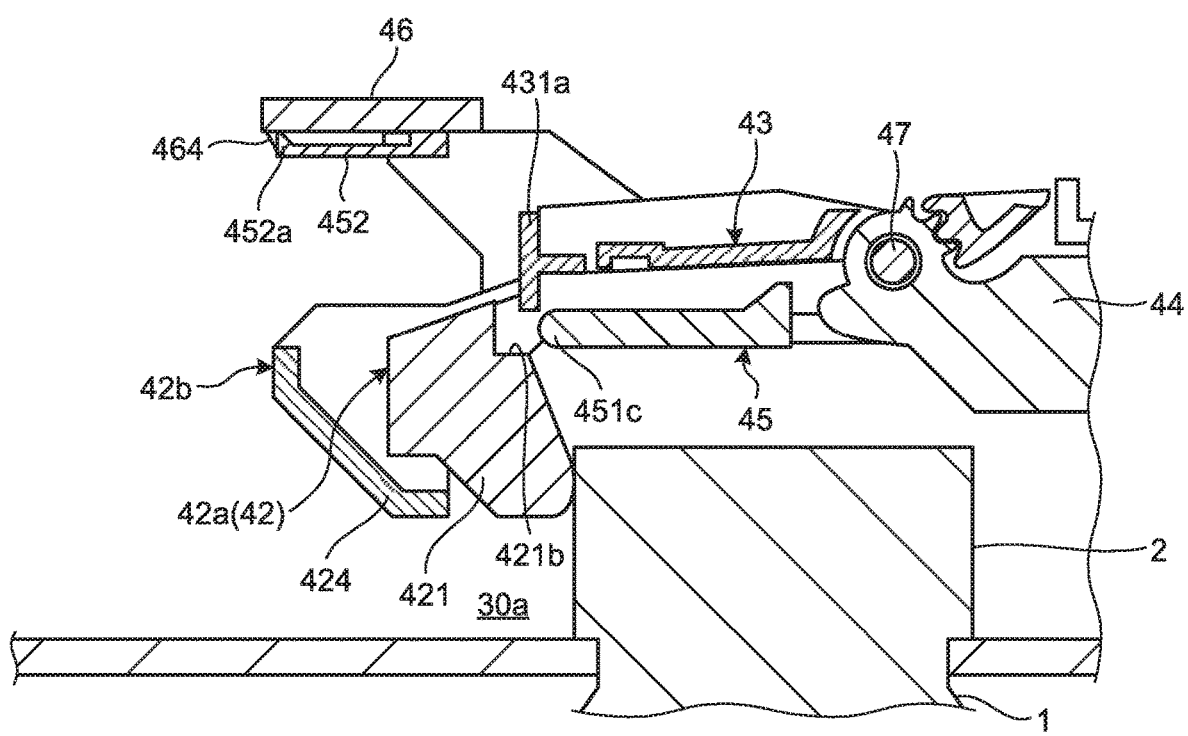
FIG. 39 is a cross-sectional view that schematically illustrates the state in which the sliding member slides from the regulation position from the state illustrated in FIGS. 37 and 38.
Figure 40:
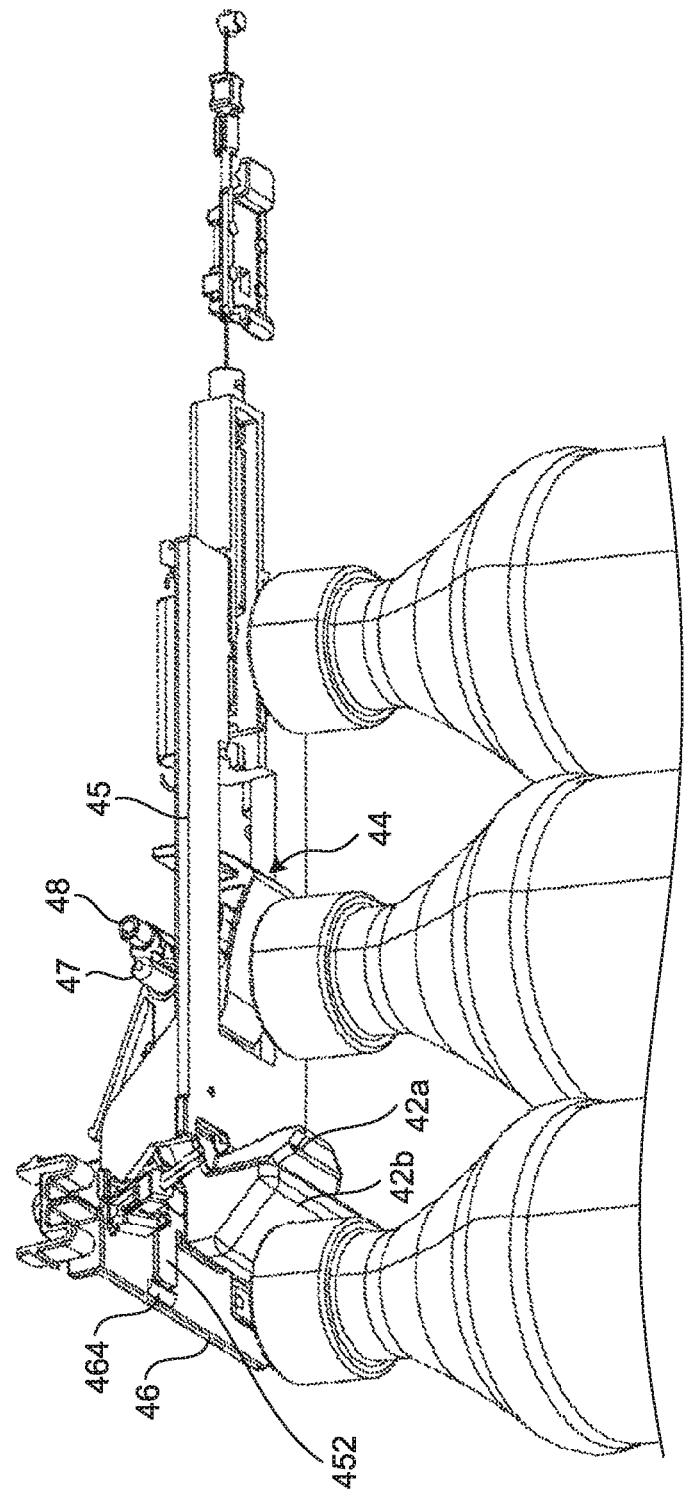
FIG. 40 is a perspective view of the state in which the sliding member slides from the regulation position from the state illustrated in FIGS. 37 and 38.

In this way, when the sliding member 45 slides from the regulation position to the swing allowing position, as illustrated in FIGS. 39 and 40, the sliding locking projection 452*a* of the sliding locking portion 452 crosses over the switching locking projection 464, and the anterior end face of the sliding locking projection 452*a* is in contact with the rear end face of the switching locking projection 464. Thus, the sliding member 45 is maintained in the state of having slid to the swing allowing position. At that time, since the lever projection 431*b* is in contact with the rear rim of the switching member 46, the lever 43 is regulated from swinging in the anterior direction and is regulated from switching to the standby posture and the regulation posture. Herein, when the sliding member 45 slides to the swing allowing position, the first main gate 42*a* and the second main gate 42*b* switch to the state of being able to swing upward, that is, the state of being able to move away from the product storage column 30*a*.

Figure 41:
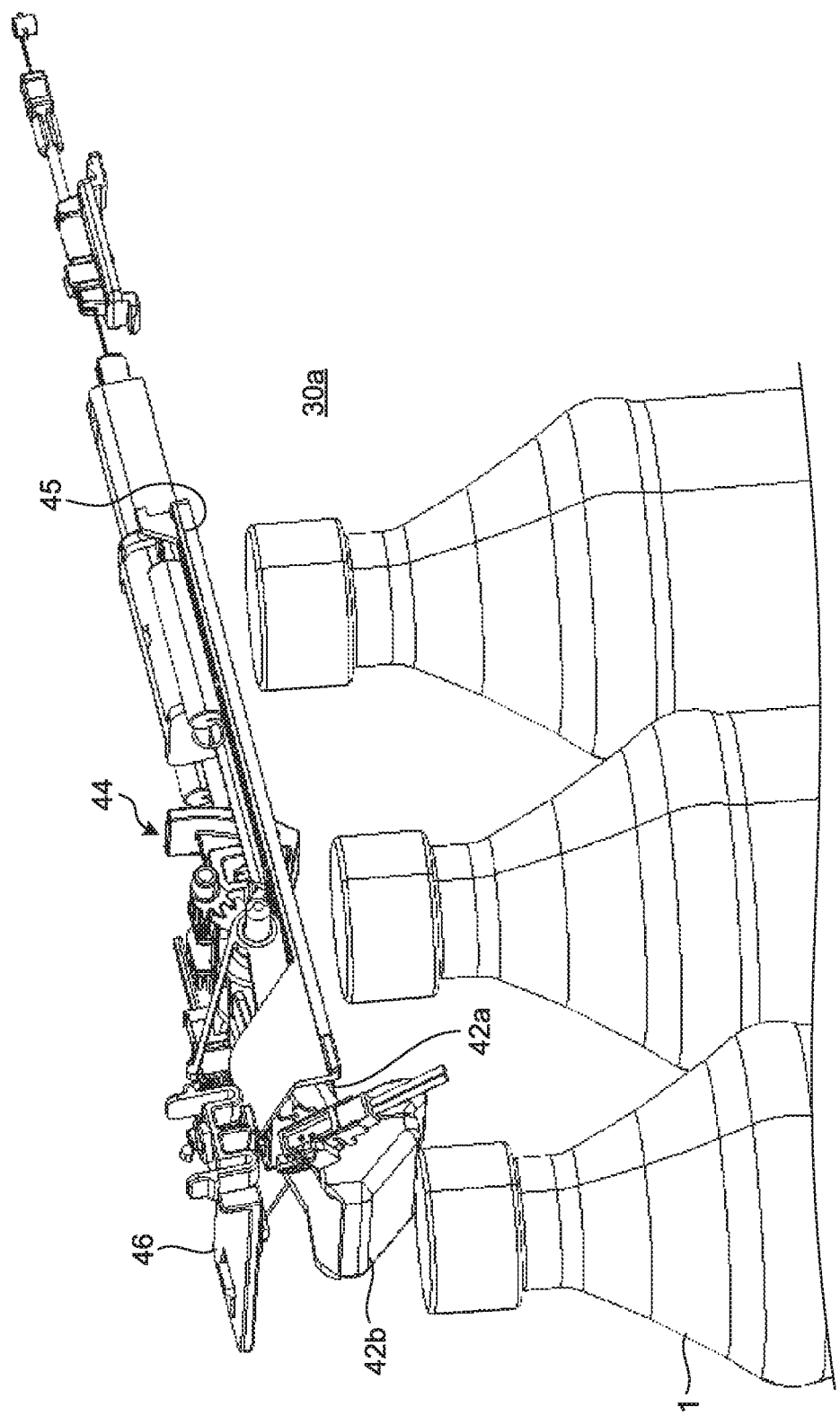
FIG. 41 is a perspective view illustrating the operations performed by the take-out mechanism when a product is restocked in a product storage column.
Figure 42:
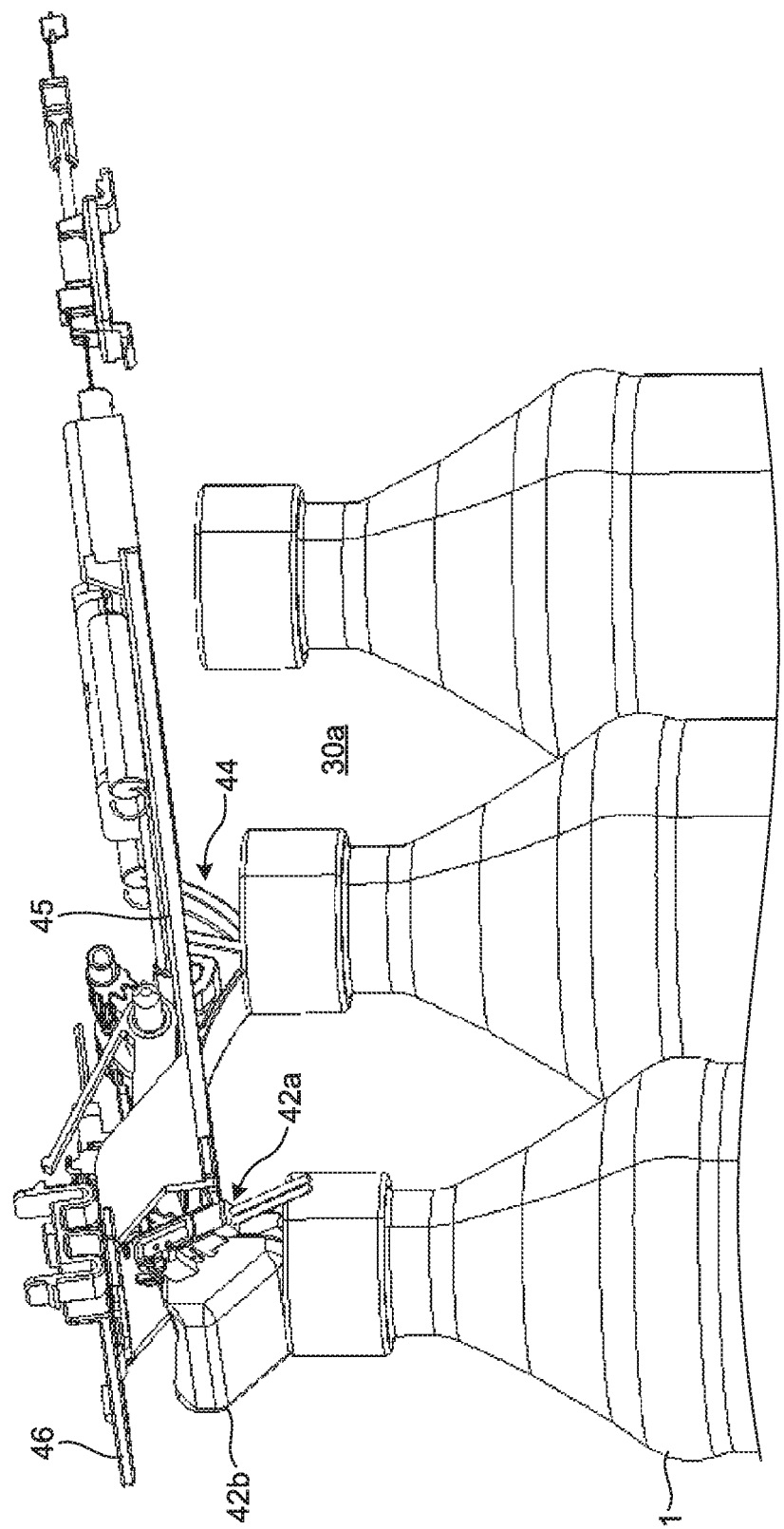
FIG. 42 is another perspective view illustrating the operations performed by the take-out mechanism when a product is restocked in a product storage column.

As illustrated in FIG. 41, when the product 1 to be restocked is moved in the posterior direction via the dispensing port 30*b*, the second main gate 42*b* which is in contact with the product 1 resists its own elastic restoration force and moves away from the product storage column 30*a*. Subsequently, when the product 1 to be restocked is further moved in the posterior direction, as illustrated in FIG. 42, the first main gate 42*a* resists the biasing force of the gate spring 423 and moves away from the product storage column 30a. At that time, the lever 43 too resists the biasing force of the lever spring 435 and swings upward along with the first main gate 42a.

In this way, when the first main gate 42a moves away from the product storage column 30a, the sub-gate 44 advances to the product storage column 30a. As described above, when the product 1 is in contact from the anterior side, the sub-gate 44 undergoes elastic deformation and allows the product 1 to move in the posterior direction. Hence, even if the sub-gate 44 advances to the product storage column 30a, the product 1 that is restocked through the dispensing slot 30b is at no risk of being blocked by the sub-gate 44.

Figure 43:
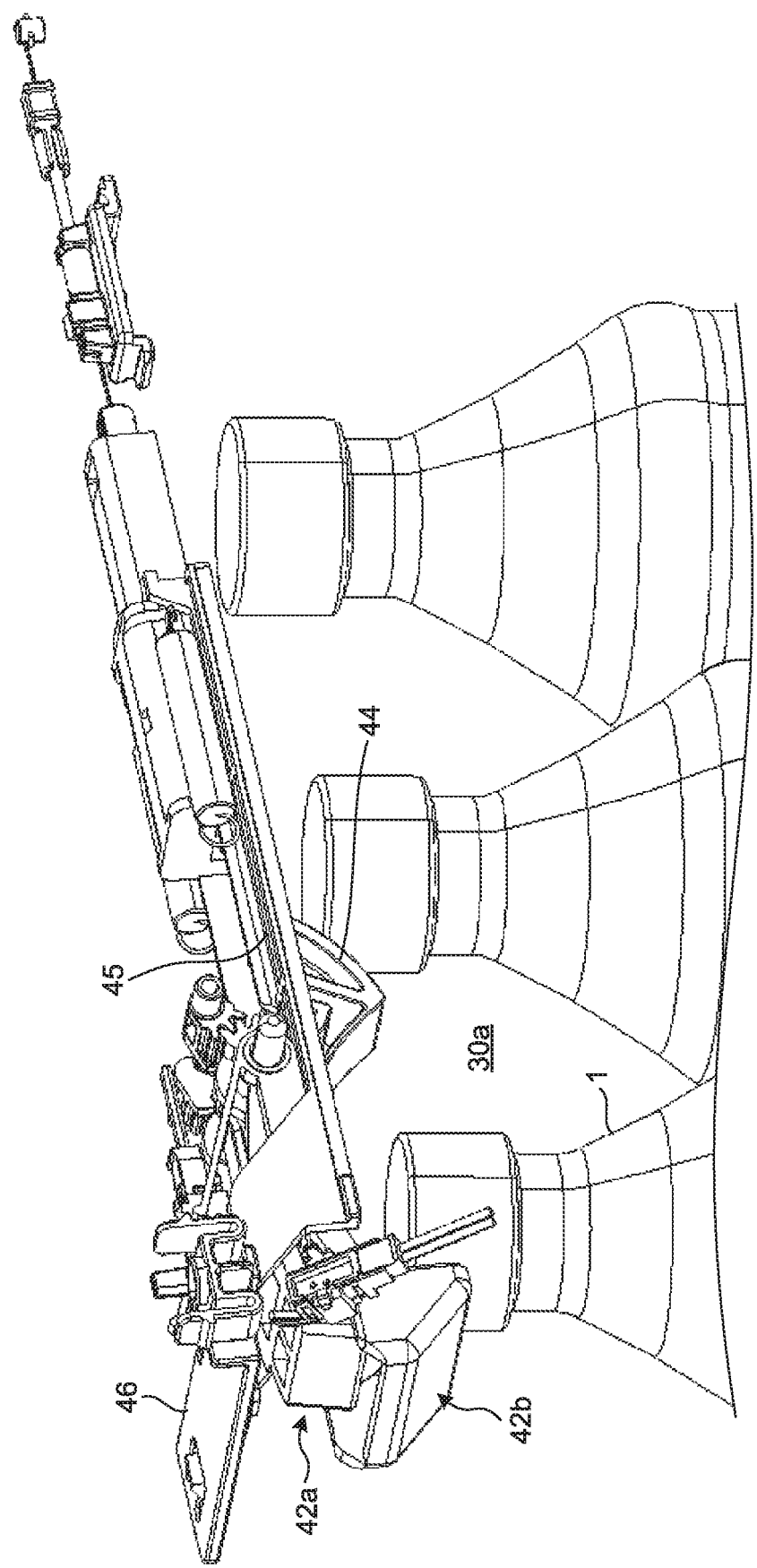
FIG. 43 is another perspective view illustrating the operations performed by the take-out mechanism when a product is restocked in a product storage column.
Figure 44:
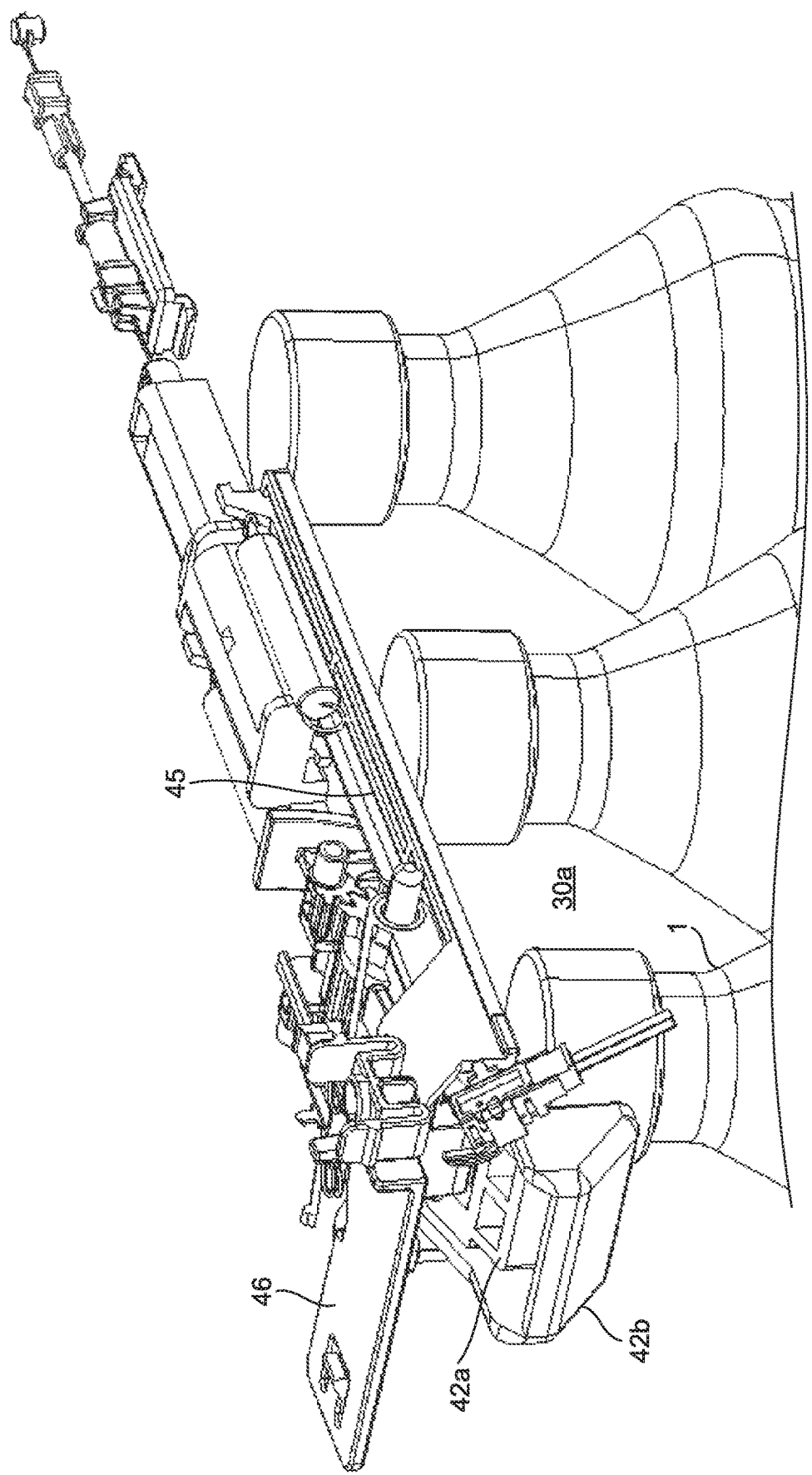
FIG. 44 is another perspective view illustrating the operations performed by the take-out mechanism when a product is restocked in a product storage column.

When the product 1 to be restocked is moved in the posterior direction, the second main gate 42b whose abutment relationship with the product 1 has been cancelled advances to the product storage column 30a due to its own elastic restoration force as illustrated in FIG. 43; and then the first main gate 42a whose abutment relationship with the product 1 is subsequently cancelled gets biased by the gate spring 423 and advances to the product storage column 30a as illustrated in FIG. 44. As a result, the product 1 to be restocked gets stored in the product storage column 30a. It marks the completion of restocking the product 1.

Figure 45:
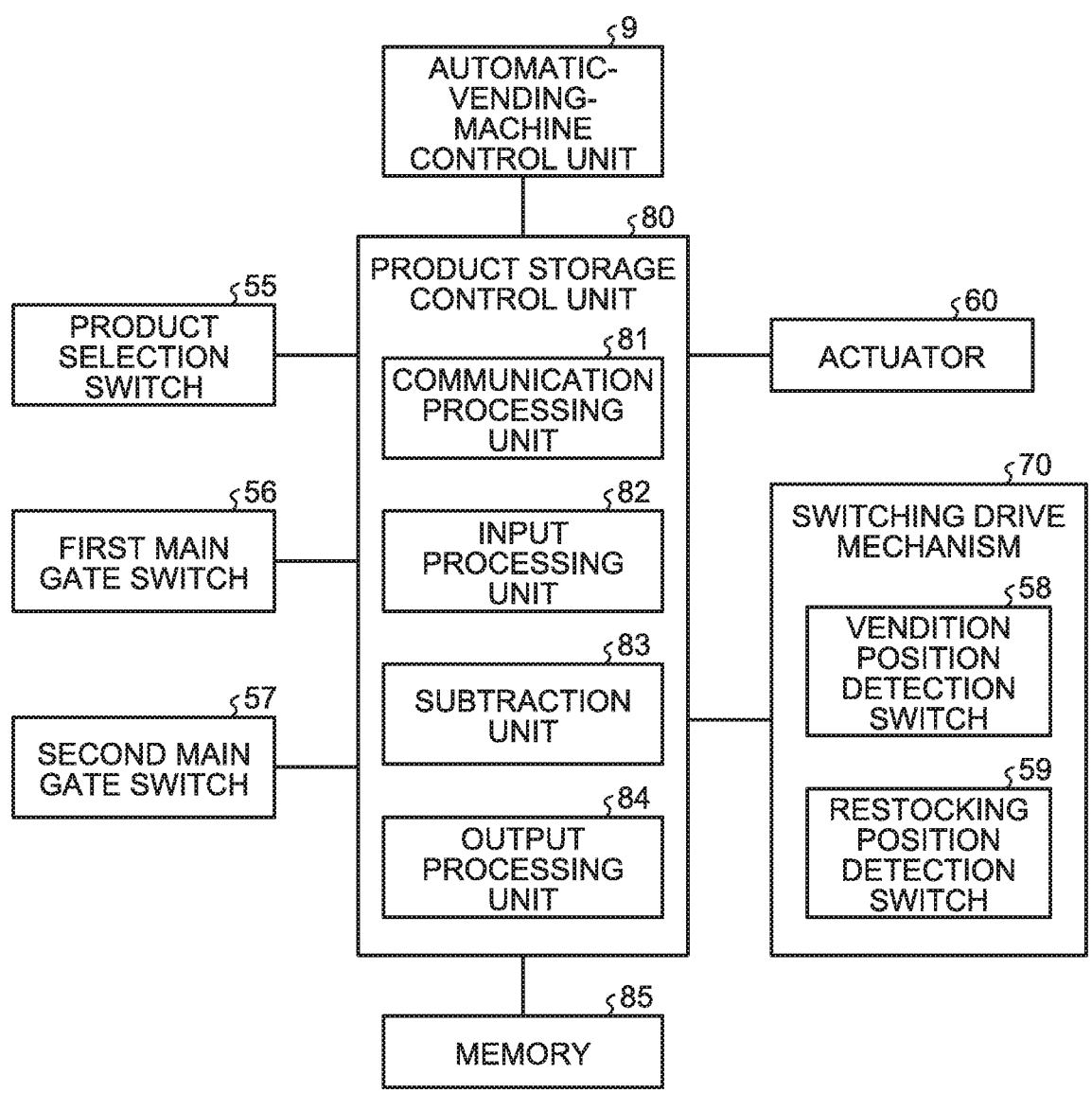
FIG. 45 is a block diagram that schematically illustrates a characteristic control system of the product storage device according to the embodiment of the present disclosure.

FIG. 45 is a block diagram that schematically illustrates a characteristic control system of the product storage device 20 according to the embodiment of the present disclosure. As illustrated in FIG. 45, the product storage device 20 includes the product selection switch 55, a first main gate switch 56, a second main gate switch 57, a vendition position detection switch 58, a restocking position detection switch 59, and a product storage control unit 80.

The product selection switch 55 is embedded in the product selection button 332, and switches to the ON state in response to the pressing of the product selection button 332 and sends a product selection ON signal to the product storage control unit 80.

The first main gate switch 56 is installed in the take-out mechanism 40 and, as illustrated in FIG. 8, is disposed in the swing range of the lever 43. When the first main gate 42a resists the biasing force of the gate spring 423 and swings upward from the advanced position, the first main gate switch 56 switches to the ON state because a contact maker 56a (see FIG. 37) thereof gets pressed by the lever 43 that swings upward along with the first main gate 42a; and then the first main gate switch 56 sends an ON signal to the product storage control unit 80. That is, the first main gate switch 56 represents a first detecting unit that, even if the first main gate 42a has not retracted from the product storage column 30a, detects upward swing of the first main gate 42a from the advanced position.

The second main gate switch 57 is installed in the take-out mechanism 40 and, as illustrated in FIG. 8, is disposed in the swing range of the second main gate 42b. When the second main gate 42b moves away from the product storage column 30a, the second main gate switch 57 switches to the ON state because a contact maker 57a thereof gets pressed by the second main gate 42b; and then the second main gate switch 57 sends an ON signal to the product storage control unit 80. That is, the second main gate switch 57 represents a second detecting unit that detects moving away of the second main gate 42b from the product storage column 30a.

The vendition position detection switch 58 is installed in the housing case 70a of the switching drive mechanism 70 as illustrated in FIG. 23. When the switching slider 71 slides downward, the vendition position detection switch 58 switches to the ON state because a contact maker 58a thereof gets pressed by the switching slider; and then the vendition position detection switch 58 sends an ON signal to the product storage control unit 80. That is, the vendition position detection switch 58 represents a detecting unit that detects downward sliding of the switching slider 71 and thus enables estimation of the fact that the switching member 46 is at the vendition position.

The restocking position detection switch 59 is installed in the housing case 70a of the switching drive mechanism 70 as illustrated in FIG. 23. When the switching slider 71 slides upward, the restocking position detection switch 59 switches to the ON state because a contact maker 59a thereof gets pressed by the switching slider 71; and then the restocking position detection switch 59 sends an ON signal to the product storage control unit 80. That is, the restocking position detection switch 59 is a detecting unit that detects upward sliding of the switching slider 71 and thus enables estimation of the fact that the switching member 46 is at the restocking position.

The product storage control unit 80 comprehensively controls all of the operations of the product storage device 20 according to computer programs and data stored in a memory 85; and includes a communication processing unit 81, an input processing unit 82, a subtraction unit 83, and an output processing unit 84. The communication processing unit 81 performs communication with an automatic-vending-machine control unit 9 that controls the operations of the automatic vending machine in which the product storage device 20 is installed.

The input processing unit 82 receives input of ON signals from the product selection switch 55, the first main gate switch 56, and the second main gate switch 57. The subtraction unit 83 performs the operation of subtraction in the case in which the product 1 is detected to have been taken out. The output processing unit 84 issues driving instructions and driving termination instructions to the actuator 60 and the switching drive mechanism 70.

Figure 46:
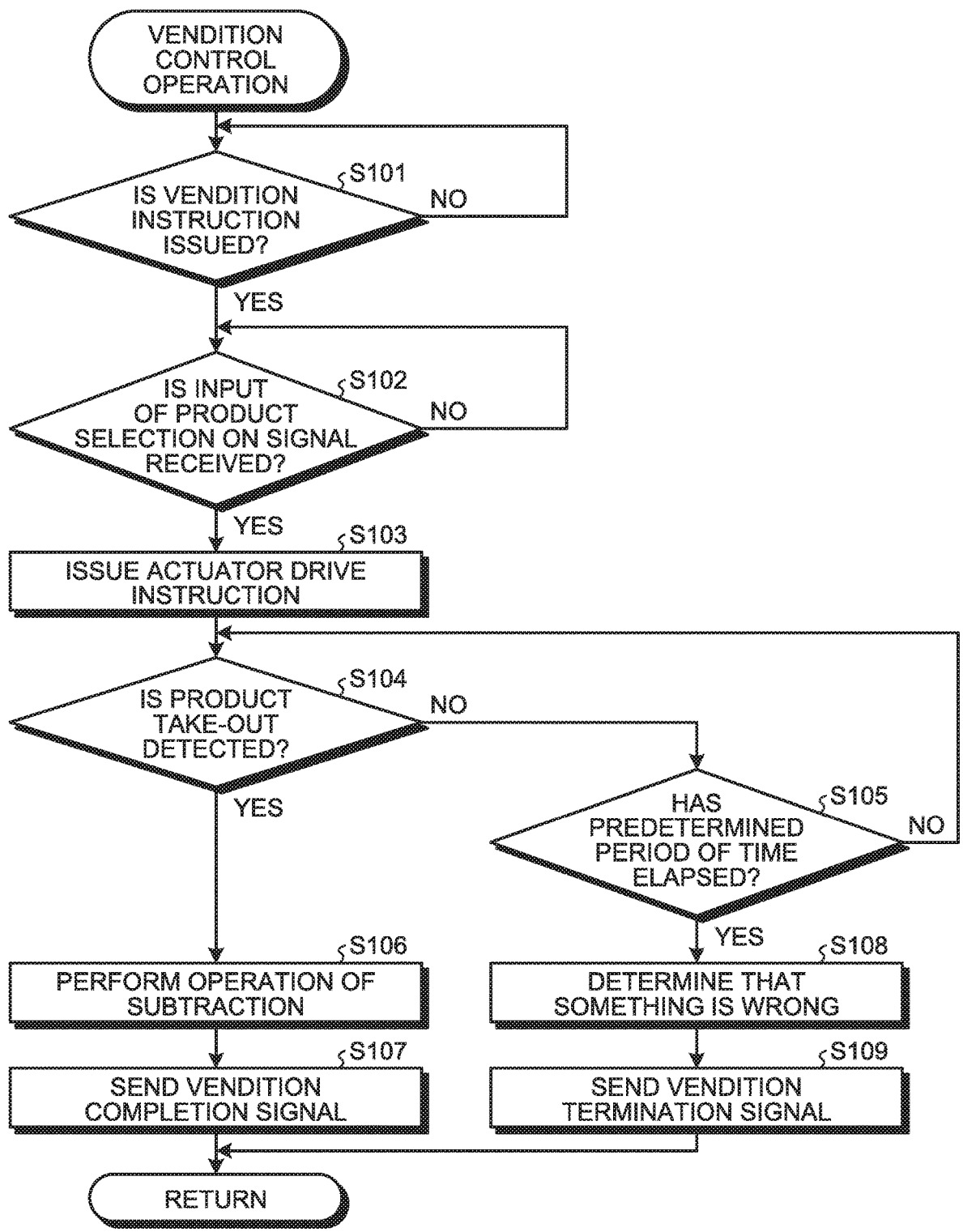
FIG. 46 is a flowchart for explaining the details of a vendition control operation performed by a product storage control unit illustrated in FIG. 45.

FIG. 46 is a flowchart for explaining the details of a vendition control operation performed by the product storage control unit 80 illustrated in FIG. 45. Herein, the operations performed by the product storage device 20 are explained while explaining the vendition control operation.

During the vendition control operation, when a vendition instruction is received from the automatic-vending-machine control unit 9 via the communication processing unit 81 (Yes at Step S101), that is, when a vendition instruction is issued by the automatic-vending-machine control unit 9 in response to the insertion of the desired amount of money, the product storage control unit 80 waits for the input of a product selection ON signal from the product selection switch 55 (Step S102).

When the input of a product selection ON signal is received from the product selection switch 55 via the input processing unit 82 (Yes at Step S102), the product storage control unit 80 issues a driving instruction to the actuator 60 via the output processing unit 84 and drives the actuator 60 for the purpose of rotating the linking member 66 from the standard posture to the relay posture (Step S103).

As a result of driving the actuator 60, the product storage device 20 switches from the locked state to the vendible state. Upon issuing the driving instruction to the actuator 60, the product storage control unit 80 detects whether the foremost product 1 has been taken out until the elapse of a predetermined period of time (Steps S104 and S105).

In the product storage device 20, when the product 1 is taken out in the vendible state, the foremost product 1 moves in the anterior direction so that first the first main gate 42a moves away from the product storage column 30a and then the second main gate 42b moves away from the product storage column 30a. Thus, within the predetermined period of time, it is detected whether an ON signal is first received from the first main gate switch 56 and then received from the second main gate switch 57.

If the product 1 is detected to have been taken out within the predetermined period of time (Yes at Step S104, No at Step S105), then the product storage control unit 80 performs an operation of subtraction using the subtraction unit 83 (Step S106).

Upon performing the operation of subtraction, the product storage control unit 80 sends a vendition completion signal to the automatic-vending-machine control unit 9 using the communication processing unit 81 (Step S107). Then, the sequence control returns, and the operations are ended.

As a result, it becomes possible to notify the automatic-vending-machine control unit 9 about the fact that the product 1 has been taken out from the product storage device 20, thereby enabling the automatic-vending-machine control unit 9 to perform monetary operations such as payment of the change.

Meanwhile, if the product 1 is not detected to have been taken out within the predetermined period of time (No at Step S104, Yes at Step S105), then the product storage control unit 80 determines that something is wrong (Step S108) and sends a vendition termination signal to the automatic-vending-machine control unit 9 using the communication processing unit 81 (Step S109). Then, the system control returns, and the operations are ended.

As a result, it becomes possible to notify the automatic-vending-machine control unit 9 about the fact that the product 1 has not been taken out from the product storage device 20, thereby enabling the automatic-vending-machine control unit 9 to perform monetary processing such as returning the inserted amount of money.

As described above, in each product storage device 20 according to the embodiment of the present disclosure, when the lever 43 that is swingably disposed along with the first main gate 42a switches to the standby state, the sliding member 45 is allowed to be at the regulation position. Hence, the first main gate 42a can be regulated from moving away and retracting from the product storage column 30a, and the product 1 can be prevented from being taken out from the product storage column 30a. When the sliding member 45 slides from the regulation position, the lever 43 switches to the regulation posture and regulates the sliding member 45 from returning to the regulation position. Hence, the foremost product 1 is allowed to be taken out from the product storage column 30a. At that time, the neighboring product 1 on the posterior side of the foremost product 1 is regulated by the sub-gate 44 from moving in the anterior direction. Hence, there is no risk of a plurality of products 1 being taken out. Subsequently, as a result of taking out the foremost product 1, when the first main gate 42a moves away from the product storage column 30a, the lever 43 switches to the standby posture due to the advancement of the first main gate 42a to the product storage column 30a, and thus allows the sliding member 45 to return to the regulation position. Hence, once a take-out operation is performed, taking out of any further products 1 from the product storage column 30a can be prevented.

In this way, in the above product storage device 20, a single product 1 is allowed to be taken out by the take-out mechanism 40 which is an element of the product storage device 20. Thus, unlike the related art technology, it is not the case where the selection of the product is to be made on a basis of the product rack representing a set of a plurality of product storage devices. Hence, it is not necessary to install a product storage device storing products having a certain price along with other product storage device(s) storing products having a price same as the certain price in the same layer, so that it becomes possible to store a product 1, in a product storage device, having a certain price which is different from a price of other product(s) stored in other product storage device(s) in the same layer.

Hence, according to the above product storage device 20, it becomes possible to enhance the degree of freedom of installation and to enhance the degree of freedom of the products 1 to be stored.

According to the product storage device 20, the attachments 34 that are attached as a left-right pair on the rail member 30, which constitutes the product storage column 30a, regulate the passage along the front-back direction of such products which have predetermined widths greater than the width of the target product 1. Hence, it becomes possible to prevent storing and taking out of products having a greater width than the width of the target product 1.

Particularly, since the attachments 34 are disposed on the posterior side of the sub-gate 44, there is no risk of the attachments 34 impeding the operations by interfering with the fingers of the person who is taking out the foremost product 1 or by interfering with the fingers of the person who is restocking the products 1 to be restocked.

The product storage device 20 described above may further achieve the following effects.

In the left-right pair of rail sliding portions 32 constituting the rail member 30, the protrusions 322 that protrude toward each other in the anterior end portion are disposed in between the advanced position of the first main gate 42a with respect to the product storage column 30a and the advanced position of the sub-gate 44 with respect to the product storage column 30a; and the clearance between the protrusions 322 is substantially same as the maximum width of the constriction 5 of the container of the product 1. Hence, the rail main body 31 constituting the rail member 30 has a gradual downward slant toward the anterior side, so that the product 1 moving from the posterior side toward the anterior side decelerates while passing between the protrusions 322 and thus can be prevented from colliding with the main gate 42 (the first main gate 42a and the second main gate 42b) and getting damaged.

When the first main gate 42a advances to the product storage column 30a, the lower rear end portion 421a of the first leading end portion 421 is in contact with the cap 2 of the foremost product 1. Hence, it becomes possible to sufficiently secure the length in the vertical direction from the central axis of the shaft 47, which represents the pivot shaft of the first main gate 42a, to the abutting portion of the lower rear end portion 421a and the cap 2; and the rotational moment exerted on the first main gate 42a at the time of pulling the foremost product 1 in the anterior direction can be increased. As a result, the first main gate 42a can be swung with a smaller amount of force.

As described above, using the constituent elements of a single product storage device 20, the operation of taking out the product 1 can be performed independently of the other product storage devices 20. Hence, depending on the size of the products 1 to be stored, the installation height and the installation width of each product storage device 20 can be varied, thereby enabling achieving enhancement in the degree of freedom in the layout.

Figure 47:
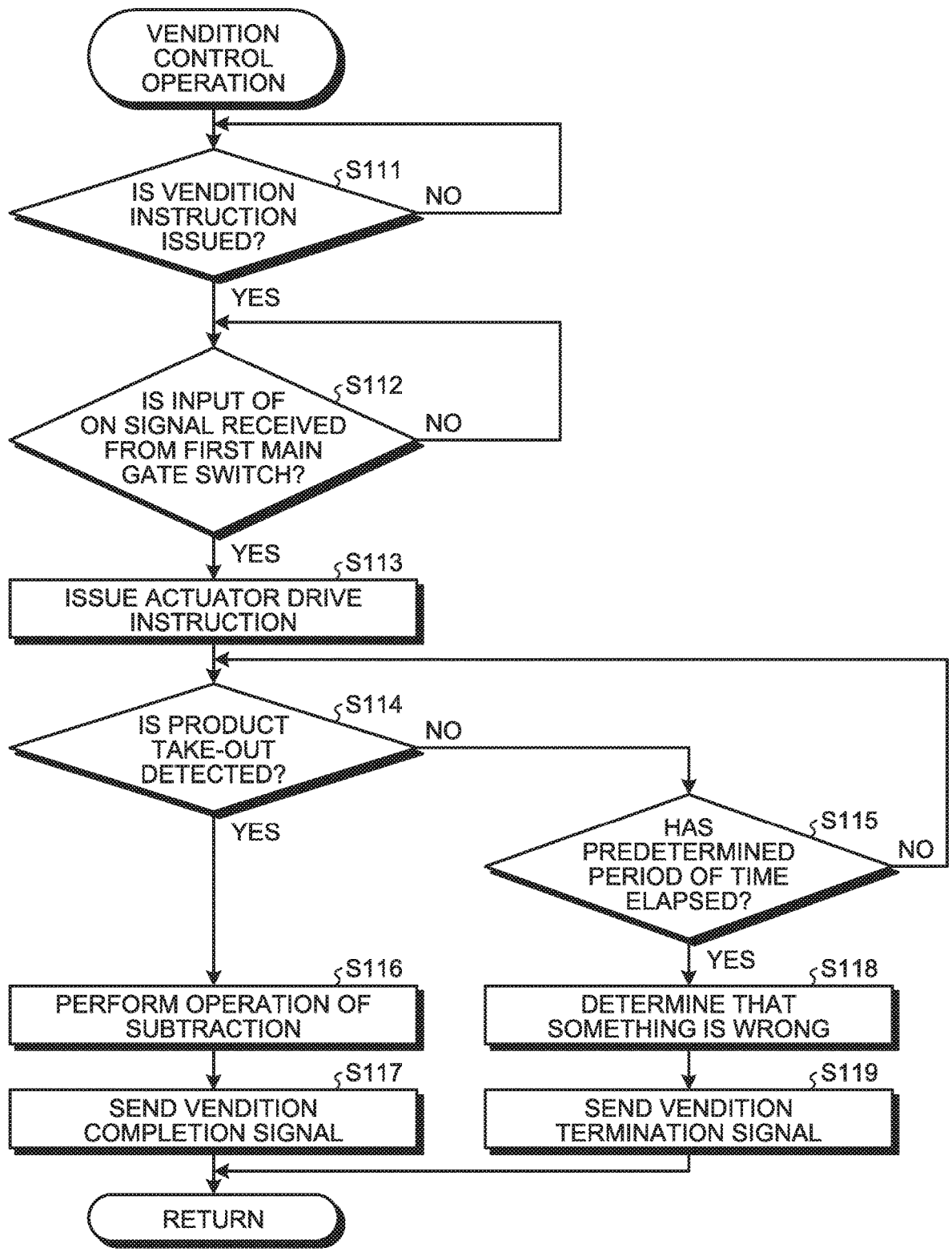
FIG. 47 is a flowchart for explaining the details of another example of the vendition control operation performed by the product storage control unit illustrated in FIG. 45.

FIG. 47 is a flowchart for explaining the details of another example of the vendition control operation performed by the product storage control unit 80 illustrated in FIG. 45.

During the vendition control operation, when a vendition instruction is received from the automatic-vending-machine control unit 9 via the communication processing unit 81 (Yes at Step S111), that is, when a vendition instruction is issued by the automatic-vending-machine control unit 9 in response to the insertion of the desired amount of money, the product storage control unit 80 waits for the input of an ON signal from the first main gate switch 56 (Step S112). As described above, the first main gate switch 56 detects upward swing of the first main gate 42a from the advanced position even if the first main gate 42a has not retracted from the product storage column 30a. Hence, even in the state in which the first main gate 42a is regulated from moving away from the product storage column 30a due to the sliding member 45 at the regulation position, the first main gate 42a can switch to the ON state with only a slight upward swing and can send an ON signal to the product storage control unit 80.

When the input of an ON signal is received from the first main gate switch 56 via the input processing unit 82 (Yes at Step S112), the product storage control unit 80 assumes that the product 1 is selected in the product storage device 20 and issues a driving instruction to the actuator 60 using the output processing unit 84 and drives the actuator 60 for the purpose of rotating the linking member 66 from the standard posture to the relay posture (Step S113).

As a result of driving the actuator 60, the product storage device 20 switches from the locked state to the vendible state. Upon issuing the driving instruction to the actuator 60, the product storage control unit 80 detects whether the foremost product 1 has been taken out until the elapse of a predetermined period of time (Steps S114 and S115).

In the product storage device 20, when the product 1 is taken out in the vendible state, the foremost product 1 moves in the anterior direction so that first the first main gate 42a moves away from the product storage column 30a and then the second main gate 42b moves away from the product storage column 30a. Thus, within the predetermined period of time, it is detected whether an ON signal is first received from the first main gate switch 56 and then received from the second main gate switch 57.

If the product 1 is detected to have been taken out within the predetermined period of time (Yes at Step S114, No at Step S115), then the product storage control unit 80 performs an operation of subtraction using the subtraction unit 83 (Step S116).

Upon performing the operation of subtraction, the product storage control unit 80 sends a vendition completion signal to the automatic-vending-machine control unit 9 using the communication processing unit 81 (Step S117). Then, the sequence control returns, and the operations are ended.

As a result, it becomes possible to notify the automatic-vending-machine control unit 9 about the fact that the product 1 has been taken out from the product storage device 20, thereby enabling the automatic-vending-machine control unit 9 to perform monetary operations such as payment of the change.

Meanwhile, if the product 1 is not detected to have been taken out within the predetermined period of time (No at Step S114, Yes at Step S115), then the product storage control unit 80 determines that something is wrong (Step S118) and sends a vendition termination signal to the automatic-vending-machine control unit 9 using the communication processing unit 81 (Step S119). Then, the system control returns, and the operations are ended.

As a result, it becomes possible to notify the automatic-vending-machine control unit 9 about the fact that the product 1 has not been taken out from the product storage device 20, thereby enabling the automatic-vending-machine control unit 9 to perform monetary processing such as returning the inserted amount of money.

In this way, in the product storage device 20 that performs the vendition control operation as illustrated in FIG. 47, when the first main gate switch 56 detects the swing of the first main gate 42a in the state in which the sliding member 45 is at the regulation position, the product storage control unit 80 slides the sliding member 45 from the regulation position under the assumption that the product 1 has been selected from the product storage column 30a. Hence, unlike in the related art technology, it is not the case where the selection of the product is to be made on a basis of product rack representing a set of a plurality of product storage devices. Thus, not only the product storage device 20 need not be installed in the same layer as other product storage devices 20 storing the products 1 of the same price, but the product storage device 20 can also be used to store the products 1 having different prices than the products stored in the product storage devices 20 installed in the same layer. As a result, in each product storage device 20, it becomes possible to enhance the degree of freedom of installation and to enhance the degree of freedom of the products 1 to be stored.

Besides, the selection of the product storage device 20 is determined according to the detection by the first main gate switch 56. As a result, the product selection button 332 and the accompanying switches are no longer required, and the resultant decrease in the number of components enables achieving reduction in the manufacturing cost.

Figure 48:
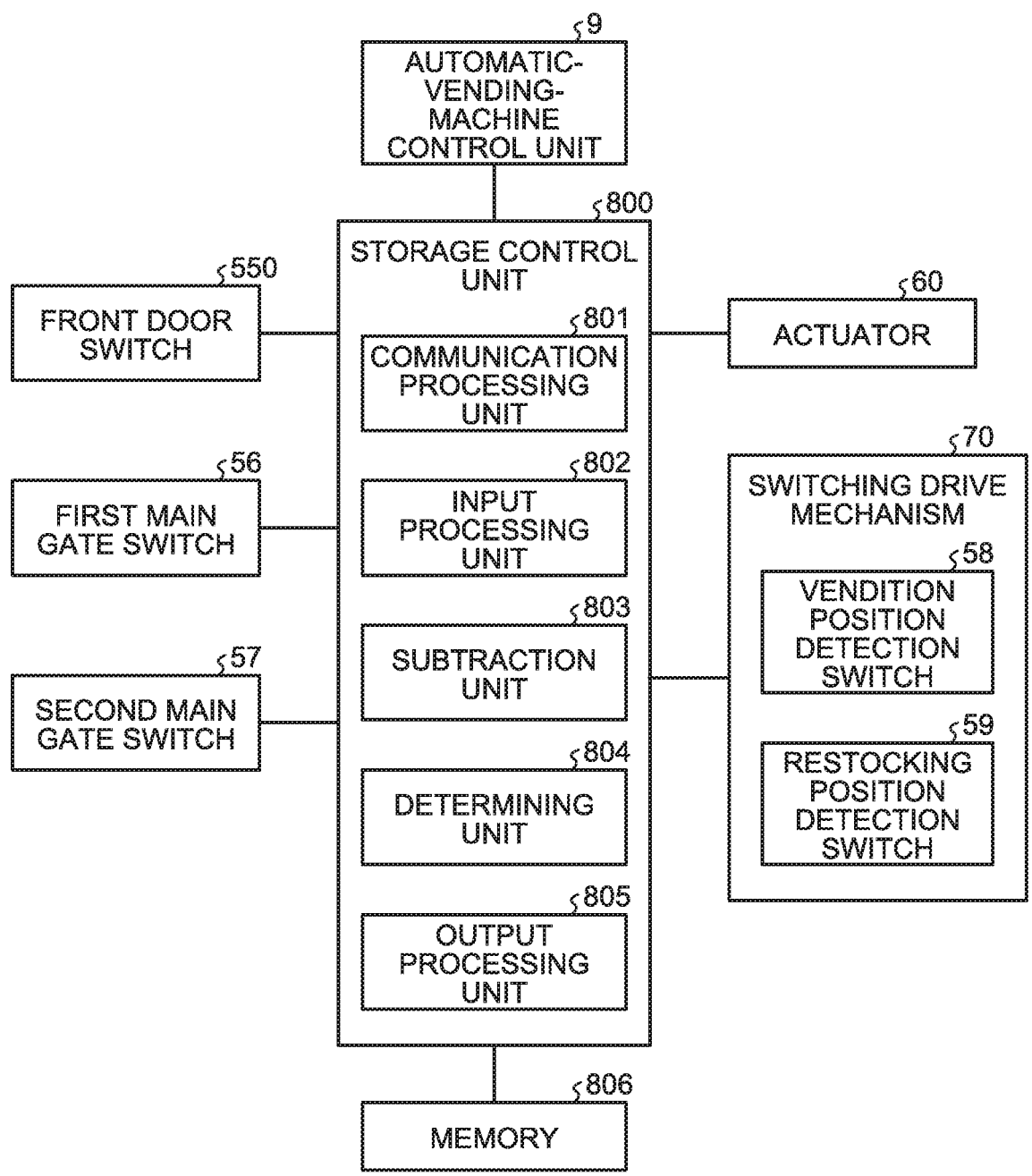
FIG. 48 is a block diagram that schematically illustrates a characteristic control system of the automatic vending machine according to the embodiment of the present disclosure.

FIG. 48 is a block diagram that schematically illustrates a characteristic control system of the automatic vending machine according to the embodiment of the present disclosure. As illustrated in FIG. 48, the automatic vending machine includes a front door switch 550, the first main gate switch 56, the second main gate switch 57, the vendition position detection switch 58, the restocking position detection switch 59, and a storage control unit 800.

When the front-face opening of the storage shelf 11 is closed by the front door 13, the front door switch 550 switches to the OFF state and outputs a front door OFF signal to the storage control unit 800. When the front-face opening of the storage shelf 11 is opened by the front door 13, the front door switch 550 switches to the ON state and outputs a front door ON signal to the storage control unit 800.

The first main gate switch 56 is as described earlier, and switches to the ON state when the contact maker 56a gets pressed and then sends an ON signal to the storage control unit 800.

The second main gate switch 57 is as described earlier, and switches to the ON state when the contact maker 57a gets pressed and then sends an ON signal to the storage control unit 800.

The vendition position detection switch 58 is as described earlier, and switches to the ON state when the contact maker 58a gets pressed and then sends an ON signal to the storage control unit 800.

The restocking position detection switch 59 is as described earlier, and switches to the ON state when the contact maker 59a gets pressed and then sends an ON signal to the storage control unit 800.

The storage control unit 800 comprehensively controls all of the operations of the product storage device 20 according to computer programs and data stored in a memory 806; and includes a communication processing unit 801, an input processing unit 802, a subtraction unit 803, a determining unit 804, and an output processing unit 805. The communication processing unit 801 performs communication with the automatic-vending-machine control unit 9 that controls the main operations of the automatic vending machine.

The input processing unit 802 receives input of ON signals from the front door switch 550, the first main gate switch 56, and the second main gate switch 57. The subtraction unit 803 performs an operation of subtraction when the product 1 is detected to have been taken out as well as calculates a total subtraction count A that represents the total value of the number of subtractions per vendition. The determining unit 804 refers to a subtraction allowable count X read from the memory 806 and the total subtraction count A, and determines whether the total subtraction count A has reached the subtraction allowable count X. The output processing unit 805 issues driving instructions and driving termination instructions to the actuator 60 and the switching drive mechanism 70.

Figure 49:
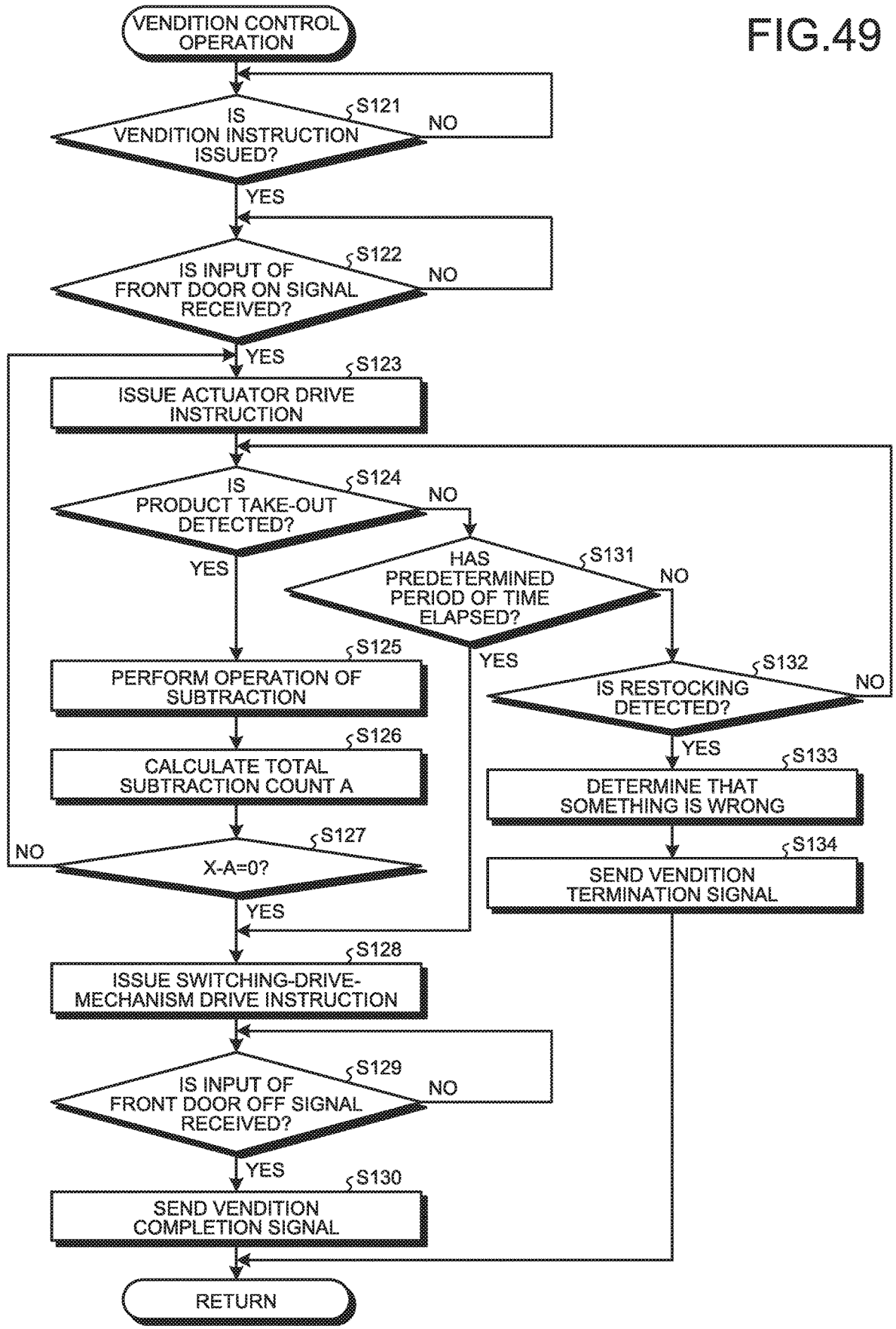
FIG. 49 is a flowchart for explaining the details of a vendition control operation performed by a storage control unit illustrated in FIG. 48.

FIG. 49 is a flowchart for explaining the details of a vendition control operation performed by the storage control unit 800 illustrated in FIG. 48. Herein, the operations performed by the automatic vending machine are explained while explaining the vendition control operation.

During the vendition control operation, when a vendition instruction is received from the automatic-vending-machine control unit 9 via the communication processing unit 801 (Yes at Step S121), that is, when a vendition instruction is issued by the automatic-vending-machine control unit 9 in response to the insertion of the desired amount of money, the storage control unit 800 waits for the input of a front door ON signal from the front door switch 550 (Step S122).

When the input of a front door ON signal is received from the front door switch 550 via the input processing unit 802 (Yes at Step S122), that is, when the front door 13 moves in the opening direction thereby resulting in the opening of the front-face opening of the storage shelf 11; the storage control unit 800 issues a driving instruction to the actuator 60 via the output processing unit 805 and drives the actuator 60 for the purpose of rotating all linking members 66, which are coupled to each product storage device 20, from the standard posture to the relay posture (Step S123).

As a result of driving the actuator 60, all product storage devices 20 switch from the locked state to the vendible state. Upon issuing the driving instruction to the actuator 60, the storage control unit 800 detects whether the foremost product 1 has been taken out from any one product storage device 20 (Step S124).

In the product storage device 20, when the product 1 is taken out in the vendible state, the foremost product 1 moves in the anterior direction so that first the first main gate 42a moves away from the product storage column 30a and then the second main gate 42b moves away from the product storage column 30a. Thus, it is detected whether there is any product storage device 20 in which an ON signal is first received from the first main gate switch 56 and then received from the second main gate switch 57.

If the product 1 is detected to have been taken out (Yes at Step S124), then the storage control unit 800 performs an operation of subtraction using the subtraction unit 803 and calculates the total subtraction count A during the current vendition control operation (Steps S125 and S126).

After calculating the total subtraction count A, the storage control unit 800 reads the subtraction allowable count X from the memory 806 using the determining unit 804. The subtraction allowable count X is the maximum value of the number of products that can be taken out in a single attempt of vendition, and is equal to three of five, for example. Subsequently, using the determining unit 804, the storage control unit 800 determines whether the total subtraction count A has reached the subtraction allowable count X (Step S127).

If it is determined that the total subtraction count A has not reached the subtraction allowable count X, that is, if it is determined that X-A>0 holds true (No at Step S127); then the storage control unit 800 performs the operation at Step S123 and sets the product storage device 20 from which taking out of the product 1 is detected to the vendible state.

On the other hand, if it is determined that the total subtraction count A has reached the subtraction allowable count X, that is, if it is determined that X-A=0 holds true (Yes at Step S127); then the storage control unit 800 issues a driving instruction to the switching drive mechanism 70 using the output processing unit 805 for the purpose of terminating vendition of the products 1 from all product storage devices 20 (Step S128). More particularly, the storage control unit 800 issues a driving instruction to a drive switching mechanism 70 and rotates the switching cam 72 for one revolution.

As described earlier, in the switching cam 72, since the first restocking position displacement portion 721b is present as a point, when the switching cam 72 in the initial posture is rotated in the clockwise direction when viewed from the right-hand side, the columnar protrusion 713 moves through the first switching portion 721e, the first restocking position displacement portion 721b, and the second switching portion 721f in that order. Thus, all switching sliders 71 can be displaced upward in a short period of time, and all switching plates 50 can be temporarily slid to the left-hand side. As a result, all switching members 46 can be moved to the restocking positions and then can again be moved to the vendition positions.

As a result of temporarily moving all switching members 46 to the restocking positions, the lever projections 431b of all levers 43 can be separated from the notches 463 of the corresponding switching members 46 and can be made to abut against the rear rim portion of the switching members 46. With that, the levers 43 in the regulation posture can be swung upward against the biasing force of the respective lever springs 435. As a result, the sliding members 45 move in the anterior direction due to the biasing force of the respective first slide springs 453, and the sliding projections 451c get positioned in the upper part of the depressed portions 421b of the first main gates 42a. When the switching members 46 move from the restocking positions to the vendition positions, the lever projections 431b enter the notches 463, and the levers 43 switch to the standby posture. With that, all product storage devices 20 can be set to the locked state.

After setting all product storage devices 20 to the locked state, the storage control unit 800 waits for the input of a front door OFF signal from the front door switch 550 (Step S129).

When a front door OFF signal is received from the front door switch 550 via the input processing unit 802 (Yes at Step S129), that is, when the front door 13 moves in the closing direction thereby resulting in the closing of the front-face opening of the storage shelf 11; the storage control unit 800 sends a vendition completion signal to the automatic-vending-machine control unit 9 (Step S130). Then, the sequence control returns, and the operations are ended.

As a result, it becomes possible to notify the automatic-vending-machine control unit 9 about the fact that a predetermined number of products 1 have been taken out from the product storage devices 20.

Meanwhile, at Step S124, if the product 1 is not detected to have been taken out even after the elapse of a predetermined period of time (No at Step S124, Yes at Step S131), then the storage control unit 800 performs the operations from Steps S128 to S130. Then, the sequence control returns, and the operations are ended.

Meanwhile, if the product 1 is not detected to have been taken out at Step S124 and if restocking of the product 1 is detected (No at Step S124, No at Step S131, and Yes at Step S132), that is, if there is any product storage device 20 in which an ON signal is first received from the second main gate switch 57 and then received from the first main gate switch 56; then the storage control unit 800 determines that something is wrong with the product storage device 20 (Step S133) and sends a vendition termination signal, which indicates termination of vendition from the product storage device 20, to the automatic-vending-machine control unit 9 using the communication processing unit 801 (Step S134). Then, the sequence control returns, and the operations are ended.

As a result, the vendition from the product storage device 20 is regulated, and thus the vendition of different products than the target product 1 is avoided.

As described above, in the automatic vending machine according to an embodiment of the present disclosure, when the lever 43 that is disposed to be swingable along with the first main gate 42*a* switches to the standby state, the sliding member 45 is allowed to be present at the regulation position. Hence, the first main gate 42*a* can be regulated from moving away and retracting from the product storage column 30*a*, and the product 1 can be prevented from being taken out from the product storage column 30*a*. When the sliding member 45 slides from the regulation position, the lever 43 switches to the regulation posture and regulates the sliding member 45 from returning to the regulation position. Hence, the foremost product 1 is allowed to be taken out from the product storage column 30*a*. At that time, the neighboring product 1 on the posterior side of the foremost product 1 is regulated by the sub-gate 44 from moving in the anterior direction. Hence, there is no risk of a plurality of products 1 being taken out at once. Subsequently, as a result of taking out the foremost product 1, when the first main gate 42*a* moves away from the product storage column 30*a*, the lever 43 switches to the standby posture due to the advancement of the first main gate 42*a* to the product storage column 30*a*, and thus allows the sliding member 45 to return to the regulation position. Hence, once a take-out operation is performed, taking out of any further products 1 from the product storage column 30*a* can be prevented.

In this way, in each product storage device 20 of the automatic vending machine, taking out a single product 1 is allowed by the take-out mechanism 40 representing a constituent element of the product storage device 20. Thus, unlike in the related art technology, it is not the case where the selection of the product to be made on a basis of the product rack representing a set of a plurality of product storage devices. Hence, not only the product storage device 20 need not be installed in the same layer as other product storage devices 20 storing the products 1 of the same price, but the product storage device 20 can also be used to store the products 1 having different prices than the products stored in the product storage devices 20 installed in the same layer.

Thus, in the automatic vending machine, it becomes possible to enhance the degree of freedom of installation of the product storage devices 20 and to enhance the degree of freedom of the products 1 to be stored in the product storage devices 20.

Particularly, in the automatic vending machine, in the case of terminating the vendition of the products 1 stored in the product storage device 20 (the product storage column 30*a*), the switching member 46 that is movable between the vendition position and the restocking position is first moved to the restocking position, thereby regulating the lever 43 from switching to the standby posture and the regulation posture. With that, the sliding member 45 can be slid toward the regulation position. Subsequently, the switching member 46 is moved to the vendition position so that the lever 43 switches to the standby posture. Hence, the first main gate 42*a* can be regulated from moving away from the product storage column 30*a*, and as a result the product 1 can be prevented from being taken out from the product storage device 20.

Moreover, in the automatic vending machine, the second main gate 42*b* is disposed more on the anterior side of the product storage column than the first main gate 42*a*; and the first main gate switch 56 is disposed to detect the away movement of the first main gate 42*a* from the advanced position, and the second main gate switch 57 is disposed to detect the away movement of the second main gate 42*b* from the product storage column 30*a*. Hence, when first the first main gate switch 56 detects that the first main gate 42*a* has moved away from the advanced position and then the second main gate switch 57 detects that the second main gate 42*b* has moved away from the product storage column 30*a*, the storage control unit 800 becomes able to determine that the product 1 has been taken out from the product storage device 20. On the other hand, when first the second main gate switch 57 detects that the second main gate 42*b* has moved away from the product storage column 30*a* and then the first main gate switch 56 detects that the first main gate 42*a* has moved away from the advanced position, the storage control unit 800 becomes able to determine that the product 1 has been restocked in the product storage device 20.

Besides, in the state in which vendition from the product storage device 20 is allowed, when first the second main gate switch 57 detects that the second main gate 42*b* has moved away from the product storage column 30*a* and then the first main gate switch 56 detects that the first main gate 42*a* has moved away from the advanced position, the storage control unit 800 regulates the vendition of the product 1 from the product storage device 20. With that, it becomes possible to regulate the vendition of the product 1 from the product storage device 20 in which the products 1 have been restocked.

Given below is the explanation of modification examples of the product storage device and the automatic vending machine according to the embodiment of the present disclosure.

Modification Examples

Figure 50:
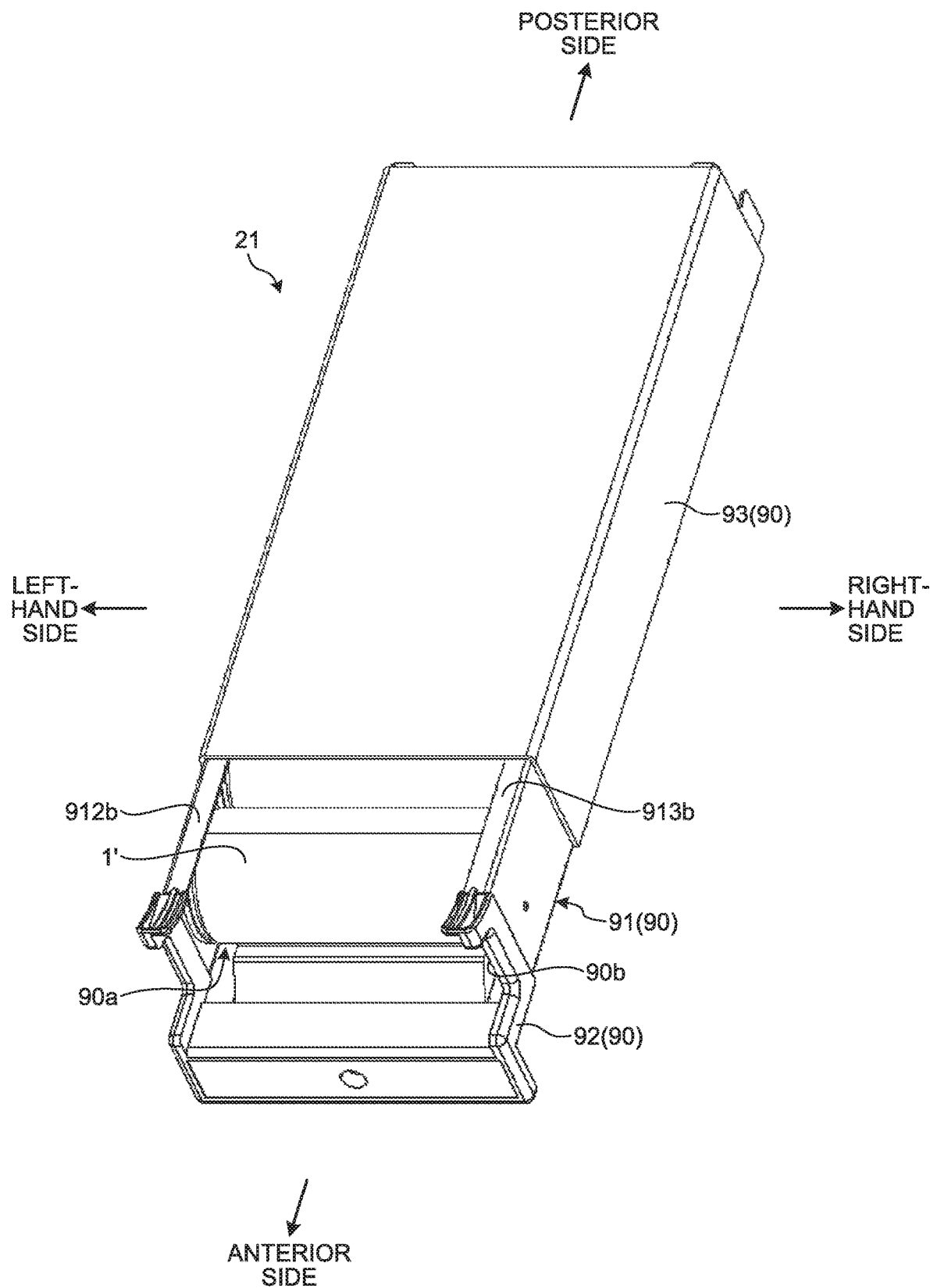
FIG. 50 is a perspective view of another example of the product storage device according to the present disclosure.
Figure 51:
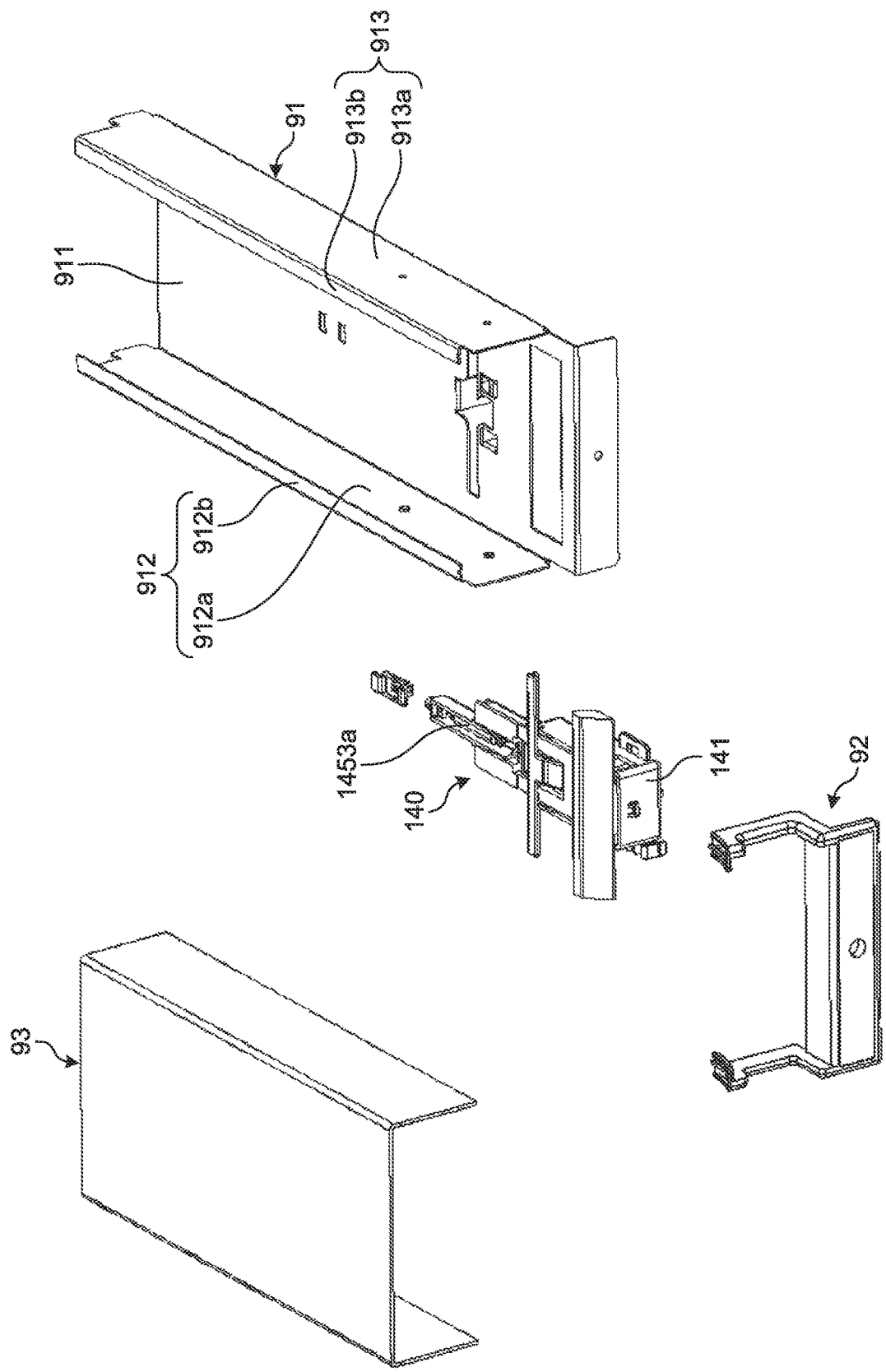
FIG. 51 is an exploded perspective view of the product storage device illustrated in FIG. 50.

FIGS. 50 and 51 are diagrams illustrating another example of the product storage device according to the present disclosure. FIG. 50 is a perspective view, and FIG. 51 is an exploded perspective view. As illustrated in FIGS. 50 and 51, a product storage device 21 includes a rail member 90 and a take-out mechanism 140.

The rail member 90 includes a rail main body 91, a front cover 92, and a rail cover 93. The rail main body 91 is manufactured by, for example, appropriately bending a steel plate, and has an elongated shape with the front-back direction serving as the longitudinal direction. The rail main body 91 is supported by a supporting member (not illustrated) to have a gradually-downward slant toward the anterior side.

The rail main body 91 is made of a rail base portion 911, a rail left-side end 912, and a rail right-side end 913 configured in an integrated manner. The rail base portion 911 is a tabular portion forming the bottom face of the rail main body 91. The rail left-side end 912 is formed in an integrated manner to be continuous with the left-side edge of the rail base portion 911. The rail left-side end 912 is made of a rail left-side end upward-extending portion 912*a*, which extends upward from the left-side edge of the rail base portion 911, and a rail left-side end rightward-extending portion 912*b*, which extends rightward from the rail left-side end upward-extending portion 912*a*, configured in an integrated manner. The rail right-side end 913 forms a right-left pair with the rail left-side end 912, and is formed in an integrated manner to be continuous with the right-side edge of the rail base portion 911. The rail right-side end 913 is made of a rail right-side end upward-extending portion 913*a*, which extends upward from the right-side edge of the rail base portion 911, and a rail right-side end leftward-extending portion 913*b*, which extends leftward from the rail right-side end upward-extending portion 913*a*, configured in an integrated manner.

The rail left-side end upward-extending portion 912*a* and the rail right-side end upward-extending portion 913*a* have the substantially same length in the vertical direction and have mutually opposite inner faces. Hence, the rail left-side end rightward-extending portion 912*b* and the rail right-side end leftward-extending portion 913*b* have substantially identical lengths of extension and substantially identical heights.

In the rail member 90, the greatest clearance between the rail left-side end 912 and the rail right-side end 913, that is, the clearance between the rail left-side end upward-extending portion 912*a* and the rail right-side end upward-extending portion 913*a* is greater than the length in the height direction of a product 1' that is stored in a bottomed cylindrical can container; and the smallest clearance between the rail left-side end 912 and the rail right-side end 913, that is, the clearance between the rail left-side end rightward-extending portion 912*b* and the rail right-side end leftward-extending portion 913*b* is smaller than the length in the height direction of the product 1'. Moreover, the length of extension in the upward direction of the rail left-side end upward-extending portion 912*a* and the rail right-side end upward-extending portion 913*a* from the rail base portion 911 is greater than the greatest diameter of the product 1'.

With that, in the rail member 90, when the product 1' is inserted from the anterior side in the horizontally-fallen posture, the product 1' can be placed on the top face of the rail base portion 911 in the horizontally-fallen posture and in a rollable manner along the front-back direction. Consequently, the rail member 90 constitutes a product storage column 90*a* that supports the product 1' in the horizontally-fallen posture and stores the product 1' in alignment in the front-back direction.

The front cover 92 is made of a resin material and is attached to cover the leading end portion of the rail main body 91. The opening of the front cover 92 constitutes a dispensing slot 90*b* of the product storage column 90*a*.

The rail cover 93 is manufactured by, for example, bending a steel plate. The rail cover 93 has a slightly greater right-left width than the right-left width of the rail main body 91, and has a smaller length in the front-back direction than the length in the front-back direction of the rail main body 91. The rail cover 93 is attached to cover the posterior-side top face of the rail main body 91. As a result of attaching the rail cover 93, only the foremost product 1' that is the downstream-most product closest to the dispensing slot 90*b* gets exposed as illustrated in FIG. 50.

Figure 52:
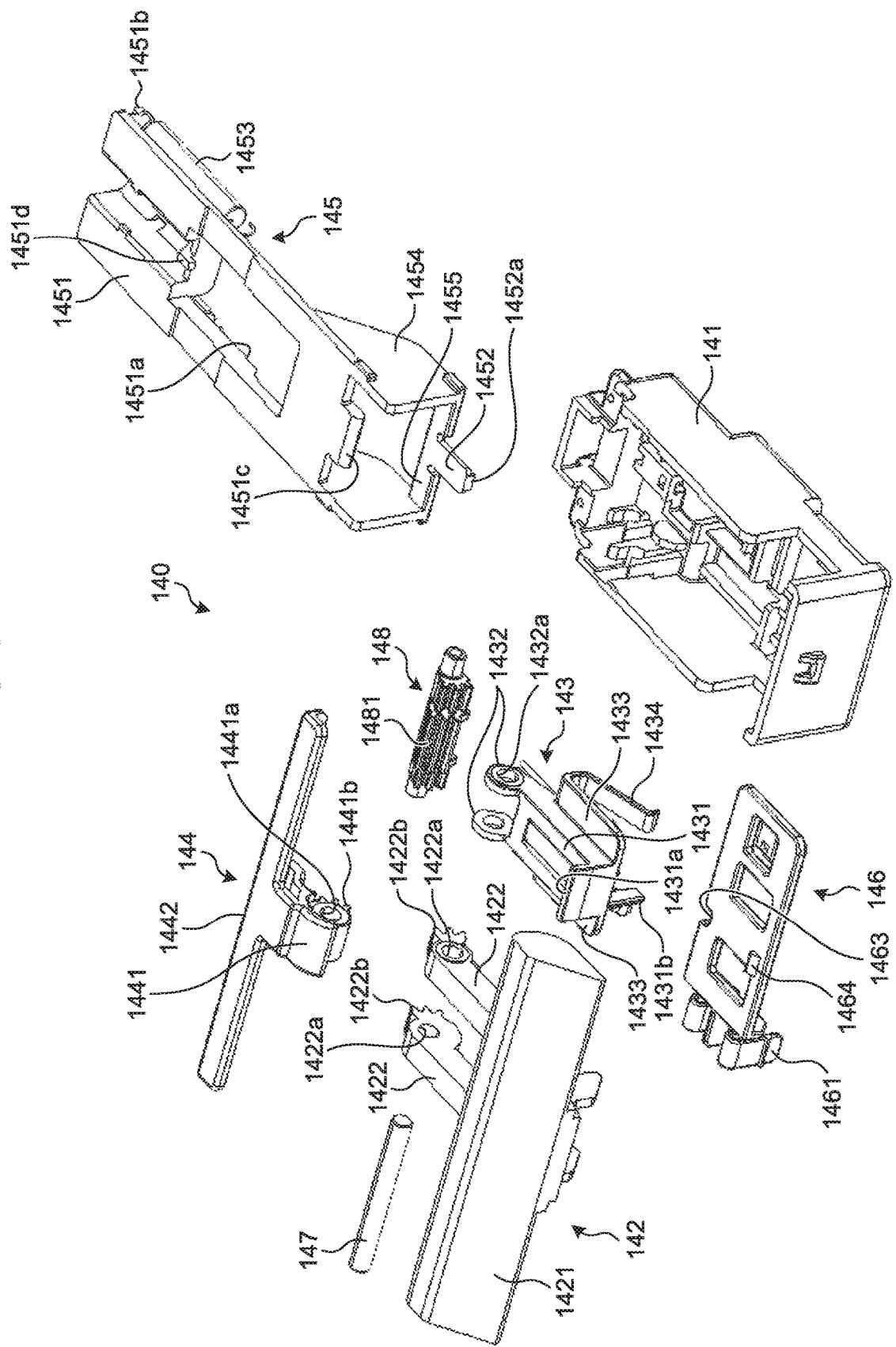
FIG. 52 is an exploded perspective view of the main constituent elements of a take-out mechanism illustrated in FIG. 51.

FIG. 52 is an exploded perspective view of the main constituent elements of the take-out mechanism 140 illustrated in FIG. 51. On the bottom face of the rail base portion 911 of the rail main body 91 in the rail member 90, the take-out mechanism 140 is largely covered by a cover 141; and includes a main gate 142, a lever 143, a sub-gate 144, a sliding member 145, and a switching member 146.

The main gate 142 is made of, for example, a resin material and includes a gate leading end portion 1421 and gate arm members 1422. The gate leading end portion 1421 is positioned on the anterior side. The gate arm members 1422 form a right-left pair and extend in the posterior direction from the lower part of the rear end portion of the gate leading end portion 1421. In each gate arm member 1422, a gate shaft hole 1422*a* is formed in the rear end portion; and a gate gear unit 1422*b* is formed at the rear edge portion of the gate shaft hole 1422*a*.

When a rod-like shaft 147, which has the right-left direction as the axial direction, is inserted through the gate shaft hole 1422*a* of each gate arm member 1422, the main gate 142 swings around the central axis of the shaft 147. The both ends on the right and left sides of the shaft 147 are supported by supporting members (not illustrated) disposed on the cover 141.

The lever 143 is made of, for example, a resin material and includes a lever base portion 1431, lever arm members 1432, and lever fin members 1433.

The lever base portion 1431 has a smaller right-left width than the right-left width between the gate arm members 1422, and has a lever locking piece 1431*a* disposed at the leading end portion thereof. The lever locking piece 1431*a* protrudes upward from the leading end portion of the lever base portion 1431. In the lower part of the leading end portion of the lever 143, a lever projection 1431*b* is disposed. The extending end portion of the lever projection 1431*b* passes through a hole (not illustrated) formed on the cover 141 and protrudes downward from the cover 141.

The lever arm members 1432 form a right-left pair and extend in the posterior direction from the both ends in the right and left side in the rear end portion of the lever base portion 1431. In the rear end portion of each lever arm member 1432, a lever shaft hole 1432*a* is formed. The width between the lever arm members 1432 is smaller than the width between the gate arm members 1422.

The lever fin members 1433 are tabular in shape and form a right-left pair disposed on the both ends on the right and left sides in the lower part of the lever base portion 1431. One of the lever fin members 1433 protrudes leftward from the left-side end portion in the lower part of the lever base portion 1431, and the other lever fin member 1433 protrudes rightward from the right-side end portion in the lower part of the lever base portion 1431.

In the rear end portion of each lever fin member 1433, a lever locking member 1434 is disposed. The lever locking member 1434 extends at a gradual downward slant from the rear end portion toward the anterior side.

When the shaft 147 is inserted through the lever shaft holes 1432*a* of the lever arm members 1432, the lever 143 swings around the central axis of the shaft 147 between the gate arm members 1422. When the leading end portion of the lever locking members 1434 abut against the bottom face on the inside of the cover 141, the leading end portion of the lever base portion 1431 swings upward in the normal state due to the elastic restoration force of the lever member 143. As a result of the upward swing of the lever 143, the lever fin members 1433 press the bottom face of the gate arm members 1422 of the main gate 142. Hence, the main gate 142 becomes swingable to advance to and move away from the product storage column 90a through an opening formed on the rail base portion 911 and, in the normal state in which only the elastic restoration force of the lever 143 is exerted, advances to the product storage column 90a.

The sub-gate 144 is made of, for example, a resin material and includes a sub-gate leading end portion 1441 and a sub-gate rear end portion 1442.

The sub-gate leading end portion 1441 refers to the portion on the anterior side and has a smaller right-left width than the right-left width between the lever arm members 1432. In the sub-gate leading end portion 1441, a sub-gate shaft hole 1441a is formed; and a sub-gate gear unit 1441b is disposed at the lower edge portion of the sub-gate shaft hole 1441a.

When the shaft 147 is inserted through the sub-gate shaft hole 1441a, the sub-gate 144 swings around the central axis of the shaft 147 between the lever arm members 1432.

The sub-gate gear unit 1441b of the sub-gate 144 engages with a first linkage gear unit 1481 of a linking member 148 that is disposed on the cover 141 in a swingable manner around the shaft center of its own shaft. The linking member 148 has the right-left direction serving as the longitudinal direction, and second linkage gear units 1482 are disposed on the both ends on the right and left sides of the first linkage gear unit 1481. The second linkage gear units 1482 engage with the gate gear unit 1422b of the main gate 142.

Thus, the sub-gate 144 is linked with the main gate 142 via the linking member 148. When the main gate 142 advances to the product storage column 90a, the sub-gate rear end portion 1442 moves away from the product storage column 90a through an opening formed on the rail base portion 911. When the main gate 142 moves away from the product storage column 90a, the sub-gate rear end portion 1442 advances to the product storage column 90a through the opening formed on the rail base portion 911.

The sliding member 145 is made of, for example, a resin material and is disposed to be slidable along the front-back direction (the direction of storing the products 1' in the product storage column 90a) with some part thereof remaining exposed from the cover 141. The sliding member 145 includes a sliding base portion 1451 and a sliding locking portion 1452.

The sliding base portion 1451 is substantially tabular in shape and has an opening 1451a formed thereon for allowing the entry of the sub-gate 144. In the rear end portion at the both ends on the right and left sides of the sliding base portion 1451, first spring locking members 1451b are disposed that protrude in the downward direction. Herein, first sliding springs 1453 that have one end thereof locked to the rear face of the cover 141 have the other end thereof locked to the first spring locking members 1451b. Due to the first sliding springs 1453, the sliding member 145 is constantly biased in the anterior direction.

In the middle part of the anterior end portion of the sliding base portion 1451, a sliding projection 1451c is disposed that protrudes in the anterior direction. Moreover, in the upper part of the middle part of the rear end portion of the sliding base portion 1451, a second spring locking member 1451d is disposed. Herein, a second sliding spring 1453a (see FIG. 51) having one end thereof locked to a coupling member 149 has the other end thereof locked to the second spring locking member 1451d. The coupling member 149 is slidable along the front-back direction to move close to and away from the sliding member 145, and is constantly biased in the anterior direction by the second sliding spring 1453a. To the rear end portion of the coupling member 149 is coupled a wire cable that is connected to any one linking member 66 of the actuator 60 described earlier.

The sliding locking portion 1452 is disposed in the middle part of a sliding coupling member 1455 that is used for coupling of sliding protruding plates 1454 which form a downwardly-oriented right-left pair on the bottom face of the anterior end portion of the sliding base portion 1451. More specifically, the sliding locking portion 1452 protrudes from the middle part of the sliding coupling member 1455 in the anterior direction, and has a downwardly-protruding sliding locking projection 1452a formed on the leading end portion thereof.

The switching member 146 is made of, for example, a resin material and is tabular in shape. When engagement protruding pieces 1461 and an engagement protruding member (not illustrated), which are formed to protrude downward from the left-side end portion of the switching member 146, are inserted and engaged in an engagement hole formed on a switching plate (not illustrated) that is placed below the cover 141, the switching member 146 becomes slidable along the right-left direction with some part thereof remaining exposed from the cover 141. The switching plate is slid along the right-left direction by the switching drive mechanism 70.

The switching member 146 has a notch 1463 and a switching locking projection 1464 formed thereon. The notch 1463 is formed in the middle part of the rear end of the switching member 146. The switching locking projection 1464 is formed on the leading end side of the bottom face of the switching member 146 and protrudes upward from more right-hand side than the notch 1463.

Given below is the explanation of the operations performed in the product storage device 21. In the locked state of the product storage device 21, since the actuator 60 and the switching drive mechanism 70 are not driven, the switching cam 72 constituting the switching drive mechanism 70 is in the initial posture and the switching member 146 is at the vendition position.

In the locked state, the main gate 142 advances to the product storage column 90a due to the elastic restoration force of the lever 143, and the gate leading end portion 1421 is at the advanced position more on the side of the dispensing slot 90b than the foremost product (the downstream-most product) 1' positioned at the downstream-most side of the product storage column 90a.

The sliding member 145 is biased by the first sliding spring 1453 and is positioned at the regulation position on the anterior side, and the sliding projection 1451c is positioned in the lower part of the gate leading end portion 1421 of the main gate 142. As a result, the main gate 142 is regulated by the sliding member 145 from moving away from the product storage column 90a.

The lever 143 is in the standby posture in which, due to the elastic restoration force thereof, the lever fin members 1433 make contact with the gate arm members 1422 of the main gate 142 and press the main gate 142 to advance to the product storage column 90a. In the standby posture of the lever 143, the lever projection 1431b enters the notch 1463 of the switching member 146 and the lever locking piece 1431a is in contact with the bottom face of the sliding projection 1451c, thereby allowing the sliding member 145 to be at the regulation position. Meanwhile, since the main gate 142 has advanced to the product storage column 90a, the sub-gate rear end portion 1442 of the sub-gate 144 moves away from the product storage column 90a.

In the locked state, when the actuator 60 is driven and the linking member 66 corresponding to the product storage column 90a switches from the standard posture to the relay posture, the coupling member 149 that is coupled to the linking member 66 via a wire cable slides in the posterior direction and the sliding member 145, which is coupled with the coupling member 149 via the second sliding spring 1453a, also slides from the regulation position to the swing allowing position on the posterior side.

In this way, when the sliding member 145 slides to the swing allowing position, the sliding projection 1451c separates from the lower part of the gate leading end portion 1421 of the main gate 142, and the main gate 142 becomes able to swing downward. At that time, because of the separation of the sliding projection 1451c, the lever 143 swings toward the anterior side and switches from the standby posture to the regulation posture; and the lever locking piece 1431a is in contact with the sliding projection 1451c thereby regulating the sliding member 145 from returning to the regulation position from the swing allowing position.

Because of the sliding of the sliding member 145 to the posterior side from the regulating position to the swing allowing position and because of the regulation posture of the lever 143, the product storage device 21 switches from the locked state to the vendible state.

Figure 53:
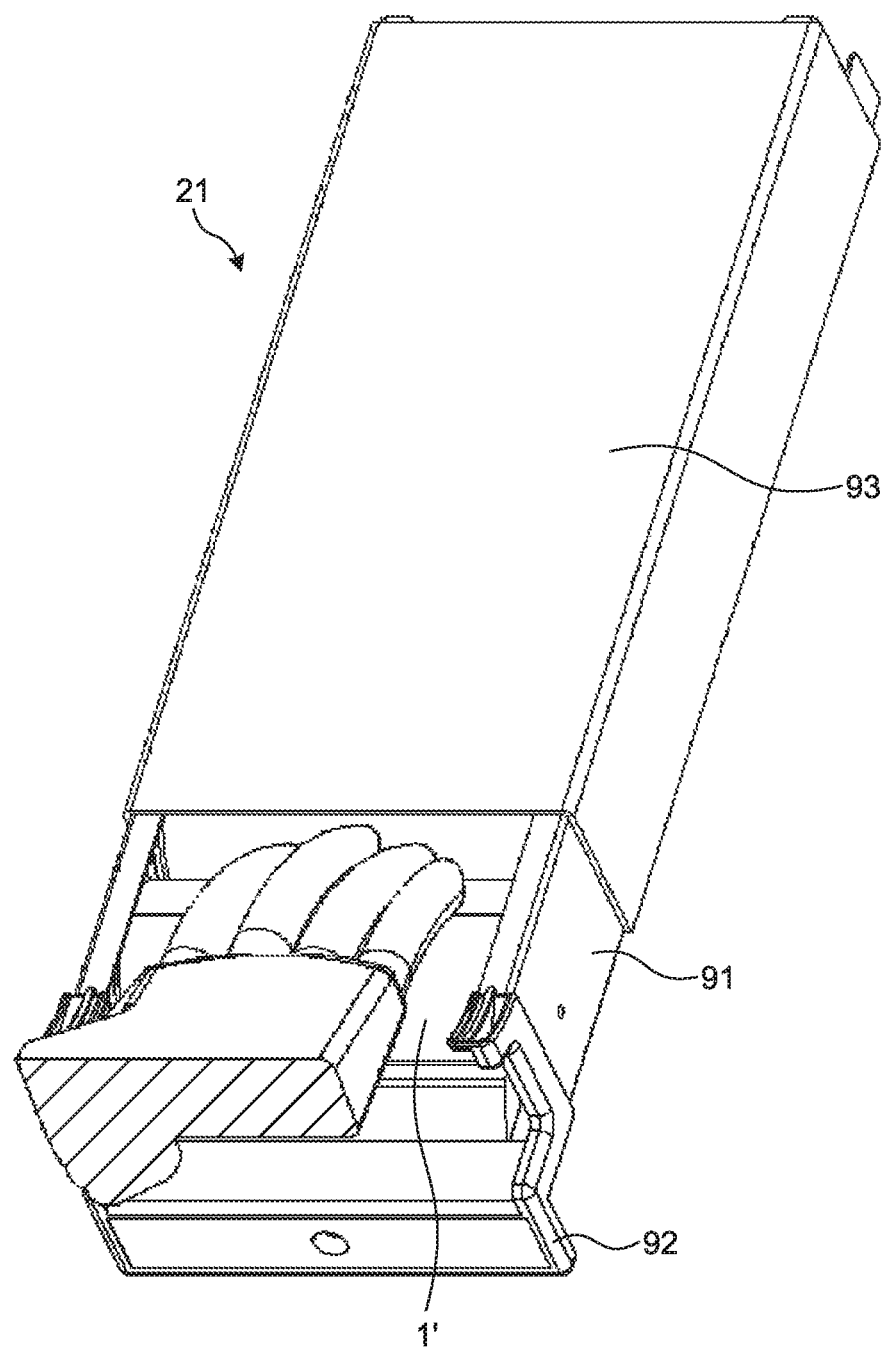
FIG. 53 is a perspective view illustrating the operations performed by the take-out mechanism when the foremost product is taken out from a product storage column.
Figure 54:
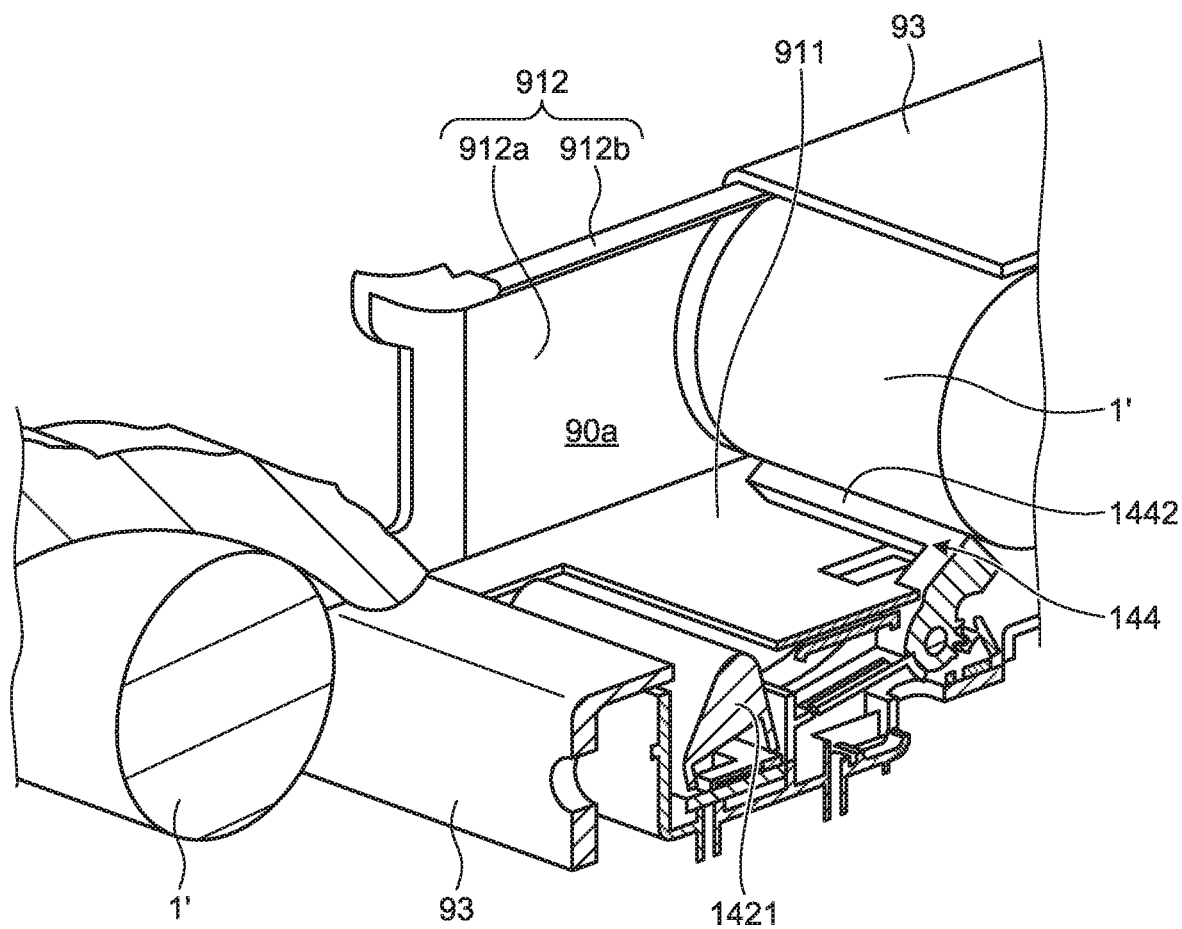
FIG. 54 is an explanatory diagram that schematically illustrates the operations performed by the take-out mechanism when the foremost product is taken out from a product storage column.

Then, as illustrated in FIG. 53, when the foremost product 1' is pulled to the anterior side due to a take-out operation, the main gate 142 at the advanced position swings against the biasing force of the gate spring 423, and moves away from the product storage column 90a as illustrated in FIG. 54. At that time, the sub-gate 144 that is linked with the main gate 142 via the linking member 148 advances to the product storage column 90a, and the sub-gate rear end portion 1442 advances to the anterior side of the neighboring product 1' present on the posterior side of the foremost product 1'.

Since the main gate 142 moves away from the product storage column 90a, the lever 143 too swings downward against its own elastic restoration force. Because of the downward swing of the lever 143, the lever protrusion 1431b separates from the notch 1463 of the switching member 146, and the lever locking piece 1431a separates from the anterior side of the sliding projection 1451c. As a result, the sliding member 145 gets biased by the first sliding spring 1453 and becomes able to slide in the anterior direction.

Thus, when the foremost product 1' is taken out through the dispensing slot 90b, the main gate 142 advances to the product storage column 90a. Because of the advancement of the main gate 142 to the product storage column 90a, the sub-gate 144 moves away from the product storage column 90a.

Then, the gate leading end portion 1421 of the main gate 142 gets positioned at the advanced position and is in contact with the new foremost product 1'. At that time, the sliding projection 1451c returns to the regulation position in the lower part of the main gate 142 and the lever 143 switches to the standby posture, and thus the sliding member 145 that slides in the anterior direction returns to the locked state.

In this way, in the product storage device 21 too, when the lever 143 that is disposed to be swingable along with the main gate 142 switches to the standby posture, the sliding member 145 is allowed to be at the regulation position. Hence, the main gate 142 can be regulated from moving away and retracting from the product storage column 90a, and the product 1' can be prevented from being taken out from the product storage column 90a. When the sliding member 145 slides from the regulation position, the lever 143 switches to the regulation posture and regulates the sliding member 145 from returning to the regulation position. Hence, the foremost product 1' is allowed to be taken out from the product storage column 90a. At that time, the neighboring product 1' on the posterior side of the foremost product 1 is regulated by the sub-gate 144 from moving in the anterior direction. Hence, there is no risk of a plurality of products 1' being taken out. Subsequently, as a result of taking out the foremost product 1', when the main gate 142 moves away from the product storage column 90a, the lever 143 switches to the standby posture due to the advancement of the main gate 142 to the product storage column 90a, and thus allows the sliding member 145 to return to the regulation position. Hence, once a take-out operation is performed, taking out of any further products 1' from the product storage column 90a can be prevented.

In each product storage device 21, the take-out mechanism 140, which represents a constituent element of the product storage device 21, allows a single product 1' to be taken out. Thus, unlike in the related art technology, it is not the case where the selection of the product on a basis of the product rack representing a set of a plurality of product storage devices. Hence, not only the product storage device 21 need not be installed in the same layer as other product storage devices 21 storing the products of the same price, but the product storage device 21 can also be used to store the products 1' having different prices than the products stored in the product storage devices 21 installed in the same layer.

Hence, in each product storage device 21, it becomes possible to enhance the degree of freedom of installation and to enhance the degree of freedom of the products 1' to be stored.

Although the explanation herein is given about a preferred embodiment of the present disclosure and modification examples of the embodiment, the present disclosure is not limited to that embodiments and the modification examples and it is possible to have various modifications.

In the embodiment described above, the actuator 60 is used as the driving source for sliding the sliding member 45, which constitutes the product storage device 20, in the posterior direction from the regulation position. Alternatively, in the present disclosure, either a solenoid circuit can be used, or a common driving source among the product storage devices 20 constituting the same layer can be used for the sliding purpose.

In the embodiment described above, except in the case of rotating the target linking member 66 from the standard posture to the relay posture, the rotating plate 63 of the actuator 60 is rotated in the counterclockwise direction when viewed from the left-hand side. However, in the embodiment, since the linking members 66 in the right-side level are not at all coupled with the product storage devices 20, the rotating plate 63 can be moved up to the right-side level and then can be appropriately rotated in the clockwise direction when viewed from the left-hand side, so that it becomes possible to reduce the period of time taken for moving the hook leading end portion 672 of the hook 67 close to the target linking member 66.

In the present disclosure, a shaft that extends along the right-left direction can be disposed in the lower end portion on the anterior side of the product storage device 20. Because of the shaft, at the time of pulling the foremost product 1 in the anterior direction, the body part 4 of the product 1 is in contact with the shaft thereby making it possible to take out the product 1 in the forward-tilting posture from the product storage column 30a.

In the present disclosure, it is desirable that the rail main body 31 constituting the rail member 30 can be appropriately replaced with another member for the length in the vertical direction and the length in the right-left direction according to the length in the vertical direction of the cap 2 and the diameter of the constriction 5 of the stored products 1. With that, various products 1 can be stored as the targets for storage, thereby enabling achieving enhancement in the vendition opportunities of the products 1.

In the embodiment described above, in the second main gate 42b constituting the main gate 42, the leading end portion of the second locking member 426 is in contact with the top face on the inside of the cover 41 and, due to the elastic restoration force of the second main gate 42b, the second leading end portion 424 advances to the product storage column 30a in the normal state. Alternatively, in the present disclosure, it is possible to implement the following configuration.

Figure 55:
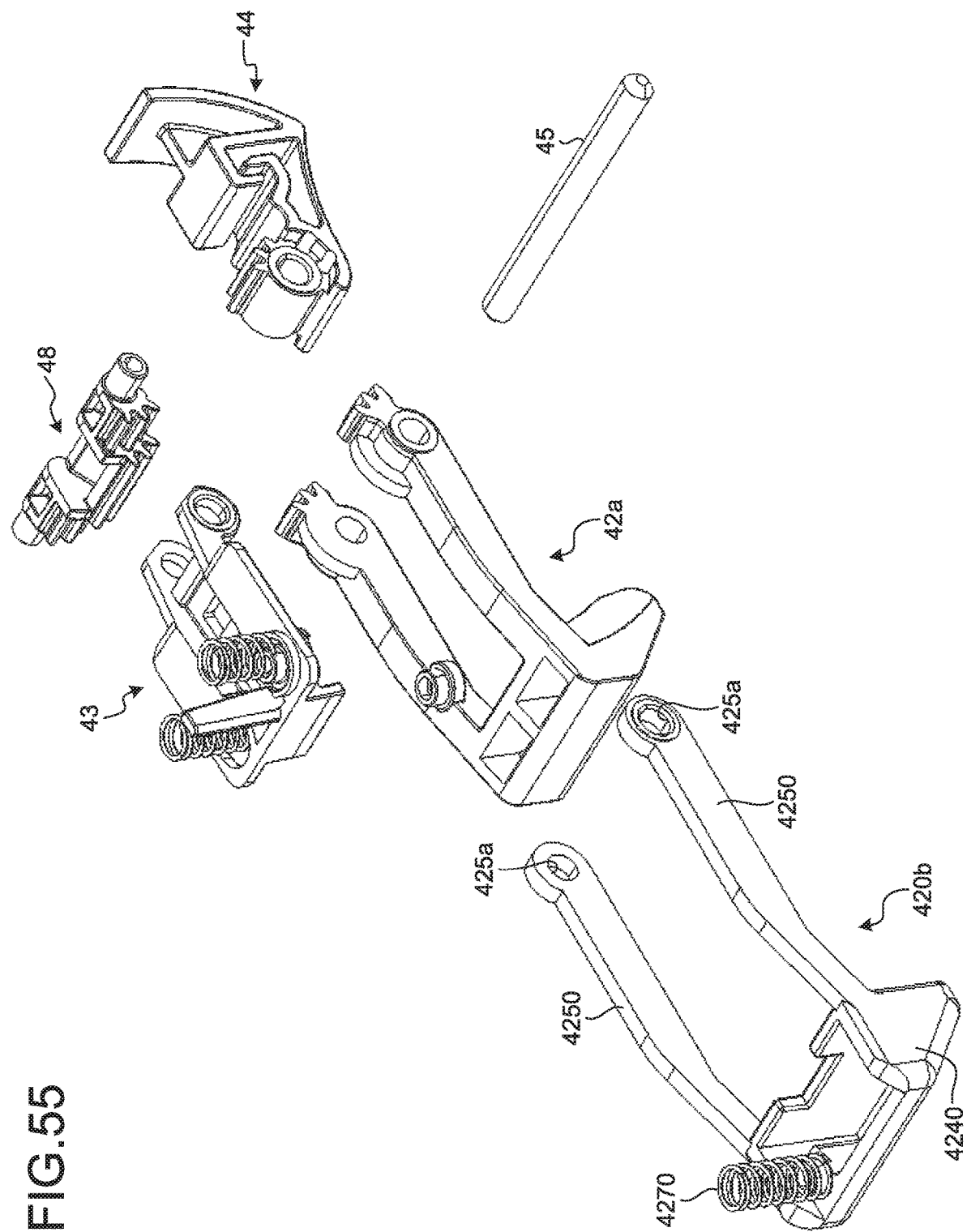
FIG. 55 is an exploded perspective view of some constituent elements of a take-out mechanism in a modification example of the product storage device according to the embodiment of the present disclosure.

As illustrated in FIG. 55, a second main gate 420b does not include the second locking member 426 and, in between a second leading end portion 4240 and the cover 41 (not illustrated), a main gate spring 4270 is disposed due to which the second leading end portion 4240 advances to the product storage column 30a in the normal state. Meanwhile, in the constituent elements of the second main gate 420b, the constituent elements identical to the constituent elements of the second main gate 42b are referred to by the same reference numerals and their explanation is not repeated.

Moreover, second arm members 4250 of the second main gate 420b are configured to have a greater length of extension than the second arm members 425.

Since the second main gate 420b is biased by the main gate spring 4270, it becomes possible to enhance the biasing force.

Figure 56:
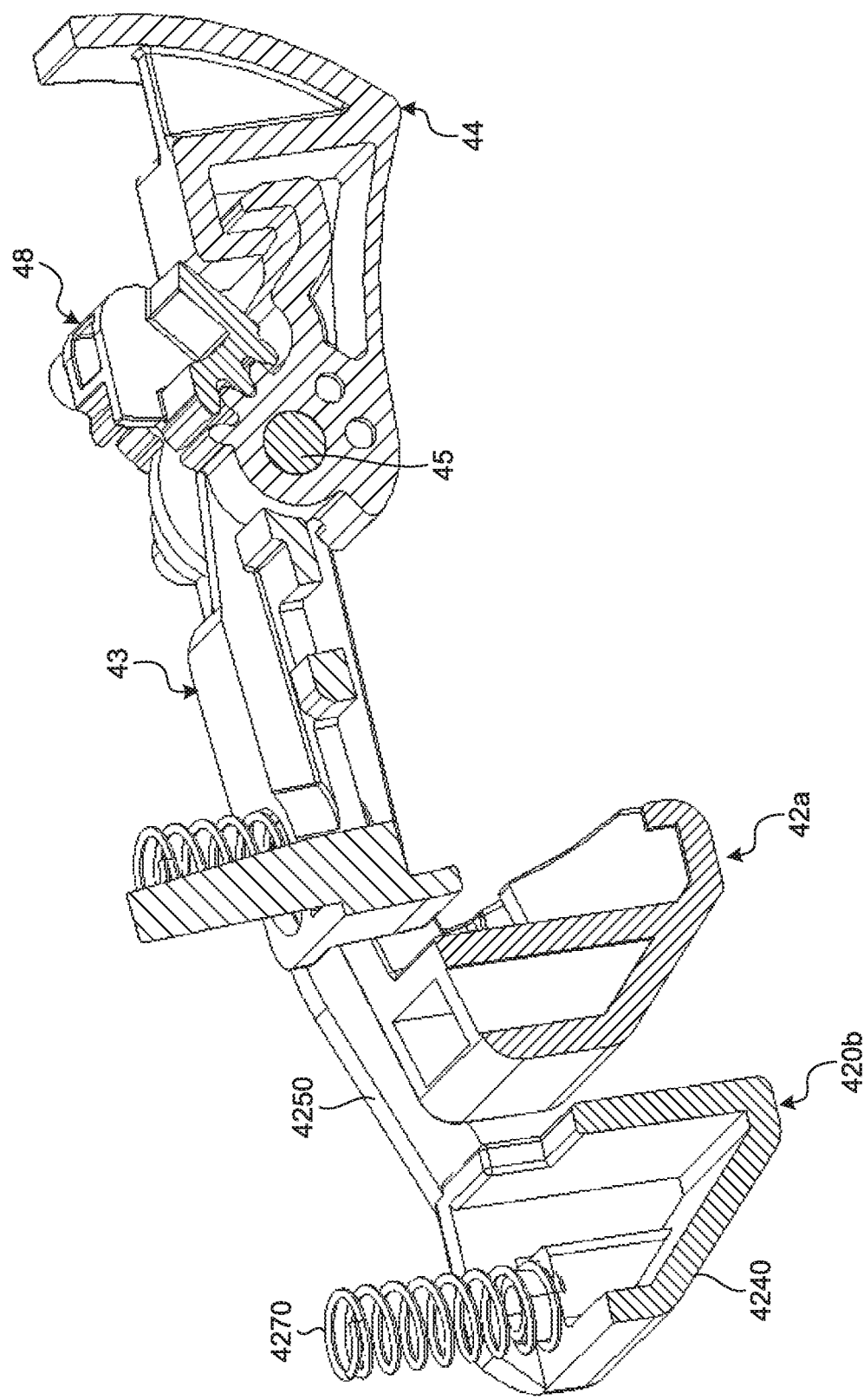
FIG. 56 is a perspective view illustrating a longitudinal section of the constituent elements illustrated in FIG. 55.

Besides, by having a greater length of extension of the second arm members 4250, as illustrated in FIG. 56, in the state of having advanced to the product storage column 30a, the second leading end portion 4240 is positioned anteriorly but is separated from the first leading end portion 421 that also has advanced to the product storage column 30a. That is, a sufficient gap is formed between the second leading end portion 4240 and the first leading end portion 421. Because of the sufficient gap, even if the foremost product 1 is very promptly taken out, it becomes possible to secure the time interval between the timing of upward swing of the first main gate 42a and the timing of upward swing of the second main gate 420b and to secure the time difference between the detection timings at the first main gate switch 56 and the second main gate switch 57. Hence, erroneous determination can be prevented from occurring. As a result, it becomes possible to enhance the accuracy of detecting the taking out of the foremost product 1.

Figure 57:
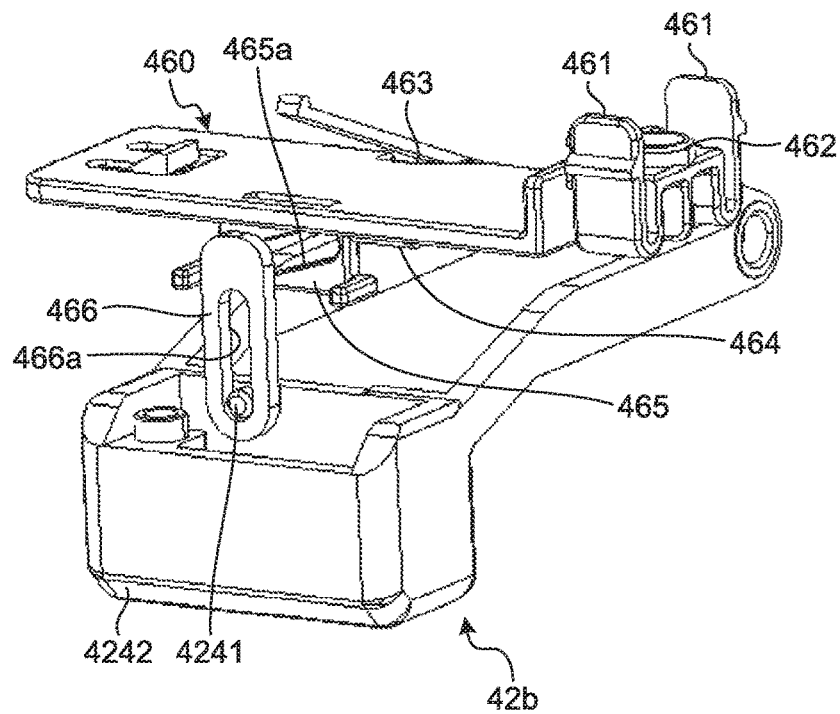
FIG. 57 is a perspective view of the main constituent elements in another modification example of the product storage device according to the embodiment of the present disclosure.
Figure 58:
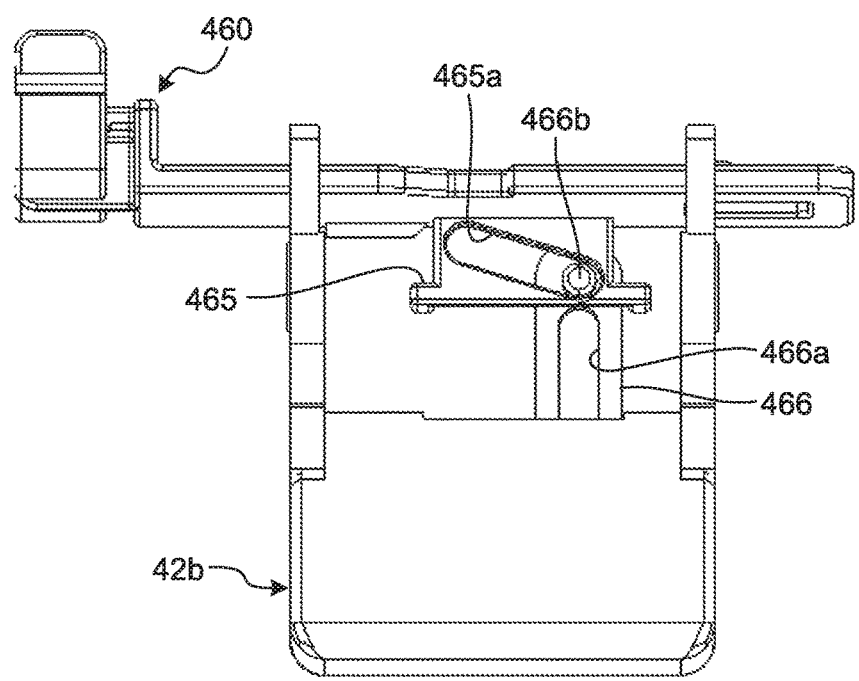
FIG. 58 is a rear view of the main constituent elements illustrated in FIG. 57.

In the present disclosure, as illustrated in FIGS. 57 and 58, a linking plate (a linking unit) 466 is disposed in between the second main gate 42b constituting the main gate 42 and a switching member 460. Meanwhile, in the constituent elements of the switching member 460, the constituent elements identical to the constituent elements of the switching member 46 are referred to by the same reference numerals and their explanation is not repeated.

The linking plate 466 is tabular in shape and has a linking hole 466a and a linking protrusion 466b formed thereon. The linking hole 466a is formed in the central area of the linking plate 466, and is a long hole having the upward direction as the longitudinal direction. In the linking hole 466a, a gate protrusion 4241 that is formed on the second main gate 42b is inserted from the posterior side.

The linking protrusion 466b protrudes in the posterior direction from the portion above the linking hole 466a. The linking protrusion 466b is inserted from the anterior side in a switching engagement hole 465a formed on a switching engagement portion 465. The switching engagement hole 465a is a long hole having the right-left direction as the longitudinal direction, and is formed at a gradually-downward slant toward the left-hand side.

Figure 59:
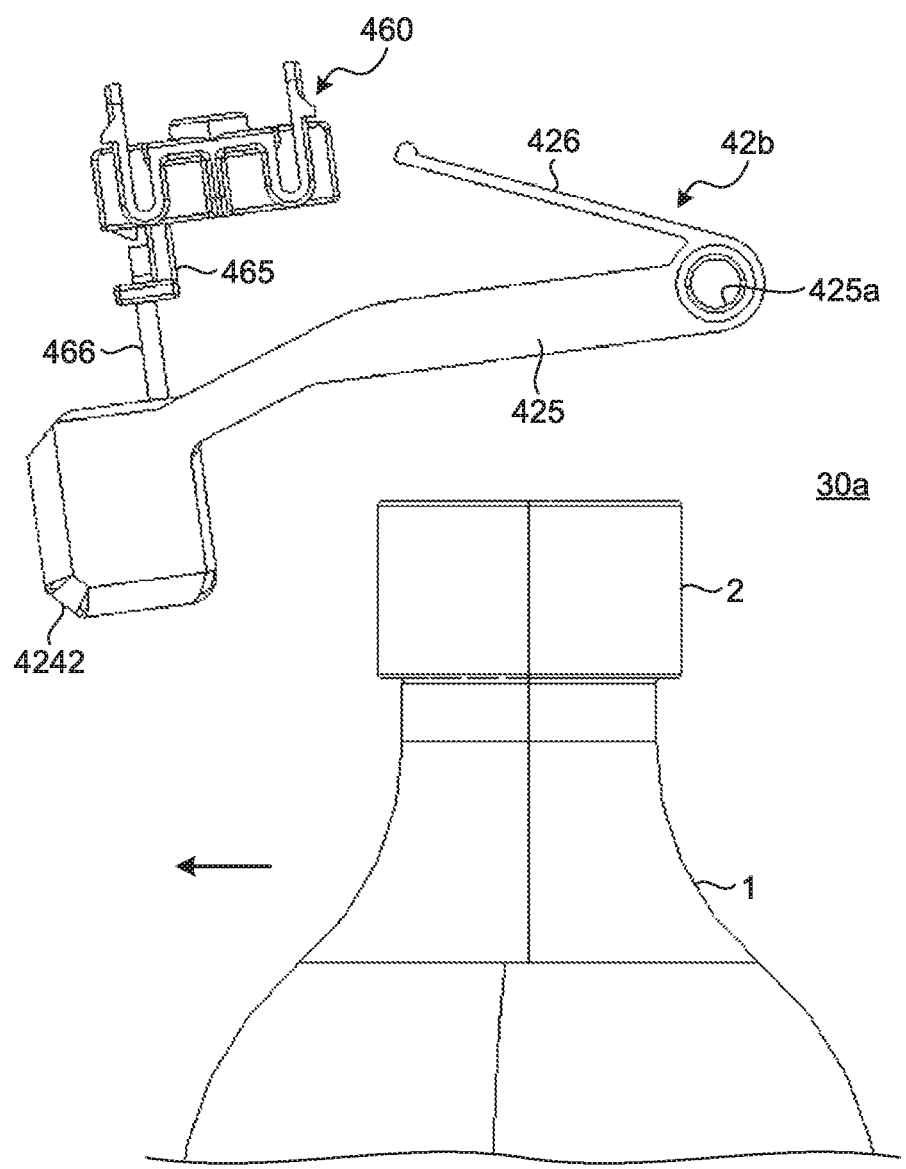
FIG. 59 is a lateral view of the main constituent elements illustrated in FIG. 57.

In this way, the linking plate 466 links the second main gate 42b and the switching member 460. When the switching member 460 is positioned at the vendition position, the linking protrusion 466b of the linking plate 466 gets inserted in the left-side end, that is, the lowermost portion of the switching engagement hole 465a as illustrated in FIGS. 57 and 58. Hence, the second main gate 42b gets pressed downward not only by the elastic restoration force of the second locking member 426 but also by the linking plate 466, and advances more to the lower side as illustrated in FIG. 59 than the abovementioned advanced position.

Figure 60:
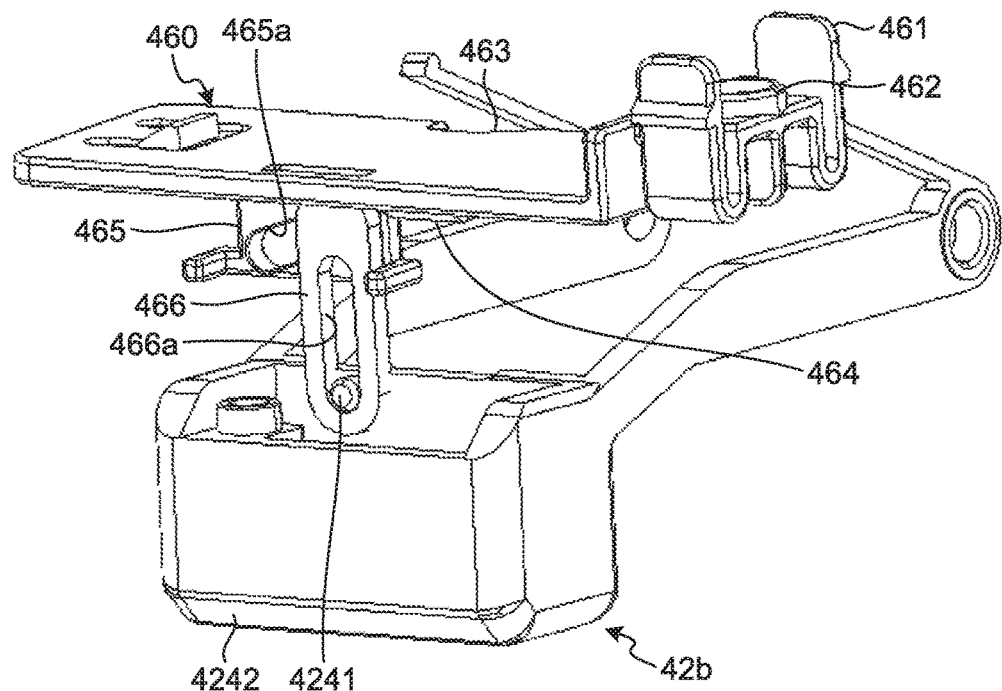
FIG. 60 is a perspective view of the main constituent elements in another modification example of the product storage device according to the embodiment of the present disclosure.
Figure 61:
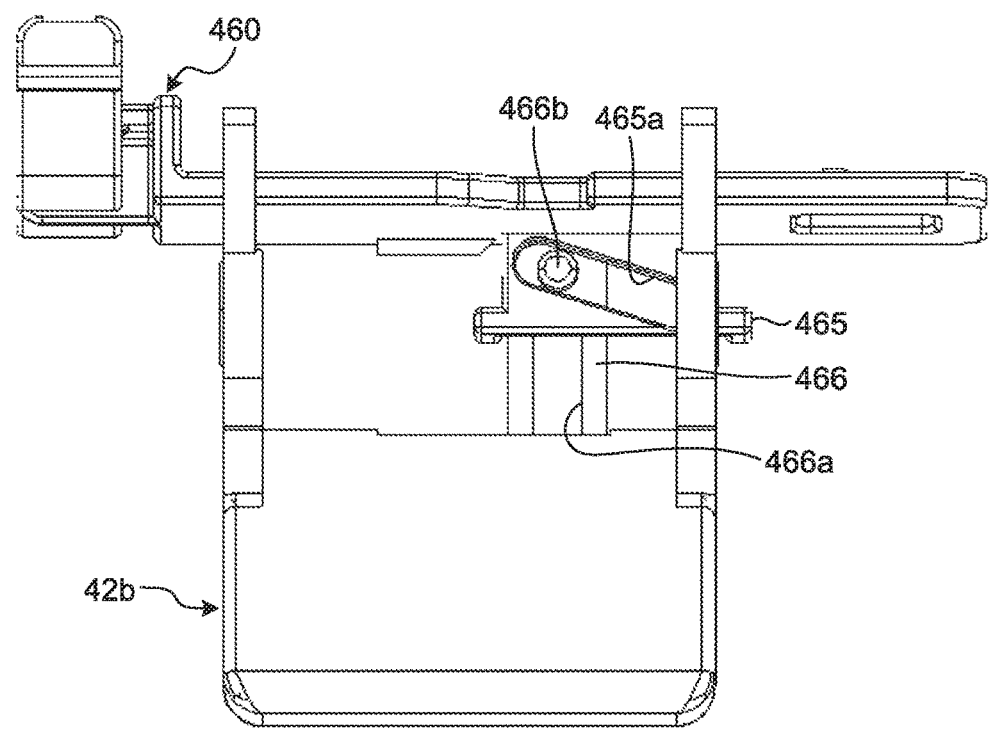
FIG. 61 is a rear view of the main constituent elements illustrated in FIG. 60.
Figure 62:
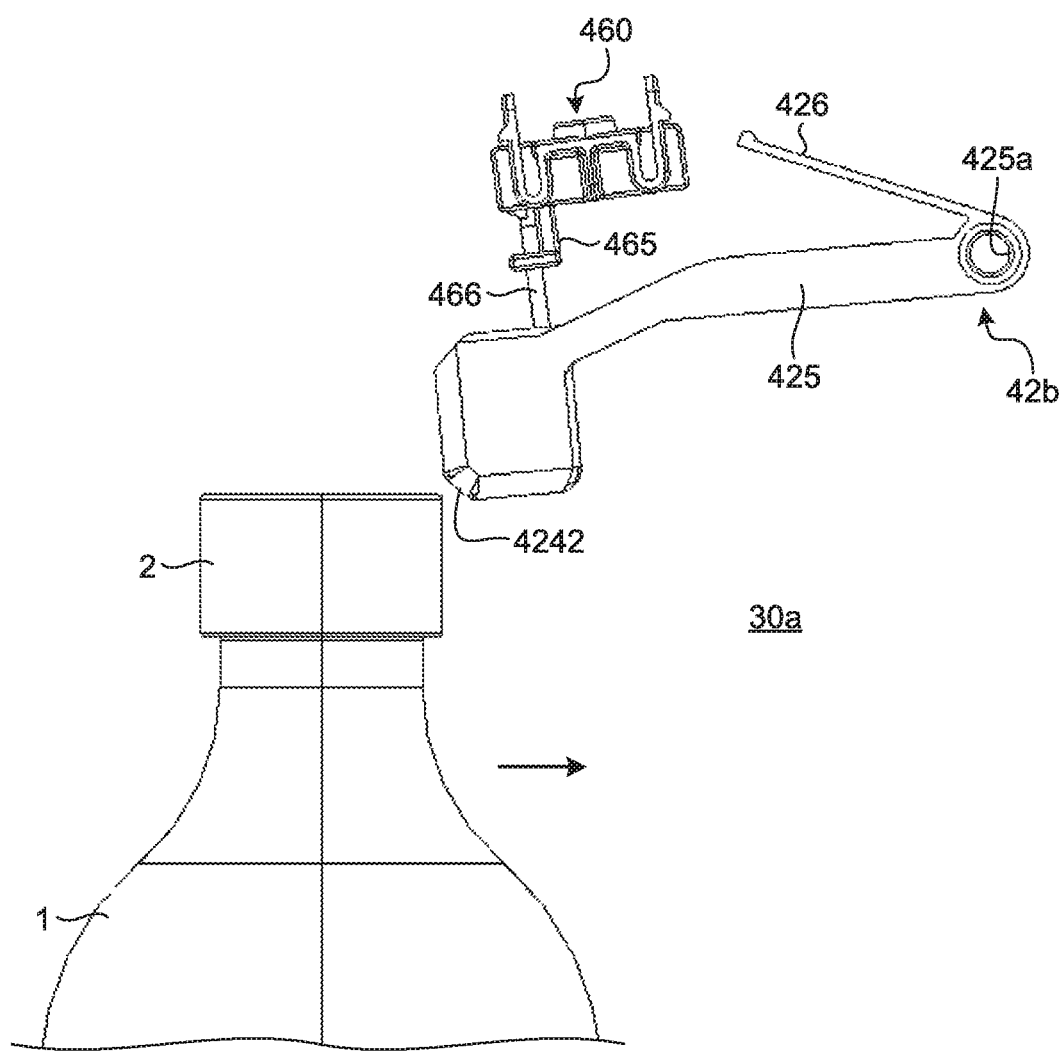
FIG. 62 is a lateral view of the main constituent elements illustrated in FIG. 60.

On the other hand, when the switching member 460 moves from the vendition position to the restocking position, the linking protrusion 466b gets displaced relatively to the right-hand side inside the switching engagement hole 465a and gets inserted in the right-side end vicinity portion of the switching engagement hole 465a as illustrated in FIGS. 60 and 61. As a result, the second main gate 42b gets lifted upward by the linking plate 466 even if the elastic restoration force of the second locking member 426 is exerted, and advances more to the upper side as illustrated in FIG. 62 than the abovementioned advanced position.

In this case, when the to-be-restocked product 1 is restocked from the anterior side, the end portion of the cap 2 of the to-be-stocked product 1 is in contact with an anterior inclined surface 4242 of the second leading end portion 424 of the second main gate 42b, and thus the second main gate 42b can be easily swung upward.

Meanwhile, when the switching member 460 is at the vendition position, the second main gate 42b gets pressed by the linking plate 466 too, so that the switching member 460 advances more to the lower side than in the case of being at the restocking position.

That is, when the switching member 460 is at the vendition position, as compared to the case in which the switching member 460 is at the restocking position, the linking plate 466 causes an increase in the amount of advancement of the second main gate 42b to the product storage column 30a in the normal state.

As a result, in the state in which the switching member 460 is at the vendition position, even if there is an attempt of inserting the product 1 in the product storage column 30a from the anterior side, since the linking plate 466 causes an increase in the amount of advancement of the second main gate 42b, the cap 2 of the product 1 does not abut against the anterior inclined surface 4242 of the second main gate 42b but is in contact with the front face of the second leading end portion 424. Hence, the second main gate 42b does not swing upward.

As a result, in the state of vending the product 1, it becomes possible to prevent the insertion of a product from the outside of the product storage column 30a.

In each product storage device according to the present disclosure, the lever that is disposed to be swingable along with the main gate allows, when in the regulation posture, the sliding member to be at the regulation position. Hence, the main gate can be regulated from moving away and retracting from the product storage column, and the products stored in the product storage column can be regulated from being taken out. Subsequently, when the sliding member slides from the regulation position, the lever switches to the regulation posture for regulating the sliding member from returning to the regulation position, and allows the downstream-most product, which is stored in the product storage column, to be taken out. At that time, the product neighboring the downstream-most product on the upstream side is regulated by the sub-gate from moving toward the dispensing slot. Hence, there is no risk of a plurality of products being taken out. When the main gate moves away from the product storage column in response to a subsequent take-out operation of taking out the downstream-most product, the lever switches to the standby posture when the main gate has advanced to the product storage column and allows the sliding member to return to the regulation position. Hence, once a take-out operation is performed, taking out of any further products from the product storage column can be prevented. In this way, because of the constituent elements of the product storage device, a single product is allowed to be taken out. Thus, unlike in the related art technology, it is not the case where the selection of the product on a basis of the product rack representing a set of a plurality of product storage devices. Hence, not only the product storage device need not be installed in the same layer as other product storage devices storing the products of the same price, but the product storage device can also be used to store the products having different prices than the products stored in the product storage devices installed in the same layer. As a result, it becomes possible to enhance the degree of freedom of installation and to enhance the degree of freedom of the products to be stored.

In the automatic vending machine according to the present disclosure, the lever that is disposed to be swingable along with the main gate allows, when in the regulation posture, the sliding member to be at the regulation position. Hence, the main gate can be regulated from moving away and retracting from the product storage column, and the products stored in the product storage column can be regulated from being taken out. Subsequently, when the sliding member slides from the regulation position, the lever switches to the regulation posture for regulating the sliding member from returning to the regulation position, and allows the downstream-most product, which is stored in the product storage column, to be taken out. At that time, the product neighboring the downstream-most product on the upstream side is regulated by the sub-gate from moving toward the dispensing slot. Hence, there is no risk of a plurality of products being taken out. When the main gate moves away from the product storage column in response to a subsequent take-out operation of taking out the downstream-most product, the lever switches to the standby posture when the main gate has advanced to the product storage column and allows the sliding member to return to the regulation position. Hence, once a take-out operation is performed, taking out of any further products from the product storage column can be prevented. In this way, because of the constituent elements of the product storage device, a single product is allowed to be taken out. Thus, unlike in the related art technology, it is not the case where the selection of the product on a basis of the product rack representing a set of a plurality of product storage devices. Hence, not only the product storage device need not be installed in the same layer as other product storage devices storing the products of the same price, but the product storage device can also be used to store the products having different prices than the products stored in the product storage devices installed in the same layer. As a result, it becomes possible to enhance the degree of freedom of installation of the product storage devices and to enhance the degree of freedom of the products to be stored in the product storage devices.

Particularly, in the state in which the switching member is at the vendition position and the sliding member has slid from the regulation position, in the case of terminating the vendition of products stored in the product storage column, the control unit once moves the switching member to the restocking position. Hence, the lever is regulated from switching to the standby posture and the regulation posture. With that, the sliding member can slide toward the regulation position. Subsequently, when the switching member moves to the vendition position, the lever switches to the standby posture. Hence, the main gate can be regulated from moving away from the product storage column, and as a result the products can be prevented from being taken out from the product storage device.

Although the disclosure has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A product storage device comprising:
   a main gate that is swingably provided to advance to and move away from a product storage column for storing products in alignment, the main gate being located, in a normal state, at an advanced position which is on a dispensing slot side of a downstream-most product present at a downstream-most side in the product storage column, and moving away from the product storage column, to allow the downstream-most product to be taken out through the dispensing slot;
   a sub-gate that is swingably provided in association with the main gate to advance to and move away from the product storage column, the sub-gate being arranged such that, when the main gate advances to the product storage column, the sub-gate moves away from the product storage column, and when the main gate moves away from the product storage column, sub-gate advances to the product storage column and regulates a product disposed next to an upstream side of the downstream-most product from moving toward the dispensing slot;
   a sliding member that is slidable in a storing direction of the product storage column, the sliding member, when being disposed at a regulation position, regulating the main gate from moving away and retracting from the product storage column;
   a lever that is swingably provided together with the main gate, the lever being arranged such that, when in a standby posture, the lever allows the sliding member to be present at the regulation position, when the sliding member slides from the regulation position, the lever switches to a regulation posture which regulates the sliding member from returning to the regulation position, and then, when the main gate moves away from the product storage column in response to a take-out operation of taking out the downstream-most product, the lever switches to the standby posture while the sub-gage advances to the product storage column to allow the sliding member to return to the regulation position; and a switching member that is movable between a vendition position and a restocking portion, the switching member being arranged such that, when the sliding member slides from the regulation position, the switching member allows the lever to switch to the regulation posture, wherein in the vendition position, when the main gate, which moved away from the product storage column in response to the take-out operation of taking out the downstream-most product, again advances to the product storage column, the lever is allowed to switch to the standby posture, and in the restocking position, when the sliding member slides from the regulation position, the sliding member is maintained in a state of having slid from the regulation position and the lever is regulated from switching to the standby posture.

2. The product storage device according to claim 1, wherein the sub-gate is deformable such that in case of advancing to the product storage column, the sub-gate undergoes elastic deformation contacting with a product that moves toward the upstream side from the dispensing slot, and allows a movement of the product.

3. The product storage device according to claim 1, wherein the product storage column includes a rail member for supporting a lid attaching portion of a container of a product having a constriction between the lid attaching portion, to which a lid is detachably attached, and a body part, to thereby support the product in an uprightly-suspended state.

4. The product storage device according to claim 1, wherein the main gate includes a first main gate that is swingably provided in a manner to advance to and move away from the product storage column, the first main member being arranged such that the first main member, in the normal state, advances to the advanced position on the dispensing slot side of the downstream-most product, and in case of moving away from the product storage column, allows the downstream-most product to be taken out through the dispensing slot, and a second main gate that is swingably provided to advance to and move away from the product storage column, the second main gate being arranged such that the second main member, in the normal state, advances to a position on the dispensing slot side of the first main gate, and in case of moving away from the product storage column, allows the downstream-most product to be taken out through the dispensing slot, the sliding member regulates, when being at the regulation position, the first main gate from moving away and retracting from the product storage column, and the lever is swingably provided along with the first main gate, the lever switching, when the sliding member slides from the regulation position, to the regulation posture for regulating the sliding member from returning to the regulation position, and then advancing, when the first main gate moves away from the product storage column in response to the take-out operation of taking out the downstream-most product, to the product storage column and switching to the standby posture to allow the sliding member to return to the regulation position.

5. The product storage device according to claim 1, further comprising a linking unit that is provided between the switching member and the main gate, the linking unit, when the switching member is present at the vendition position, causing an amount of advancement of the main gate to the product storage column in the normal state to be increased greater than an amount of the advancement when the switching member is present at the restocking position.

6. A product storage device comprising:

a main gate that is swingably provided to advance to and move away from a product storage column for storing products in alignment, the main gate being located, in a normal state, at an advanced position which is on a dispensing slot side of a downstream-most product present at a downstream-most side in the product storage column, and moving away from the product storage column, to allow the downstream-most product to be taken out through the dispensing slot;

a sub-gate that is swingably provided in association with the main gate to advance to and move away from the product storage column, the sub-gate being arranged such that, when the main gate advances to the product storage column, sub-gate moves away from the product storage column, and when the main gate moves away from the product storage column, the sub-gate advances to the product storage column and regulates a product disposed next to an upstream side of the downstream-most product from moving toward the dispensing slot;

a sliding member that is slidably provided in a storing direction of the product storage column, the sliding member, when being disposed at a regulation position, regulating the main gate from moving away and retracting from the product storage column;

a detecting unit that detects a swing of the main gate at the advanced position, in a direction of moving away; and a control unit configured such that, when the detecting unit detects the swing of the main gate in a state where the sliding member is present at the regulation position, the control unit determines that a product in the product storage column is selected and makes the sliding member slide from the regulation position.

7. The product storage device according to claim 6, further comprising a lever that is swingably provided along with the main gate, and arranged such that, when in a standby posture, the lever allows the sliding member to be at the regulation position, wherein when the sliding member slides from the regulation position, the lever switches to a regulation posture for regulating the sliding member from returning to the regulation position, and then when the main gate moves away from the product storage column in response to a take-out operation of taking out the downstream-most product, the lever switches to the standby posture when the main gate has advanced to the product storage column and allows the sliding member to return to the regulation position.

8. The product storage device according to claim 7, further comprising a switching member that is movably provided between a vendition position and a restocking position, wherein at the vendition position, the switching member allows the lever to switch to the regulation posture when the sliding member slides from the regulation position, and allows the lever to switch to the standby posture when the main gate which moved away from the product storage column in response to the take-out operation of taking out the downstream-most product again advances to the product storage column; and at the restocking position, the switching member maintains, when the sliding member slides from the regulation position, the sliding member in a state of having slid from the regulation position and regulates the lever from switching to the standby posture and the regulation posture.

9. The product storage device according to claim 8, further comprising a linking unit that is provided between the switching member and the main gate, the linking unit being arranged such that when the switching member is present at the vendition position, the linking unit causes an amount of advancement of the main gate to the product storage column in a normal state to be increased greater than an amount of the advancement when the switching member is present at the restocking position.

10. An automatic vending machine comprising:
a product storage device that includes
a main gate swingably provided to advance to and move away from a product storage column for storing products in alignment, the main gate being located, in a normal state, at an advanced position which is on a dispensing slot side of a downstream-most product present at a downstream-most side in the product storage column, and moving away from the product storage column, to allow the downstream-most product to be taken out through the dispensing slot, and
a sub-gate that is swingably provided in association with the main gate to advance to and move away from the product storage column, the sub-gate being arranged such that, when the main gate advances to the product storage column, the sub-gate moves away from the product storage column, and when the main gate moves away from the product storage column, the sub-gate advances to the product storage column and regulates a product disposed next to an upstream side of the downstream-most product from moving toward the dispensing slot,
wherein the product storage device further includes
a sliding member that is slidably provided in a storing direction of the product storage column, the sliding member, when being disposed at a regulation position, regulating the main gate from moving away and retracting from the product storage column,
a lever that is swingably provided together with the main gate, the lever being arranged such that, when in a standby posture, the lever allows the sliding member to be present at the regulation position, when the sliding member slides from the regulation position, the lever switches to a regulation posture which regulates the sliding member from returning to the regulation position, and then when the main gate moves away from the product storage column in response to a take-out operation of taking out the downstream-most product, the lever switches to the standby posture while the sub-gate advances to the product storage column to allow the sliding member to return to the regulation position, and
a switching member that is movably provided between a vendition portion and a restocking position, the switching member being arranged such that in the vendition, when the sliding member slides from the regulation position, the switching member allows the lever to switch to the regulation posture, and when the main gate, which had moved away from the product storage column in response to the take-out operation of taking out the downstream-most product, again advances to the product storage column, the lever is allowed to switch to the standby posture, and in the restocking position at which, when the sliding member slides from the regulation position, the sliding member is maintained in a state of having slid from the regulation position and the lever is regulated from switching to the standby posture, and
the automatic vending machine further comprises a control unit that is arranged such that, in a state in which the switching member is present at the vendition position and the sliding member has slid from the regulation position, in case of terminating vendition of products stored in the product storage column, the switching member is first moved to the restocking position and then to the vendition position.

* * * * *